United States Patent [19]

McGuinness et al.

[11] Patent Number: 5,974,405
[45] Date of Patent: Oct. 26, 1999

[54] KNOWLEDGE BASE MANAGEMENT SYSTEM WITH ENHANCED EXPLANATION OF DERIVED INFORMATION AND ERROR OBJECTS

[75] Inventors: Deborah L. McGuinness, Summit; Peter Patel-Schneider, Westfield; Lori Alperin Resnick, Highland Park, all of N.J.

[73] Assignee: Lucent Technologies Inc., Murray Hill, N.J.

[21] Appl. No.: 08/933,576

[22] Filed: Sep. 19, 1997

Related U.S. Application Data

[63] Continuation of application No. 08/249,113, May 25, 1994, abandoned.

[51] Int. Cl.$^6$ ........................................................ G06F 15/18
[52] U.S. Cl. .................................................. 706/45; 706/60
[58] Field of Search ................................ 706/46, 47, 48, 706/50, 51, 52, 45, 59, 60

[56] References Cited

U.S. PATENT DOCUMENTS

| | | | |
|---|---|---|---|
| 4,809,219 | 2/1989 | Ashford et al. | 706/50 |
| 4,866,635 | 9/1989 | Kahn et al. | 706/46 |
| 4,970,657 | 11/1990 | Wolf | 706/52 |
| 5,388,188 | 2/1995 | Selfridge et al. | 706/45 |
| 5,398,300 | 3/1995 | Levey | 706/46 |
| 5,406,477 | 4/1995 | Harhen | 706/46 |
| 5,408,587 | 4/1995 | Maier et al. | 706/46 |
| 5,471,677 | 11/1995 | Imanaka | 706/52 |

OTHER PUBLICATIONS

Borgida, A., "From Type Systems to Knowledge Representation: Natural Semantics Specifications for Description Logics," Int'l J. on Intelligent and Cooperative Information Systems 1(1), World Scientific Publishing, Singapore (1992).

Borgida, A. et al., "Classic: A Structural Data Model for Objects," Proc. of the 1989 ACM SIGMOD Int'l Conf. on the Management of Data, Portland, Or., vol. 18, No. 2, Jun. 1989, pp. 58–67.

Brachman, R.J. et al., "The Classic Knowledge Representation System, or, KL–ONE: The Next Generation," Proc. of the Int'l Conf. on Fifth Generation Systems, Tokyo, Japan, Jun. 1992, 18 pages.

(List continued on next page.)

*Primary Examiner*—Robert W. Downs

[57] ABSTRACT

A knowledge representation system which allows a user to utilize a description language to generate, maintain and access information in a knowledge base is disclosed. The knowledge representation system includes an explanation subsystem which explains where the derived information that is stored for a particular object was obtained from. A first level explanation function will provide a user with an explanation of the immediate source of the pieces of derived information that are stored for an object in the knowledge base. A complete explanation function provides a complete explanation by continuing to explain how the immediate source for each piece of the information itself received the information, until the source of the information is told information or the result of a rule firing. The explanation subsystem also explains subsumption inferences, which explain why a particular concept or rule antecedent is satisfied by a particular object. The explanation that is generated may be limited in a number of ways in accordance with the needs of a user. An error handling subsystem facilitates the detection of the source of real errors. Upon the detection of a real error, an error object is preferably created for the inconsistent object and for every other object that is affected by the error. The error objects, which may be printed out or explained, store all of the information associated with the corresponding object at a time when the data structures include the error information.

49 Claims, 37 Drawing Sheets

OTHER PUBLICATIONS

Brachman, R.J. et al., "Integrated Support for Data Archaeology," Int'l J. of Intelligent and Cooperative Information Systems, vol. 2, No. 2, 1993, pp. 159–185.

Brachman, R.J. et al., "Living with Classic: When and How to Use a KL–ONE–Like Language," in J. Sowa, ed., Principles of Semantic Networks: Explorations in the Representation of Knowledge; Morgan–Kaufmann Publishers, 1991, pp. 401–56.

Brachman, R.J., "'Reducing' Classic to Practice: Knowledge Representation Theory Meets Reality," Principles of Knowledge Representation and Reasoning: Proc. of the Third Int'l Conf. (KR'92), Oct. 1992, 12 pages.

Brill, D., *Loom Reference Manual,* Version 2.0, University of Southern California (Dec. 1993).

Clancey, W.J., "The Epistemology of a Rule–Based Expert System—a Framework for Explanation," Artificial Intelligence, pp. 215–251 (1983).

Clancey, W.J., Letsinger, R., "NEOMYCIN: Reconfiguring a Rule–Based Expert System for Application to Teaching," Proc. of the 7th International Joint Conference on Artificial Intelligence, Vancouver, Canada, 1981, pp. 829–836.

Hoppe, T. et al., *Back V5 Tutorial & Manual,* Techhnical University Berlin, Institute for Software and Theoretical Information, Project Kit–Back, W–1000 Berlin 10, Germany (Mar., 1993).

Moore, J.D., Swartout, W.R., "Explanation in Expert Systems: A Survey," University of Southern California, Information Sciences Institute Research Report, ISI/RR–88–228, Dec. 1988, 58 pages.

Neches, R. et al., "Enhanced Maintenance and Explanation of Expert Systems Through Explicit Models of Their Development," IEEE Transactions of Software Engineering, vol. SE–11, No. 11, pp. 1337–1351 Nov. 1985.

Swartout, W.R., Moore, J.D., "Explanation in Second Generation Expert Systems," Second Generation Expert Systems, Jean–Marc David and Jean–Paul Krivine and Reid Simmons, Springer–Verlag, New York, 1993, pp. 543–585.

Wright, J.R. et al., "A Knowledge–Based Configurator that Supports Sales, Engineering, and Manufacturing at AT&T Network Systems," Proc. of the Fifth Innovative Application of Artificial Intelligence Conf., Washington, D.C., pp. 183–193 (Jul. 11–15, 1993), reprinted in AI Magazine, vol. 14, No. 3, pp. 69–80 (Fall 1993).

B. Chandrasekaran, et al., "Explaining Control Strategies in Problem Solving," IEEE Expert, pp. 9–24, Mar. 1989.

S.M. Tuttle and C.F. Eick, "Historical Rete Networks for Debugging Rule–Based Systems," Proc. 1991 IEEE Int'l. Conf. on Tools for Artificial Intelligence, pp. 450–457, Nov. 1991.

S.M. Tuttle and C.F. Eick, "Suggesting Causes of Faults in Data–Driven Rule–Based Systems," Proc. 1992 IEEE Int'l. Conf. on Tools with Artificial Intelligence, pp. 413–416, Nov. 1992.

S.M. Tuttle and C.F. Eick, "MIRO: A Debugging Tool for Forward–chaining Expert Systems," Moving Towards Expert Systems Globally in the 21st Century, pp. 526–533, Dec. 1994.

Robert MacGregor, "The Evolving Technology of Classification–Based Knowledge Representation Systems", in Principles of Semantic Networks: Explorations in the Representation of Knowledge, Ed. John F. Sowa, Morgan Kaufman Publishers, pp. 385–400, 1991.

Ronald J. Brachman et al., "Living With Classic: When and How to Use a KL–ONE–like Language", in Principles of Semantic Networks: Explorations in the Representation of Knowledge, ed. John F. Sowa, Morgan Kaufman, pp. 401–456, 1991.

Kamran Parsaye and Mark Chignell, Expert Systems for Experts, John Wiley & Sons, p. 162, 1988.

Robert MacGregor and Mark H. Burstein, "Using a Description Classifier to Enhance Knowledge Representation", IEEE Expert, vol. 6, No. 3, pp. 41–46, 1991.

Robert M. MacGregor, "Using a Decription Classifier to Enhance Deductive Inference", Artificial Intelligence Applications Conference, pp. 141–147, 1991.

Michael R. Wick and James R. Slagel, "An Explanation Facility for Today's Expert System", IEEE Expert, vol. 4, No. 1, pp. 28–38, 1989.

Virginia E. Barker and Dennis E. O'Conner, "Expert Systems for Configuration at Digital: XCON and Beyond", Communications of the ACM, vol. 32, No. 3, pp. 298–318, 1989.

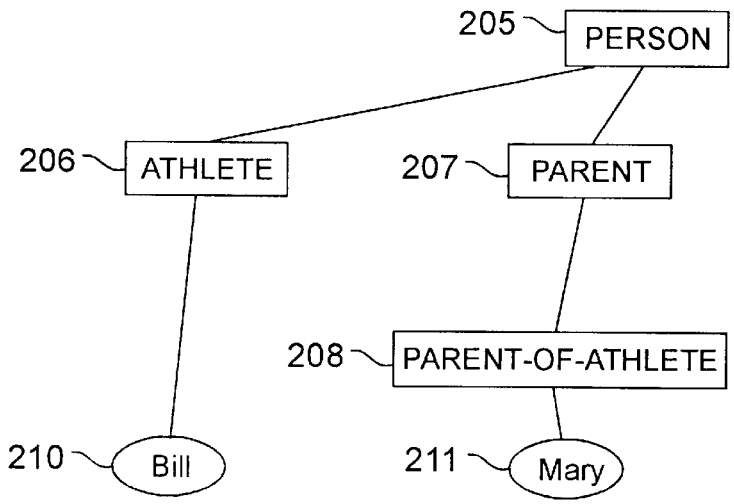

FIG. 2a

FIG. 2b
```
Source code - athlete-file

;; Define Roles and Concepts

L105    define primitive role child

L110    define primitive concept PERSON

L115    define primitive concept ATHLETE
        as subtype of PERSON

L120    define primitive concept PARENT
        as subtype of PERSON

L125    define concept PARENT-OF-ATHLETE
        as PARENT and all child as ATHLETE ;; Create Individuals:

L160    create individual Mary as PARENT-
        OF-ATHLETE and fills child Bill
```

300

| SYMBOL TABLE | |
|---|---|
| LABEL ← 310 | DATA STRUCTURE POINTER ← 320 |
| 325 → PERSON | |
| 328 → ATHLETE | |
| 330 → PARENT | |
| 335 → PARENT-OF-ATHLETE | CONCEPT DATA STRUCTURE 400 (FIG. 4) |
| 340 → Mary | |
| 345 → Bill | INDIVIDUAL DATA STRUCTURE 500 (FIG. 5) |

CONCEPT DATA STRUCTURE
CONCEPT: PARENT-OF-ATHLETE

- 405 → PRIMITIVE: F
- 410 → PARENT CONCEPTS: PARENT
- 420 → CHILD CONCEPTS: NIL
- 430 → SATISFYING INDIVIDUALS: Mary
- 440 → LOCAL RULES:
- 450 → APPLICABLE RULES:
- 460 → DERIVED CONCEPT DESCRIPTOR (DCD) POINTER: DCD 800 (FIG. 8)
- 470 → TOLD CONCEPT DESCRIPTOR (TCD) POINTER: TCD 600 (FIG. 6)
- 480 → SYMBOL TABLE ENTRY POINTER: TABLE 300 ENTRY 335

INDIVIDUAL DATA STRUCTURE
INDIVIDUAL: Bill

- 510 → PARENT CONCEPTS: ATHLETE
- 520 → DEPENDENCY LISTS:
- 530 → ⎡ PROPAGATIONS IN: {Mary, child role, ATHLETE}
- 540 → ⎣ PROPAGATIONS OUT:
- 550 → ⎡ INVERSE-ROLE PROPAGATIONS IN:
- 560 → ⎣ INVERSE-ROLE PROPAGATIONS OUT:
- 570 → DERIVED INDIVIDUAL DESCRIPTOR (DID) POINTER: DID 800 (FIG. 8)
- 580 → TOLD INDIVIDUAL DESCRIPTOR (TID) POINTER: TID 600 (FIG. 6)
- 590 → SYMBOL TABLE ENTRY POINTER: TABLE 300 ENTRY 345

FIG. 5

KNOWLEDGE BASE MANAGEMENT SYSTEM WITH ENHANCED EXPLANATION OF DERIVED INFORMATION AND ERROR OBJECTS

This is a continuation of application Ser. No. 08/249,113 filed on May 25, 1994, now abandoned.

FIELD OF THE INVENTION

The present invention relates to a knowledge base management system, and more particularly, to a method and apparatus in a knowledge representation system for providing either complete or limited explanation of the source of derived information and an explanation of error objects.

BACKGROUND OF THE INVENTION

Recently, a number of knowledge base management systems have been developed which codify information in a knowledge base and provide a mechanism for users to access and maintain the stored information. For a general introduction to knowledge bases, see Ronald J. Brachman, "The Basics of Knowledge Representation and Reasoning," AT&T Technical Journal, Vol. 67, No. 1, pp. 7–24 (January/February 1988) and J. Sowa, ed., Principles of Semantic Networks: Explorations in the Representation of Knowledge, Morgan-Kaufmann Publishers (1991).

Generally, information for a particular domain is developed through a knowledge engineering process which requires a domain expert to translate his or her knowledge into a collection of declarative expressions which embody the expert's knowledge. In addition, the expert can generate a set of rules and inferences which serve to imitate the expert's reasoning.

An illustrative knowledge base management system is the CLASSIC™ Knowledge Representation System, developed by AT&T Bell Laboratories, which allows a user to generate, maintain and access information in a knowledge base using a description language. The information that is stored in a knowledge base for a particular object typically includes "told" information that has been entered by a user about the object, as well as "derived" information that may be ascertained about the object based on the told information and certain inferences that allow information about the object to be inferred.

A knowledge base management system may provide an explanation function which explains the source of each piece of information that has been stored for a particular object. For example, the explanation function may indicate that a piece of information was entered by the user about an object, or that the piece of information was inherited from a concept which the user asserted that the object satisfied.

There are very few knowledge base management systems that include explanation capabilities for explaining the immediate source of a piece of information. Prior versions of the CLASSIC™ system did provide an explanation of the immediate source of a piece of information, but did not go the next step and explain how the immediate source of the information itself received the information.

In addition, if a system has no pruning capabilities, then when a user requests an explanation for a particular object, the user is presented with an explanation of the source of all of the information that is stored for the particular object, regardless of the particular needs of the user. Thus, explanation systems, which are unable to limit the scope of the generated explanation, have limited utility because the amount of explanation that is presented to the user is often overwhelming.

One potentially useful application for the explanation facilities of a knowledge base management system is in detecting the source of errors. However, upon the detection of a real error by a conventional knowledge representation system, in other words, where an inconsistency is created in the information stored for an object, the knowledge representation system will automatically discard the piece of information that has led to the error and return the knowledge base to a consistent state by removing all of the information that was added to the knowledge base based on the discarded information. Thus, in a conventional knowledge representation system, it is not possible to request an explanation of an object containing an error, because the knowledge representation system has automatically discarded the information in order to maintain the knowledge base in a consistent state.

Another potentially useful application for the explanation facilities of a knowledge base management system is in providing an explanation of why a particular object does or does not satisfy a particular concept description. If the knowledge base management system classifies objects in the knowledge base in a hierarchy, it would be particularly useful for the knowledge base management system to provide an explanation of why an object is in a particular position in the hierarchy.

As is apparent from the above discussion with prior knowledge base management systems, a need exists for a knowledge representation system that is capable of providing a complete explanation of a piece of derived information by tracing back the source of each piece of information until it reaches the point that the source of the information is told information which has been asserted by the user. A further need exists for a knowledge representation system that is capable of limiting the generated explanation in accordance with the needs of the user. Finally, a need exists for an explanation system that is capable of explaining objects that contain errors, in order to facilitate the detection of the error source.

SUMMARY OF THE INVENTION

Generally, in one embodiment of the invention, a knowledge representation system is provided to allow a user to utilize a description language to generate, maintain and access information in a knowledge base. The knowledge representation system includes an explanation subsystem which allows it to explain where the derived information that is stored for a particular object was obtained from. In one embodiment, a first level explanation function will provide a user with an explanation of the immediate source of the pieces of derived information that are stored for an object in the knowledge base.

According to another embodiment of the invention, a complete explanation function provides a complete explanation of the source of information stored for a particular object, by tracing back the source of the information until it reaches the point that the source of the information is told information which has been asserted by the user about the object or is the result of a rule firing.

According to another embodiment of the invention, the explanation subsystem also includes a mechanism for explaining subsumption inferences, which explain why a particular concept or rule antecedent in the knowledge base is satisfied by a particular object. In one embodiment, an object subsumption explanation function will explain why a particular concept in the knowledge base is satisfied by a particular object. The object subsumption explanation function will first verify that the object being explained is in fact subsumed by the concept, and then if so, will indicate how each component of the concept definition is satisfied by the object being explained.

In addition, a rule firing explanation function will provide an explanation of why a particular rule was fired on a particular individual in the knowledge base. The rule firing explanation function will first verify that the individual being explained is subsumed by the rule antecedent and rule filter, if any, and then indicate how each component of the rule antecedent and rule filter are satisfied by the individual being explained.

According to a further embodiment of the invention, the explanation that is generated by the explanation subsystem may be limited in a number of ways in accordance with the needs of a user. In this manner, the explanation output that is presented to the user is more manageable, and is limited to an explanation of the information that the particular user is interested in. In one embodiment, when a user requests an explanation for an object in the knowledge base, the user can specify on the command line that the explanation should be limited to a particular role-path or aspect.

In addition, according to a further embodiment of the invention, a number of pruning variables are preferably provided which may be preset by the user to limit the scope of the explanation that is generated in a number of ways. A plurality of pruning variables are preferably provided to allow a user to control whether certain inferences are explained, to limit the generated explanation of certain aspects or role-paths, and to control where the complete explanation function is terminated. The pruning variables are preferably placed under user control, with default settings being defined for each variable in the event that the user fails to specify some pruning settings.

According to another embodiment of the invention, an error handling subsystem provides a mechanism for utilizing the explanation subsystem for detecting the source of real errors. The error handling subsystem will preferably create an error object, which stores all of the information associated with an inconsistent object at a time when the data structures of the object included all of the error information, in other words, before the knowledge representation system returns the knowledge base to a consistent state. In addition, error objects are also preferably created for every object in the knowledge base that is affected by the error, which are those objects that were modified as a result of the problematic input before the inconsistency was detected.

According to a further embodiment of the invention, the user can treat the generated error objects, which contain the error information, like any other object in the knowledge base. Accordingly, the user can print out the information that is stored in the data structures associated with the error object, or request that an explanation be performed on the object in order to identify the source of the error.

A more complete understanding of the present invention, as well as further features and advantages of the invention, will be obtained by reference to the detailed description and drawings.

BRIEF DESCRIPTION OF THE DRAWINGS

FIG. 2a provides a graphical illustration of the hierarchical relationship of a number of objects maintained in a sample knowledge base that is defined by a sample source code, athlete-file, shown in FIG. 2b;

FIG. 2b illustrates the sample source code, athlete-file, that defines the told information which has been asserted by the user for the sample knowledge base of FIG. 2a;

FIGS. 3 through 10b illustrate a number of illustrative data structures for storing information for the individuals and concepts in a knowledge base;

DETAILED DESCRIPTION

Figure 1:
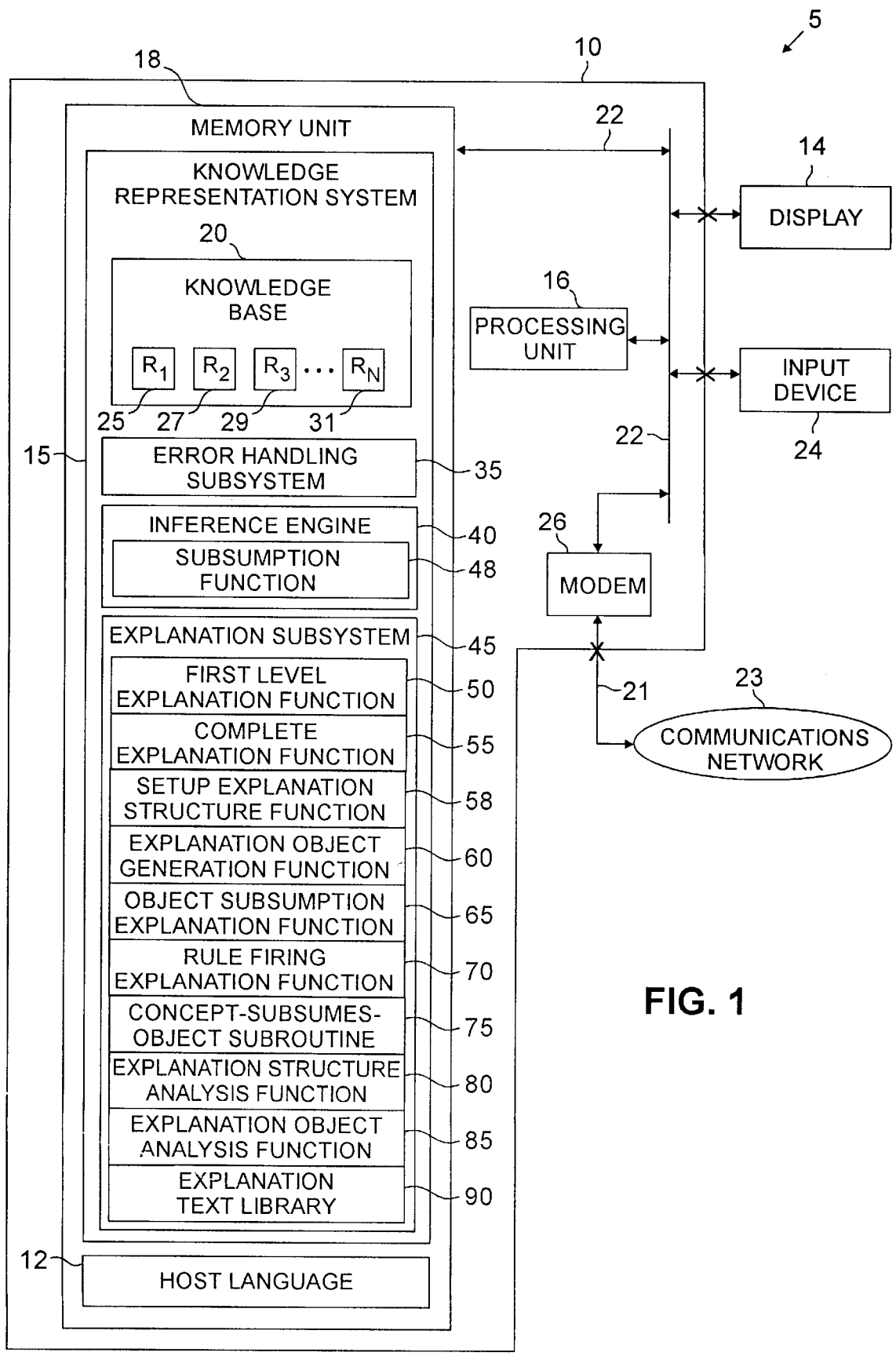
FIG. 1 is a schematic block diagram illustrating a knowledge base management system according to the present invention.

A knowledge base management system 5 according to the present invention is shown in FIG. 1. The knowledge base management system 5 allows a user to generate, maintain and access information in a knowledge base, such as knowledge base 20. As shown in FIG. 1, the knowledge base management system 5 disclosed herein includes a general-purpose computing system 10, such as a workstation or personal computer, having a display 14, a processing unit 16, a memory unit 18, a modem 26, buses 22, and an input device or devices 24, such as a mouse, a keyboard or both.

The memory unit 18 of the host computer 10 preferably includes a host programming language 12, which may be any suitable high level programming language, such as the Common LISP or C programming languages. The knowledge base management system 5 may be interconnected with other knowledge base management systems, or data storage and collection devices via modem 26, data link 21 and communications network 23.

As discussed further below, the host computer 10 employs a knowledge representation system 15, which may be stored in the memory unit 18, to develop and interact with a knowledge base, such as the knowledge base 20. As discussed further below in conjunction with FIGS. 3 through 10b, the knowledge base 20 will typically consist of a plurality of data structures or records, such as records $R_1$ 25, $R_2$ 27, $R_3$ 29, $R_n$ 31, for storing information on objects in the domain. It is noted that although the knowledge base 20 is illustrated as being stored in the memory unit 18, the knowledge base 20 may alternatively be stored in a remote memory device, as would be apparent to one skilled in the art.

As is well known, the information stored in a particular record, such as the record 25, associated with a given object includes "told" information that has been entered by a user about the object into the knowledge base management system 5, as well as "derived" information that may be ascertained about the given object based on the told information and certain inferences discussed below.

The knowledge representation system 15 allows the user to employ a description language to make assertions about objects in the domain of interest, to identify classes of objects and to establish the relationship among the entered objects. As discussed further below, the knowledge representation system 15 will utilize the user's description of entered terms to classify the objects by finding their relationship to all previously specified terms.

In a preferred embodiment, the knowledge representation system 15 is embodied as a description-based knowledge representation system, such as the CLASSIC™ Knowledge Representation System, developed by AT&T Bell Laboratories, 600 Mountain Avenue, Murray Hill, N.J. 07974-0636, as modified herein to provide enhanced explanation facilities and a mechanism for the creation of error objects, discussed below. The CLASSIC™ Knowledge Representation System is currently available in Common LISP and C implementations. For a detailed discussion of the CLASSIC™ Knowledge Representation System, see R. J. Brachman et al., Living With CLASSIC: How and When to Use a KL-One-like Language, in J. Sowa, ed., Principles of Semantic Networks: Explorations in the Representation of Knowledge; Morgan-Kaufmann Publishers, 1991, pp. 401–56; A. Borgida et al., CLASSIC: A Structural Data Model for Objects, Proc. of the 1989 ACM SIGMOD Int'l Conf. on the Management of Data, Portland, Oreg., SIGMOD RECORD, Vol. 18, No. 2, pp. 58–67 (June, 1989), each incorporated herein by reference.

Alternatively, the knowledge representation system 15 may be embodied utilizing the BACK Terminological Representation System, available from the Technical University Berlin, Germany, and described in Thomas Hoppe et al., BACK V5 Tutorial & Manual, Technical University Berlin, Institute for Software and Theoretical Information, Project KIT-BACK, W-1000 Berlin 10, Germany (March, 1993); or the Loom Knowledge Representation System, available from the University of Southern California, Information Sciences Institute, Marina del Rey, Calif. 90292, and described in David Brill, Loom Reference Manual, Version 2.0, University of Southern California (December 1993).

As shown in FIG. 1, the knowledge representation system 15 preferably includes an inference engine 40 which maintains a subsumption function 48, discussed below, as well as the inferences which allow derived information to be obtained for objects in the knowledge base 20. For a listing and discussion of illustrative inferences see Appendices 1 through 4; see also Alexander Borgida, From Type Systems to Knowledge Representation: Natural Semantics Specifications For Description Logics, Int'l J. On Intelligent and Cooperative Information Systems 1(1), World Scientific Publishing, Singapore (1992), incorporated herein by reference. The inferences listed in Sections 1 through 4 located at the end of the specification, are illustrative of the inferences that would be found in a description-based knowledge representation system 15, such as the CLASSIC™ Knowledge Representation System. Section 1 is a listing of illustrative normalization inferences. Section 2 is a listing of illustrative inferences which may be applied to "same-as" restrictions. Sections 3 and 4 are a listing of illustrative subsumption inferences, discussed further below.

The knowledge representation system 15 additionally includes an explanation subsystem 45 which preferably generates, upon user request, an explanation of where the derived information that is stored in the knowledge base 20 for a particular object was obtained from. The explanation subsystem 45 preferably provides a first level explanation function 50, discussed further below in conjunction with FIG. 11, which provides a user with an explanation of the immediate source of the pieces of derived information that are stored for an object in the knowledge base 20.

In addition, according to another feature of the invention, the explanation subsystem includes a complete explanation function 55, discussed further below in conjunction with FIG. 17, which provides a user with a complete explanation of the information that is stored for an object in the knowledge base 20 by tracing back the source of each piece of the derived information until it reaches the point that the source of the information is told information which has been asserted by the user or is the result of a rule firing.

In addition, the explanation subsystem 45 preferably includes an object subsumption explanation function 65 and a rule firing explanation function 70, discussed below in conjunction with FIGS. 14 and 15, respectively, for explaining subsumption inferences, in other words, why a particular object in the knowledge base 20 is subsumed by a particular concept or rule antecedent.

The explanation subsystem 45 preferably also includes the program code necessary to execute a number of additional functions 58, 60, 75, 80, 85, discussed below in conjunction with FIGS. 12, 13, 16, 18 and 19, respectively. The explanation subsystem 45 preferably maintains an explanation text library 90, discussed further below, which contains an appropriate text message for printing out explanations for each type of inference.

According to a further feature of the invention, the explanation that is generated by the explanation subsystem 45 may be limited in a number of ways. In this manner, the explanation output that is presented to the user is more manageable, and is limited to an explanation of the information that the particular user is interested in. First, when a user requests either a first level explanation or a complete explanation for an object in the knowledge base 20, the user can specify on the command line that the explanation should be limited to a particular role-path or aspect, discussed below.

In addition, according to a further feature of the invention, a number of pruning variables are preferably provided to allow a user to limit the scope of the explanation that is generated in a number of ways. As discussed further below, a plurality of pruning variables are preferably provided to allow a user to control whether certain inferences are explained, to limit the generated explanation to certain aspects or role-paths, and to control where the complete explanation function 55 is terminated. The pruning variables are preferably placed under user control, with default settings being defined for each variable in the event that the user fails to specify some pruning settings.

The knowledge representation system 15 preferably also includes an error handling subsystem 35, which provides a mechanism for detecting and processing syntax errors as well as real errors, in a known manner. A real error occurs where the knowledge representation system 15 detects an inconsistency in the data while trying to create a record for an object. For example, a knowledge base, such as the knowledge base 20, may include a concept VEGETARIAN that is defined to be satisfied if an individual only eats food of the type PLANT. Thus, if an individual in the knowledge base 20 were classified as a VEGETARIAN and then the individual was later found or asserted to eat food of the type MEAT, which is disjoint from the concept PLANT, then an inconsistency in the data would develop, and a real error would be detected.

Typically, upon detection of a real error by a knowledge representation system 15, such as the CLASSIC™ Knowledge Representation System, the knowledge representation system 15 will automatically generate an error message, discard the piece of information that has led to the real error and return the knowledge base 20 to a consistent state by removing all of the information that was added to the knowledge base 20 based on the discarded information.

Once an inconsistency is detected following the entry of information in the knowledge base 20, the knowledge representation system 15 will identify all of the individuals in the knowledge base 20 who received information propagated from the individual who the information was initially added to, by referring to a "propagated out" list maintained in the data structure of each individual, as discussed below. In addition, the knowledge representation system 15 will identify those individuals who must be reclassified if the error information is removed from the individual who the information was initially added to, by referring to a "NEG-DEPENDS-ON-ME" list maintained in the data structure of each individual. The knowledge representation system 15 can then remove the added information, undo all of the propagations, and reclassify the appropriate individuals in order to return the knowledge base 20 to a consistent state.

Thus, in a conventional knowledge representation system 15, it is not possible to request an explanation of an object containing an error, and thus identify the source of the error, because the knowledge representation system 15 has automatically discarded the error information in order to maintain the knowledge base 20 in a consistent state.

According to one feature of the invention, however, upon detection of a real error by the error handling subsystem 35, before returning the knowledge base 20 to a consistent state, the error handling subsystem 35 will preferably create an error object which stores all of the information associated with the inconsistent object at a time when the data structures of the object included all of the error information.

In addition, error objects are also preferably created for every object in the knowledge base 20 that is affected by the error, in other words, for all objects in the knowledge base 20 that were modified as a result of the problematic input before the inconsistency was detected. Thus, error objects are preferably created for those individuals listed in the "propagations out" and "NEG-DEPENDS-ON-ME" lists of the individual who the error information was initially added to. In this manner, the user can treat the error objects, which contain the error information, like any other object in the knowledge base 20. Accordingly, the user can print out the information that is stored in the data structures associated with the error objects, or request that a first level explanation or a complete explanation be performed on the object, as discussed further below, in order to identify the source of the error.

The knowledge representation system 15 disclosed herein is particularly suitable for use as a configurator, which may be used, for example, to provide sales proposals or to generate factory orders for manufacturing applications. The explanation subsystem 45 disclosed herein is particularly useful in configurator applications in order to explain the source of derived information generated by the large number of inferences which are typical in such systems. In addition, the knowledge representation system 15 disclosed herein is particularly useful for identifying and explaining the sources of errors in such configuration systems. For a discussion of a particular implementation of a knowledge representation system 15 as a configurator, see Jon R. Wright et al., A Knowledge-Based Configurator that Supports Sales, Engineering, and Manufacturing at AT&T Network Systems, Proc. of the Fifth Innovative Applications Of Artificial Intelligence, Washington, D.C., pp. 183–193 (Jul. 11–15, 1993), reprinted in AI Magazine Vol. 14, No. 3, pp. 69–80 (Fall 1993), incorporated herein by reference.

Generally, a description-based knowledge representation system 15, such as the CLASSIC™ Knowledge Representation System, utilizes three kinds of formal objects to form the basic expressions that are used to create rules and to describe objects in the domain. First, "individuals" are intended to directly represent individual objects in the domain of interest. It is noted that an "individual" need not be a person. Second, "concepts" are descriptions that are applied to individuals. It is noted that the term "object" is defined to be either a "concept" or an individual. Finally, "roles" are formal objects utilized to represent certain properties of individuals. Roles are generally utilized to relate two individuals.

As is well known, a new concept is typically described in a description-based knowledge representation system 15, such as the CLASSIC™ Knowledge Representation System, by means of a concept description which may consist of a list of the more general concepts that are included within the definition of the new concept as well as a list of additional restrictions indicating ways in which the new concept differs from the more general concepts. Similarly, the typical way of describing a new individual in a knowledge representation system 15, such as the CLASSIC™ Knowledge Representation System, is to give a list of concepts that are satisfied by the individual and then to provide a list of additional restrictions specifying the ways in which the new individual differs from the satisfied concepts.

As is well known, the concepts and individuals that are established in a knowledge base, such as the sample knowledge base 20, for a particular domain are put into a hierarchy. In this manner, a more general concept will be above a more specific concept in the hierarchy. Generally, a concept is classified by finding the concepts that are the parents and "children" of the concept being classified, as well as finding all individuals that are direct instances of the concept. An individual is found in the hierarchy underneath all of the concepts in the hierarchy that the individual satisfies. An individual satisfies a concept if the individual satisfies every restriction in the concept definition. In addition, as discussed further below, the knowledge representation system 15 will fire any rules that have been defined where the current concept is the antecedent of the rule on all individuals that satisfy the concept.

Information may also be obtained about individuals in the knowledge base 20 based on certain rules or other inferences, stored in the inference engine 40, that may have been established for the domain. For example, a knowledge base, such as the knowledge base 20, may include a concept VEGETARIAN that is defined to be satisfied if an individual only eats food of the type PLANT. Further, the knowledge base 20 may have a rule stating that anyone who is a VEGETARIAN is known to be a HEALTHY-THING. Thus, in order to classify an individual under the concept VEGETARIAN, the knowledge representation system 15 must know the type of food that the individual eats. However, once an individual is known to be a VEGETARIAN, the knowledge representation system 15 can immediately "fire" the rule and infer that the individual also satisfies the concept HEALTHY-THING.

Each rule is preferably stored in a rule structure, which includes an indication of the antecedent that must be satisfied before the rule fires, as well as an indication of the rule consequent or result, that will occur if the rule antecedent is satisfied. In addition, a rule may also have an associated rule filter, which is a limitation in addition to the rule antecedent that must be present before the rule will fire.

For example, in the above example, there was a rule stating that anyone who is a VEGETARIAN is known to be a HEALTHY-THING. However, a filter may be added to the above rule and thus require that anyone who is a VEGETARIAN and runs at least three miles a day is known to be a HEALTHY-THING. Thus, the added requirement that someone run at least three miles a day in order to be a HEALTHY-THING is said to be a rule filter.

A knowledge representation system 15, such as the CLASSIC™ Knowledge Representation System 15, will often utilize three different types of rules. First, a simple rule, such as the HEALTHY-THING rule just discussed, will typically consist of a rule antecedent, which is a concept, and a rule consequent, which is also a named concept or a concept description. Once an individual is known to satisfy the rule antecedent and filter, if any, the rule is fired and the individual is then deduced to satisfy the named concept or concept description that is the rule consequent.

A description rule is similar to a simple rule. However, a rule consequent for a description rule is defined with a function, which will generate a concept description to be added to the individual when the rule is fired. Thus, the description that is merged into the individual is not specified in advance, but can be based on information that is known about the individual at the time the rule is fired.

A filler rule is similar to a description rule. However, the filler rule also takes a role, and the function generates a list of fillers for the role on the individual when the rule is fired.

ILLUSTRATIVE EXAMPLE

A sample knowledge base 20 is discussed below relative to FIGS. 2 through 10. FIG. 2a provides a graphical illustration of the hierarchical relationship of each of the objects in the sample knowledge base 20 that is defined upon execution of the sample source code, athlete-file, shown in FIG. 2b, by the knowledge representation system 15. Each of the concepts in FIG. 2a, such as the concepts 205 through 208, are presented in FIG. 2a in a rectangle with all capital letters. Each of the individuals in FIG. 2a, such as the individuals 210-211, are presented in FIG. 2a in an oval with leading capital letters only.

As is well known, the concepts 205–208 and individuals 210-211 that are established in a knowledge base, such as the sample knowledge base 20, for a particular domain are put into a hierarchy, as illustrated in FIG. 2a. In this manner, a more general concept will be above a more specific concept in the hierarchy. For example, as shown in FIG. 2a, the concept PARENT 207 is a more specific concept than the concept PERSON 205, because the concept PARENT 207 describes a particular type of PERSON 205.

Generally, a concept is classified by finding the concepts that are the "parents" and "children" of the concept being classified, as well as finding all individuals that are direct instances of the concept. In addition, as discussed further below, the knowledge representation system 15 will fire any rules that have been defined where the current concept is the antecedent of the rule on all individuals that satisfy the concept and any rule filters.

An individual 210-211 is found in the hierarchy underneath all of the concepts 205–208 in the hierarchy that the individual satisfies. An individual satisfies a concept if the individual satisfies every restriction in the concept definition.

The sample knowledge base 20 is defined by the sample source code, athlete-file, shown in FIG. 2b. Following execution of lines 110 through 120 of the sample source code, athlete-file, the primitive concepts 205–207 are established in the knowledge base 20. For example, the concept PARENT 207 that appears in the hierarchy of FIG. 2a is defined in line 120 of the sample source code, athlete-file, to be a type of the concept PERSON 205 that was defined in line 110. Thus, as indicated in FIG. 2a, the concept PARENT 207 will appear in the hierarchy below the more general concept PERSON 205.

It is noted that while a defined concept is described by a set of necessary and sufficient conditions, a primitive concept is a concept that is defined by an incomplete list of necessary conditions. As is well known, for an individual or a more specific concept to be classified under a primitive concept, a user must explicitly state that the individual or more specific concept is an instance of the primitive concept. For example, the primitive concept ATHLETE 206 is classified in the hierarchy of FIG. 2a below the primitive concept PERSON 205 because the user asserted in line 115 of the sample source code, athlete-file, shown in FIG. 2b, that ATHLETE 206 is defined as a subtype of the primitive concept PERSON 205.

As set forth in line 105 of the sample source code, athlete-file, an individual in the sample knowledge base 20 may be further characterized by means of the role or property, child. Thus, a user may specify the children of an individual 210-211 in the sample knowledge base 20.

Finally, the sample knowledge base 20 includes a concept PARENT-OF-ATHLETE 208 which is defined in line 125 of the sample source code, athlete-file, by a compound expression requiring that the individual satisfy the PARENT concept 207, in the manner described above, and adds an additional limitation that all fillers of the child role of the individual must satisfy the concept ATHLETE 206.

Following execution of line 160 of the sample source code, athlete-file, the individuals 210-211 in the sample knowledge base 20 are created. Following execution of line 160, an individual, Mary 211, is created who is asserted to satisfy the concept PARENT-OF-ATHLETE 208 and has her child role filled by the individual, Bill 210. Thus, Mary 211 is classified under the concept PARENT-OF-ATHLETE 208. In addition, because it has been asserted that all of Mary's children are athletes, the knowledge representation system 15 may infer that the filler of Mary's child role, Bill 210, is an ATHLETE. Thus, Bill is classified under the ATHLETE concept 206, as shown in FIG. 2a.

ILLUSTRATIVE DATA STRUCTURES

FIGS. 3 through 10b illustrate a number of illustrative data structures for maintaining information for the individuals or concepts that have been created in the sample knowledge base 20. It is noted that the data structures discussed below are illustrative of a preferred embodiment only, and data structures having different structures or content could be utilized without departing from the scope or spirit of the invention, as would be apparent to one of ordinary skill in the art.

When an individual or concept is created in the knowledge base 20, an entry is created in a symbol table, such as the symbol table 300, shown in FIG. 3. The illustrative symbol table 300 maintains an entry for each symbolic label defined in the sample source code, athlete-file, in a known manner. Each entry in the symbol table 300 identifies the associated symbolic label and includes a pointer to a top-level data structure associated with the concept or individual. For example, as shown in FIG. 3, the symbol table 300 includes an entry 335 for the concept PARENT-OF-ATHLETE 208, which includes a pointer to the top-level data structure associated with the concept, such as the concept data structure 400, discussed further below in conjunction with FIG. 4.

Similarly, as shown in FIG. 3, the symbol table 300 includes an entry 345 for the individual Bill 210, which includes a pointer to the top-level data structure associated with the individual, such as the individual data structure 500, discussed further below in conjunction with FIG. 5.

As discussed further below, each concept and individual that has been established in the knowledge base 20 will have an associated top level data structure, such as the concept data structure 400 and individual data structure 500, respectively. In addition, each concept and individual will have a number of associated lower level data structures, discussed further below relative to FIGS. 6 through 10b. According to a preferred embodiment, each of the types of lower level data structures discussed in FIGS. 6 through 10b will have essentially the same template regardless of whether the data structure is associated with a concept or an individual. For example, the told descriptor data structure 600, discussed below in conjunction with FIG. 6, will preferably have the same data fields regardless of whether the told descriptor data structure 600 is associated with a concept or an individual.

As previously indicated, each concept that is defined in the knowledge base 20 has an associated top-level data structure, such as the illustrative concept data structure 400 shown in FIG. 4. The illustrative concept data structure 400 has been populated with information associated with the concept PARENT-OF-ATHLETE 208. In a preferred embodiment, each concept data structure 400 contains fields 405, 410, 420, 430, 440 and 450, discussed further below, for directly storing information on the associated concept. In addition, each concept data structure 400 includes additional fields 460, 470 and 480, discussed further below, for storing pointers to additional lower level data structures containing additional information for the concept.

As shown in FIG. 4, the concept data structure 400 includes a field 405 for indicating whether the associated concept is itself a primitive concept. Since the concept PARENT-OF-ATHLETE 208 is not a primitive concept, the entry in field 405 has been set to F or FALSE. In addition, the parent and child concepts of the particular concept associated with the concept data structure 400 are stored in the fields 410 and 420, respectively. As indicated in FIG. 2a, the parent concept of the concept PARENT-OF-ATHLETE 208 is the concept PARENT 207, and the concept PARENT-OF-ATHLETE 208 does not have any child concepts.

Further, the concept data structure 400 includes a field 430 that stores the list of individuals that are direct instances of the current concept. As indicated in FIG. 2a, the only instances of the concept PARENT-OF-ATHLETE 208 is the individual Mary 211. Thus, the information that is stored in the fields 410, 420 and 430 is relevant to the hierarchical representation of the knowledge base 20, such as the hierarchy shown in FIG. 2a.

In addition, each concept data structure 400 includes a field 440 for listing all of the local rules for which the current concept is the antecedent of the rule, as described above. The field 450 lists all of the rules that are applicable to the current concept, including the local rules that are listed in the field 440, as well as a list of the additional rules that are applicable to the associated concept through its more general parent concepts.

Figure 6:
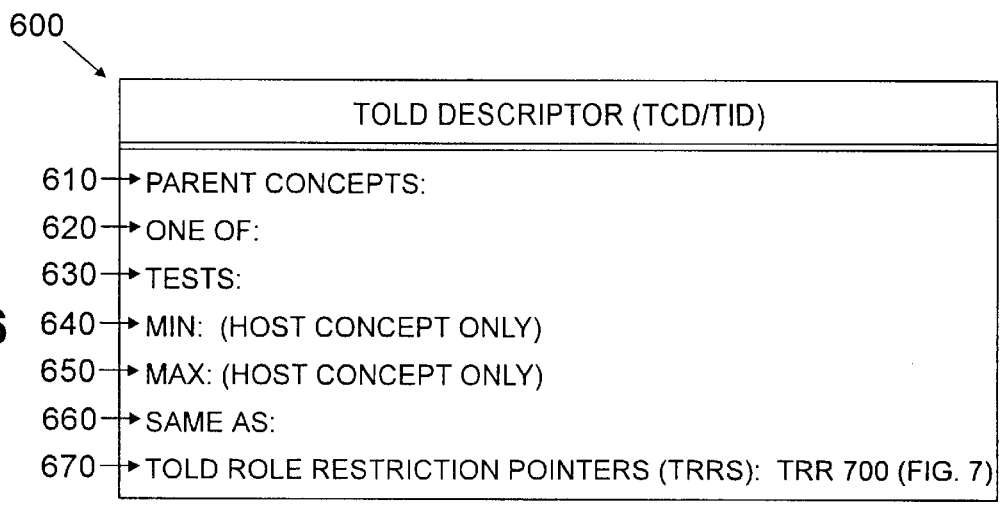
Figure 8:
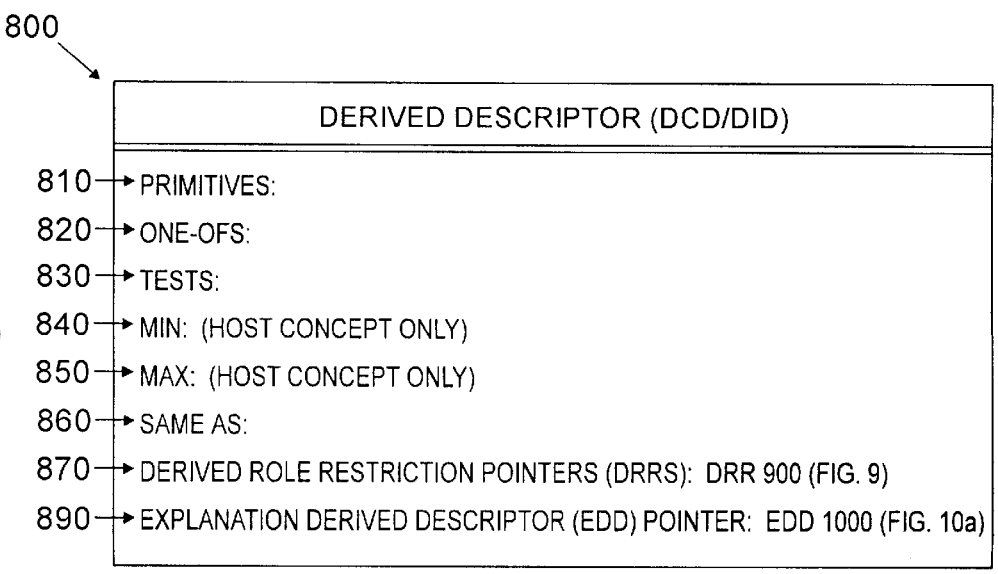

Finally, each concept data structure 400 preferably includes three fields 460, 470 and 480 which contain pointers to lower level data structures containing further information associated with the current concept. A pointer to a derived concept descriptor (DCD) data structure 800, discussed further below relative to FIG. 8, is stored in the field 460. A pointer to a told concept descriptor (TCD) data structure 600, discussed further below relative to FIG. 6, is stored in the field 470. Finally, a pointer back to the entry 335 for the current concept in the symbol table 300, shown in FIG. 3, is stored in the field 480.

As previously indicated, each individual that is defined in the knowledge base 20 has an associated top-level data structure, such as the illustrative individual data structure 500 shown in FIG. 5. The illustrative individual data structure 500 has been populated with information associated with the individual Bill 210. In a preferred embodiment, each individual data structure 500 contains fields 510, 520, 530, 540, 550 and 560, discussed further below, for directly storing information on the associated individual. In addition, each individual data structure 500 includes additional fields 570, 580 and 590, discussed further below, for storing pointers to additional lower level data structures containing further information for the associated individual.

As shown in FIG. 5, a listing of the parent concepts that the individual associated with the individual data structure 500 satisfies are stored in the field 510. As indicated in FIG. 2a, the individual Bill 210 satisfies the parent concept ATHLETE 206. Thus, the information that is stored in the field 510 is relevant to the hierarchical representation of the knowledge base 20, such as the hierarchy shown in FIG. 2a.

It is noted that a knowledge representation system 15 typically calculates and maintains the dependency relationships between pieces of information in the knowledge base 20 in order to efficiently update related information that is dependent upon information that is added or updated in the knowledge base 20. The dependency information associated with the current individual is preferably stored in the field 520. For a detailed discussion of the manner in which a knowledge representation system 15 maintains dependency information, and in particular, the maintenance of dependency information that is implicated upon execution of user-defined procedural test functions, see our contemporaneously filed U.S. patent application Ser. No. 08/247,722 entitled "KNOWLEDGE BASE SYSTEM WITH DEPENDENCY INFORMATION FOR PROCEDURAL TESTS", (Attorney Docket No. McGuinness 1-1-1), which is assigned to the assignee of the present invention, and incorporated herein by reference.

As is well known, information about one individual may be propagated to another individual. For example, as discussed above relative to FIGS. 2a and 2b, the fact that Bill 210 was an ATHLETE 206 was propagated onto Bill 210 from Mary 211. Thus, as discussed further below, the knowledge representation system 15 preferably maintains a listing of propagations and inverse-role propagations that are propagated into and out of the current individual in the fields 530, 540, 550 and 560.

In a preferred embodiment, if a piece of derived information is calculated during normalization for an individual based on a propagation, the knowledge representation system 15 will preferably generate a propagation list associated with the piece of propagated information and place the propagation list in the "propagations in" field 530 of the individual's data structure 500. The generated propagation list preferably includes an indication of the individual the information was propagated from, the role-path along which the information was propagated, and the information that was actually propagated, as shown in FIG. 5 for the individual Bill 210.

In addition, if a piece of derived information is calculated during normalization for an individual based on a inverse-role propagation, the knowledge representation system 15 will preferably generate an inverse-role propagation list associated with the piece of propagated information and place the generated propagation list in the "inverse-role propagations in" field 550 of the individual's data structure 500. The generated inverse-role propagation list preferably includes an indication of the individual from which the information was propagated from, and an indication of the role that the information was propagated along.

For example, if a sample knowledge base 20 has defined the roles Husband and Wife to be inverse-roles and a user has asserted that an individual, Bob, has a wife, Mary, then Mary's husband must be Bob. Thus, Mary's husband role is filled with Bob during normalization and an inverse-role propagation list is created listing that the information was propagated from Bob into Mary's husband role.

Finally, each individual data structure 500 preferably includes three fields 570, 580 and 590 which contain pointers to lower level data structures which contain additional information on the associated individual. Specifically, a pointer to a derived individual descriptor (DID) data structure 800, discussed further below relative to FIG. 8, is stored in the field 570. A pointer to a told individual descriptor (TID) data structure 600, discussed further below relative to FIG. 6, is stored in the field 580. Finally, a pointer back to the entry, such as the entry 345, for the current individual in the symbol table 300, shown in FIG. 3, is stored in the field 590.

An illustrative told descriptor data structure 600, shown in FIG. 6, preferably stores the told information that has been asserted by the user about the associated concept or individual. It is noted that when a told descriptor data structure 600 is associated with a concept it may be referred to as a told concept descriptor (TCD). Similarly, when a told descriptor data structure 600 is associated with an individual it may be referred to as a told individual descriptor (TID). As previously indicated, the told descriptor data structure 600 for a particular object is accessed by retrieving the appropriate pointer from the respective entry in the top level data structure, such as from the field 470 of the concept data structure 400 for a concept or from the field 580 of the individual data structure 500 for an individual, shown in FIGS. 4 and 5, respectively.

Each told descriptor data structure 600 will include a field 610 for storing each of the parent concepts that the associated object has been asserted to satisfy. In addition, the told descriptor data structure 600 preferably includes fields 620, 630, 640, 650 and 660 for storing the asserted restrictions associated with the one-of, test, min, max, and same-as aspects of the associated object, respectively. Finally, each told descriptor data structure 600 includes a field 670 for storing a list of pointers to the told role restriction (TRR) data structure, such as the data structure 700 illustrated in FIG. 7, for storing the asserted information on each defined role for the current object. As discussed below, a told role restriction (TRR) data structure 700 is preferably associated with each role and particular object in the knowledge base 20 where the role has been restricted on the object.

For example, the told descriptor data structure (TCD) 600 associated with the concept PARENT-OF-ATHLETE 208 will have its parent concepts field 610 populated with the concept PARENT 207, because the concept PARENT-OF-ATHLETE 208 was asserted in line 125 of the source code, athlete-file, to be a subtype of the concept PARENT 207.

Figure 7:
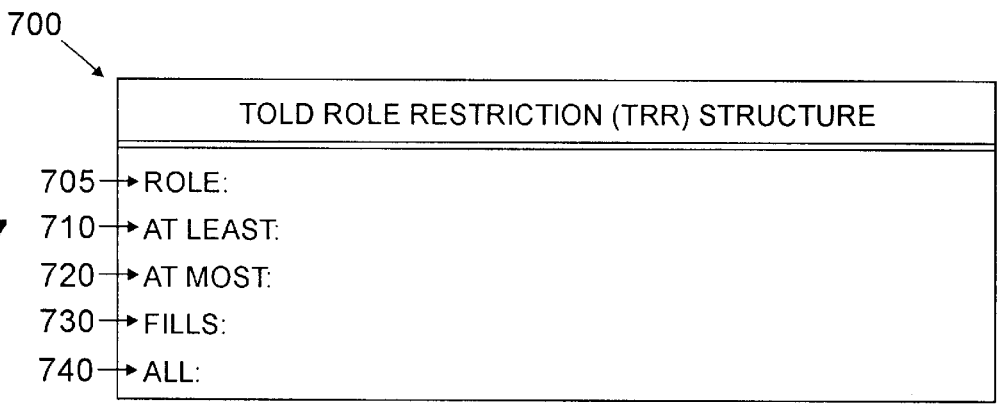

An illustrative told role restriction (TRR) data structure 700, shown in FIG. 7, associated with a particular role and object, preferably stores the told information that has been asserted by the user for the object about the particular role. As previously indicated, the told role restriction (TRR) data structure 700 for a particular role is accessed by retrieving the appropriate pointer from the TRR pointer field 670 in the told descriptor data structure 600 associated with the object.

Each told role restriction (TRR) data structure 700 will preferably include fields 710, 720, 730, and 740 for storing the asserted restrictions associated with the at-least, at-most, fills and all aspects of the associated role and object, respectively. In addition, an indication of the role identifier will be stored in the field 705.

For example, the told role restriction (TRR) data structure 700 associated with the child role of the individual Mary 211 will have its fills field 730 populated with the individual Bill 210, because the individual Mary 211 was asserted in line 160 of the source code, athlete-file, to have its child role filled with Bill 210.

An illustrative derived descriptor data structure 800, shown in FIG. 8, preferably stores the derived information that has been inferred about the current object. It is noted that when a derived descriptor data structure 800 is associated with a concept it may be referred to as a derived concept descriptor (DCD). Similarly, when a derived descriptor data structure 800 is associated with an individual it may be referred to as a derived individual descriptor (DID). As previously indicated, the derived descriptor data structure 800 for a particular object is accessed by retrieving the appropriate pointer from the respective entry in the top level data structure, such as the field 460 of the concept data structure 400 for a concept or field 570 of the individual data structure 500 for an individual, shown in FIGS. 4 and 5, respectively.

Each derived descriptor data structure 800 will include a field 810 for storing each of the primitive concepts that the associated object has been asserted to satisfy or received through other inferences, such as inheritance. In addition, the derived descriptor data structure 800 preferably includes fields 820, 830, 840, 850 and 860 for storing the restrictions associated with the one-of, test, min, max, and same-as aspects of the associated object, respectively. Each derived descriptor data structure 800 also includes a field 870 for storing a list of pointers to derived role restriction (DRR) data structures, such as the data structure 900 illustrated in FIG. 9. As discussed below, a derived role restriction (DRR) data structure 900 is preferably associated with each role and particular object in the knowledge base 20 where the role has been restricted on the object. Finally, each derived descriptor data structure 800 also includes a field 890 for storing a pointer to an explanation derived descriptor (EDD) data structure 1000 which will store explanation information for the associated information stored in the other fields of the derived descriptor 800.

Figure 9:
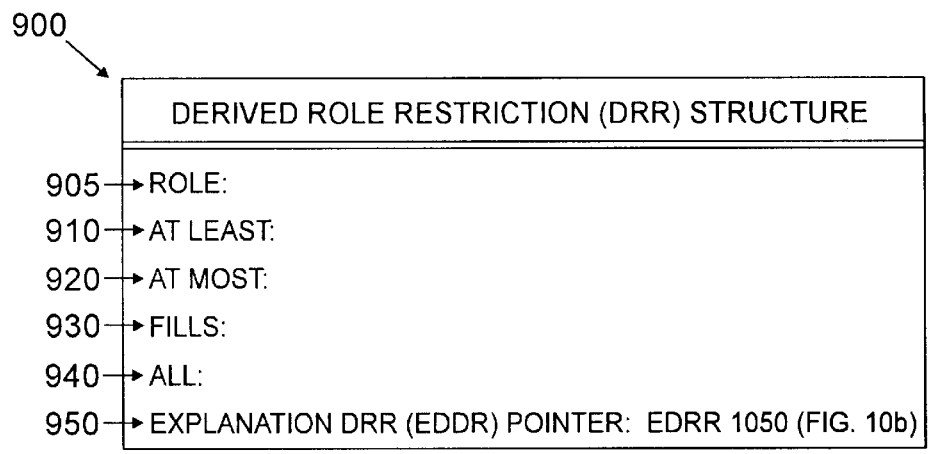

An illustrative derived role restriction (DRR) data structure 900, shown in FIG. 9, associated with a particular role and object, preferably stores the information that has been derived for the object about the particular role. As previously indicated, the derived role restriction (DRR) data structure 900 for a particular role and object is accessed by retrieving the appropriate pointer from the DRR pointer field 870 in the derived descriptor data structure 800 associated with the object.

Each derived role restriction (DRR) data structure 900 will preferably include fields 910, 920, 930, and 940 for storing the derived restrictions associated with the at-least, at-most, fills and all aspects of the associated role and object, respectively. In addition, an indication of the role identifier will be stored in the field 905. Further, each derived role restriction (DRR) data structure 900 also includes a field 950 for storing a pointer to an explanation DRR data structure 1050 which may store explanation information for the associated information stored in the other fields of the derived role restriction (DRR) data structure 900.

For example, the derived role restriction (DRR) data structure 900 associated with the child role of the individual Mary 211 will have the all field 940 populated with an indication that all of Mary's children must be athletes. This information has been inherited from the concept PARENT-OF-ATHLETE 208, which Mary has been asserted to satisfy.

Figure 10A:
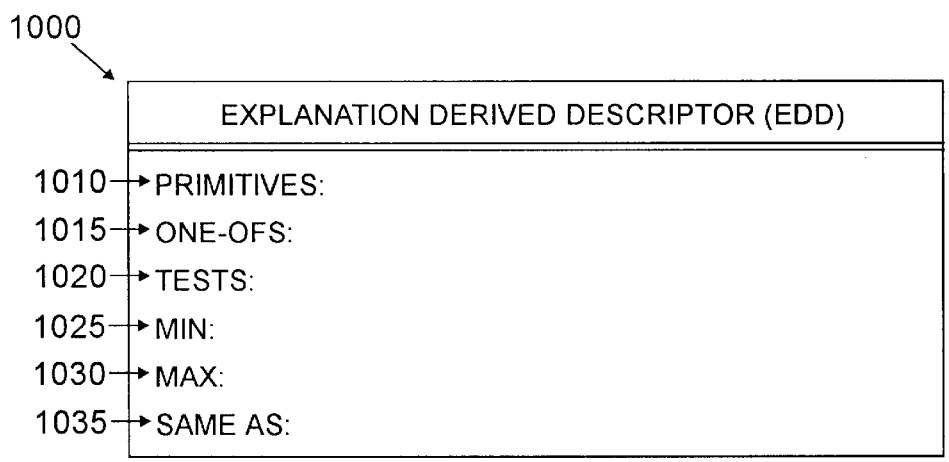

An illustrative explanation derived descriptor (EDD) data structure 1000 is shown in FIG. 10a. As previously indicated, the explanation derived descriptor (EDD) data structure 1000 will store explanation information for the information stored in the derived descriptor 800 associated with a particular object, in a manner described further below. Thus, the explanation derived descriptor (EDD) data structure 1000 preferably includes many of the same fields as the derived descriptor 800 for storing the corresponding explanation information. Specifically, the explanation derived descriptor (EDD) data structure 1000 preferably includes fields 1010, 1015, 1020, 1025, 1030 and 1035 for storing the explanation on the primitive, one-of, test, min, max and same-as aspects, respectively. For example, the primitive field 1010 in the explanation derived descriptor (EDD) data structure 1000 will include explanation information that explains where the information in the primitives field 810 of the derived descriptor 800 was obtained from.

Figure 10B:
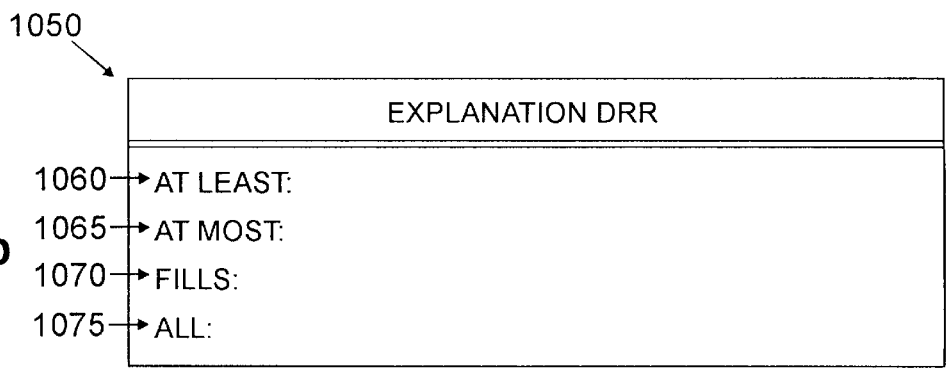

An illustrative explanation DRR data structure 1050 is shown in FIG. 10b. As previously indicated, the explanation DRR data structure 1050 will store explanation information for the information stored in the derived role restriction (DRR) data structure 900 associated with a particular object and role, in a manner described further below. Thus, the explanation DRR data structure 1050 preferably includes many of the same fields as the derived role restriction (DRR) data structure 900 for storing the corresponding explanation information. Specifically, the explanation DRR data structure 1050 preferably includes fields 1060, 1065, 1070 and 1075 for storing explanations on the restrictions associated with the at-least, at-most, fills and all aspects of the associated role and object, respectively. For example, the at least field 1060 in the explanation DRR data structure 1050 will include explanation information that explains where the information in the at least field 910 of the derived role restriction (DRR) data structure 900 was obtained from.

EXPLANATION SUBSYSTEM PROCESSES

As previously indicated, the explanation subsystem 45 includes a number of functions for providing various explanation facilities. A first level explanation function 50, discussed below in a subsection entitled First Level Explanation Function, provides a user with an explanation of where the derived information that is stored for an object in the knowledge base 20 was obtained from. While the first level explanation function 50 will explain the immediate source of a piece of information, the first level explanation will not explain how the immediate source of the information in turn received the information, as discussed further below.

In addition, an object subsumption explanation function 65 and a rule firing explanation function 70, discussed below in a subsection entitled Explanation of Subsumption Inferences, provide a user with an explanation of subsumption inferences. In other words, these functions provide an indication of why a particular object in the knowledge base 20 is subsumed by a particular concept or rule antecedent.

According to another feature of the invention, a complete explanation function 55, discussed further below in a subsection entitled Complete Explanation Function, provides a user with a complete explanation of the source of information by tracing back the source of each piece of information until it reaches the point that the source of the information is told information which has been asserted by the user or is the result of a rule firing.

According to yet another feature of the invention, the explanation that is generated by the various explanation functions may be limited in a number of ways. First, when a user requests either a first level explanation or a complete explanation for an object in the knowledge base 20, the user can specify on the command line that the explanation should be limited to a particular role-path or aspect. In addition, the pruning variables discussed above allow a user to limit the scope of the explanation in a number of ways. In this manner, the explanation output that is presented to the user is more manageable, and is limited to the information that the particular user is interested in.

It is noted that the various ways discussed below in which explanation may be limited is for illustrative purposes only. Additional pruning variables could be added as desired, as would be apparent to one skilled in the art based on the discussion which follows. In addition, a mechanism could be added to the processes which follow such that a user could request on the command line that the explanation that is generated be limited to a discussion of one particular filler of a particular aspect. In this manner, the explanation subsystem 45 will only generate explanation objects that are relevant to the requested aspect filler.

First Level Explanation Function

Figure 11:
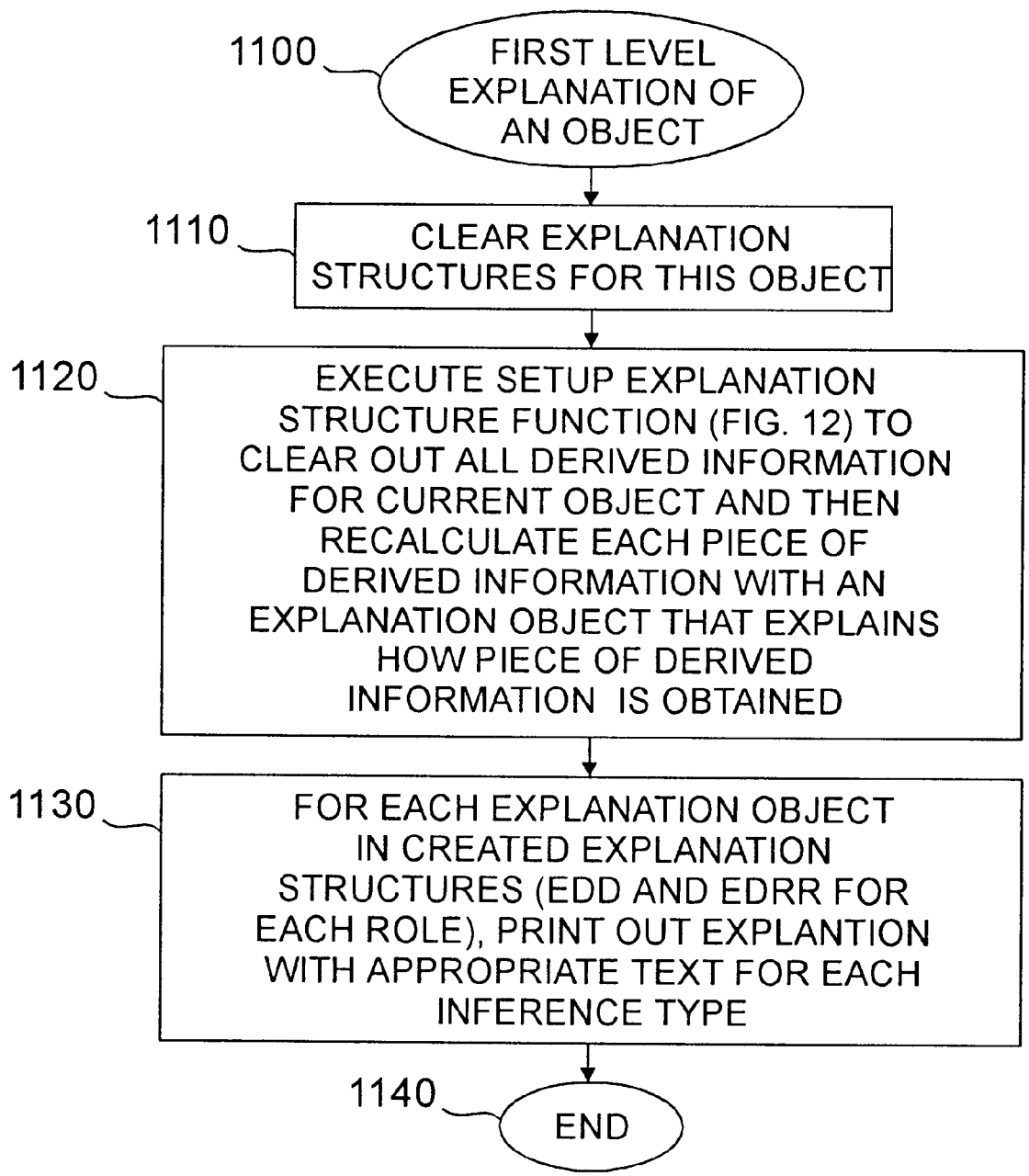
FIG. 11 is a flow chart describing an exemplary first level explanation function as utilized by the knowledge representation system in explaining the immediate source of derived information for an object in the knowledge base.

As illustrated in FIG. 11, the first level explanation function 50 embodying principles of the present invention will be entered at step 1100. As previously indicated, each object in the knowledge base 20 will have associated explanation data structures for storing explanation information for the associated object. Specifically, each object in the knowledge base 20 will have an associated explanation derived descriptor (EDD) data structure 1000, shown in FIG. 10a, for explaining the information that is stored in the derived descriptor data structure (DCD/DID) 800 associated with the object being explained. In addition, for each role defined in the knowledge base 20, the object will have an explanation DRR (EDRR) data structure 1050, shown in FIG. 10b, for explaining the information that is stored in the associated derived role restriction (DRR) data structure 900 for the object.

Each of the EDD and EDRR data structures associated with the current object being explained are preferably cleared during step 1110. Thereafter, a setup explanation structure function 58, discussed below in conjunction with FIG. 12, is executed during step 1120. As discussed below, the setup explanation structure function 58 will clear out all of the derived information that is known for the current object being explained and will then recalculate each piece of the derived information. Generally, as each piece of derived information is recalculated, the setup explanation structure function 58 will generate one or more explanation objects that explain how the piece of derived information was obtained. The generated explanation objects will be placed in the appropriate field of the explanation data structures, EDD and EDRRs, that correspond to the piece of explained information. Each explanation object generated by the setup explanation structure function 58 will indicate the inference that created the piece of information for the current object being explained.

After execution of the setup explanation structure function 58, the first level explanation function 50 will print out the explanation information during step 1130. For each explanation object that was created during execution of the setup explanation structure function 58, the first level explanation function 50 will print out an explanation with a message that is appropriate for the particular type of inference associated with the explanation object. As indicated in FIG. 1, an explanation text library 90 is preferably maintained which contains an appropriate text message for each inference type.

In a preferred embodiment, a pruning variable can be provided under user control to limit the number of expressions printed in any sequence to a previously specified amount. For example, if a concept definition is comprised of a number of components, and if the print pruning variable has been set to indicate that the print length should be limited to three items, then only the first three items in the concept definition should be printed.

After each of the generated explanation objects have been printed out, program control will proceed to step 1140, where execution of the first level explanation function 50 will terminate.

Figure 12A:
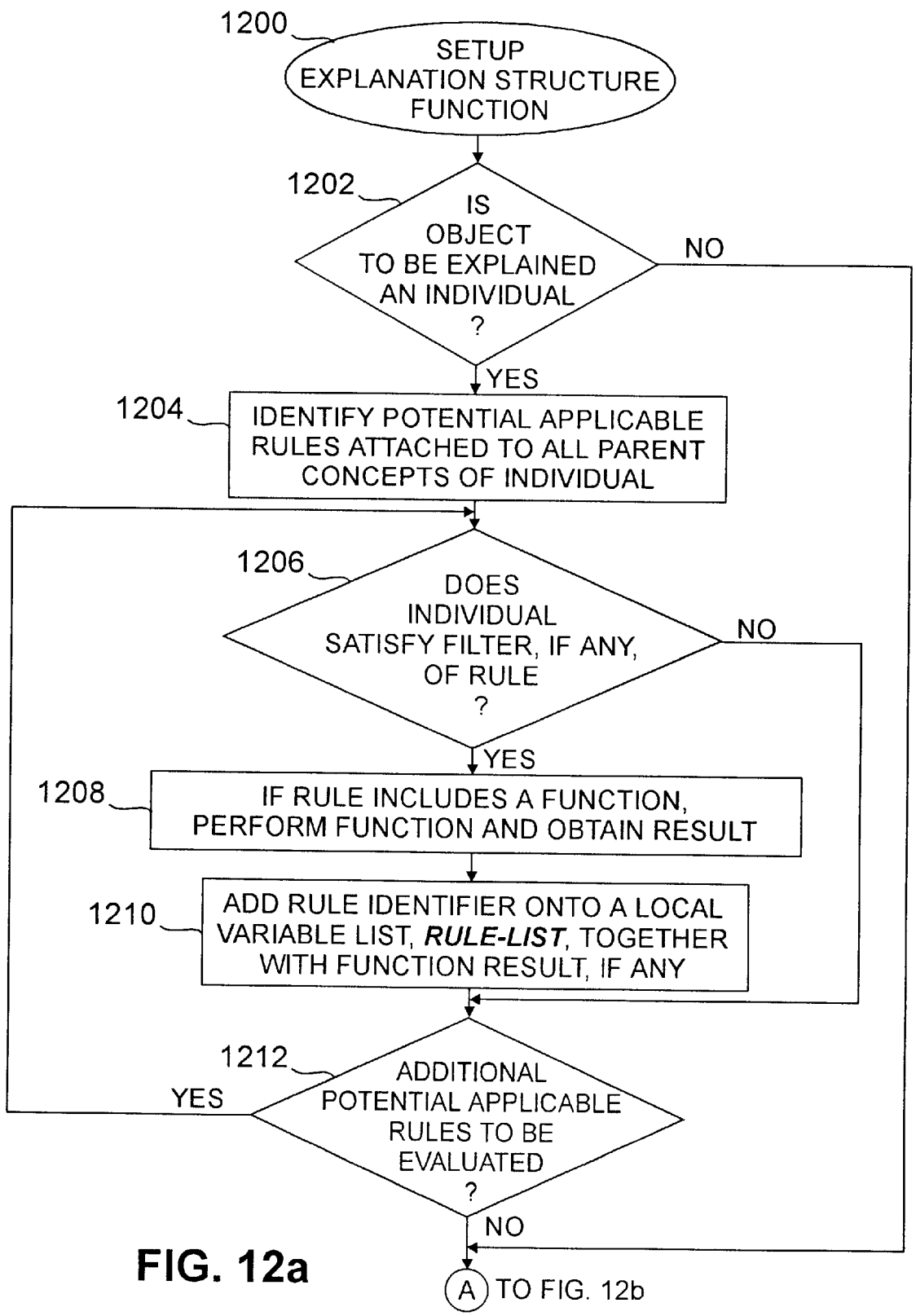
FIGS. 12a through 12f, collectively are a flow chart describing an exemplary setup explanation structure function as utilized by the first level explanation function of FIG. 11 and a complete explanation function illustrated in FIG. 17 to clear out the derived information for a particular object being explained and then to recalculate the derived information while maintaining an indication of how each piece of the rederived information was obtained.
Figure 12B:
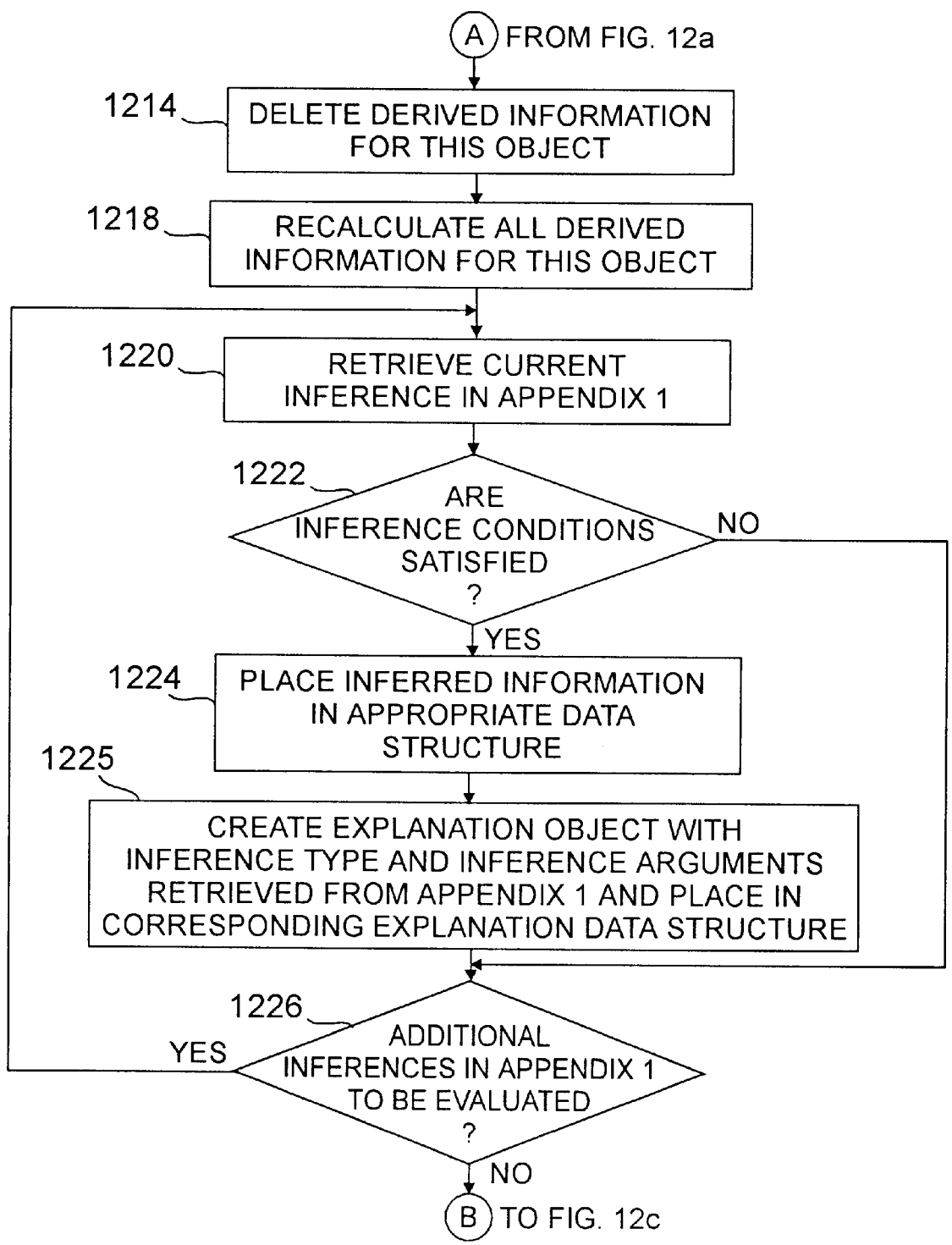
Figure 12C:
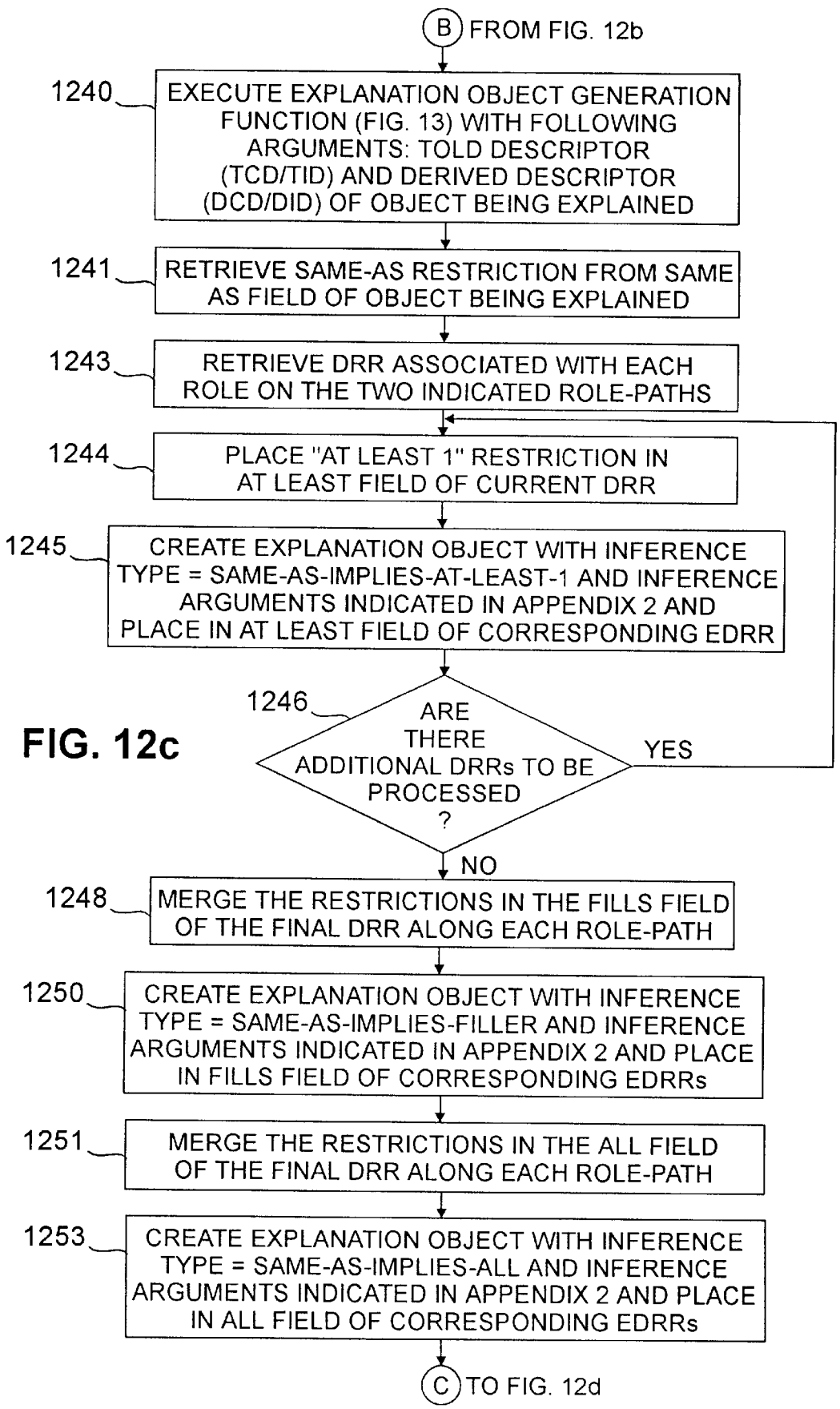
Figure 12D:
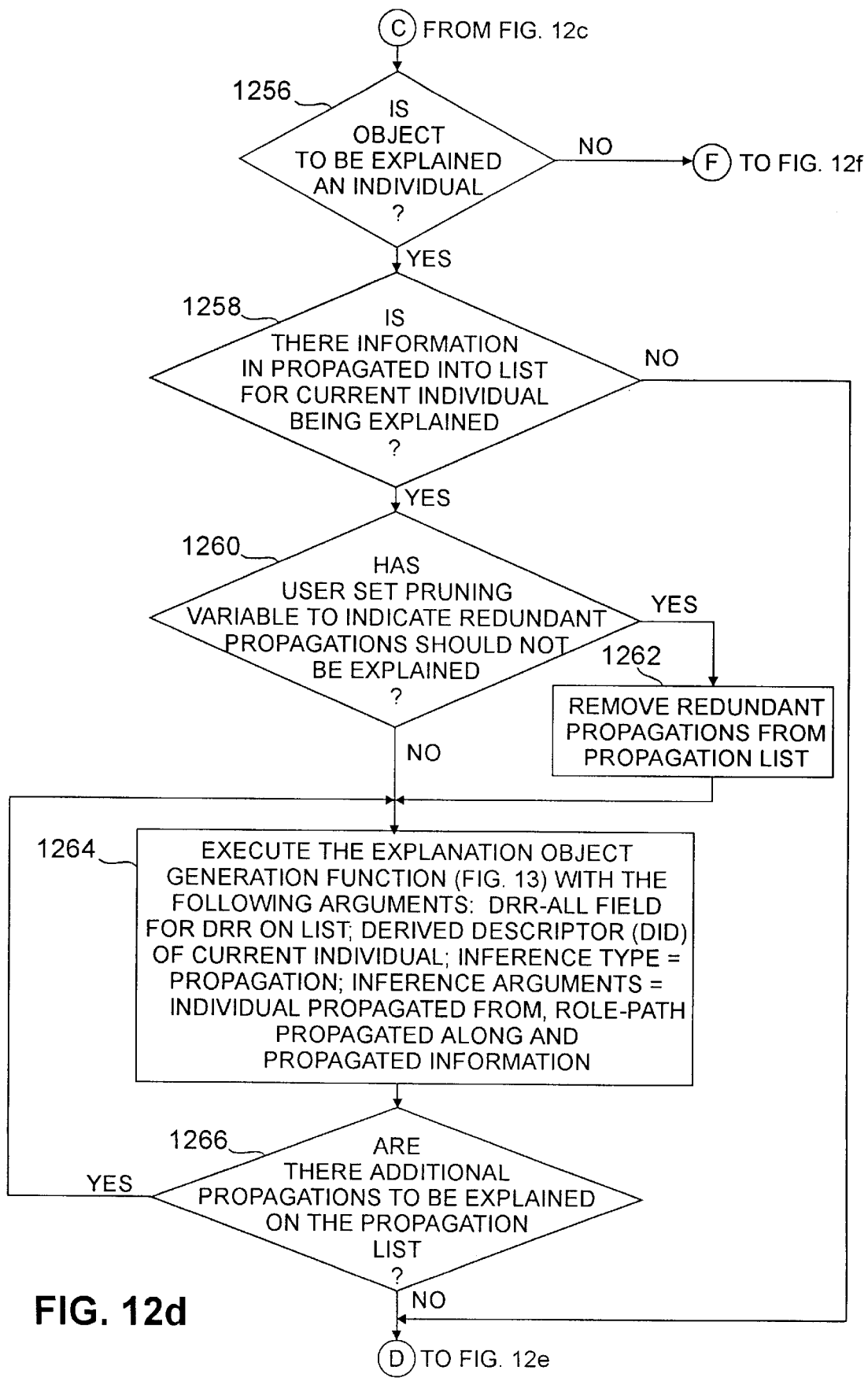
Figure 12E:
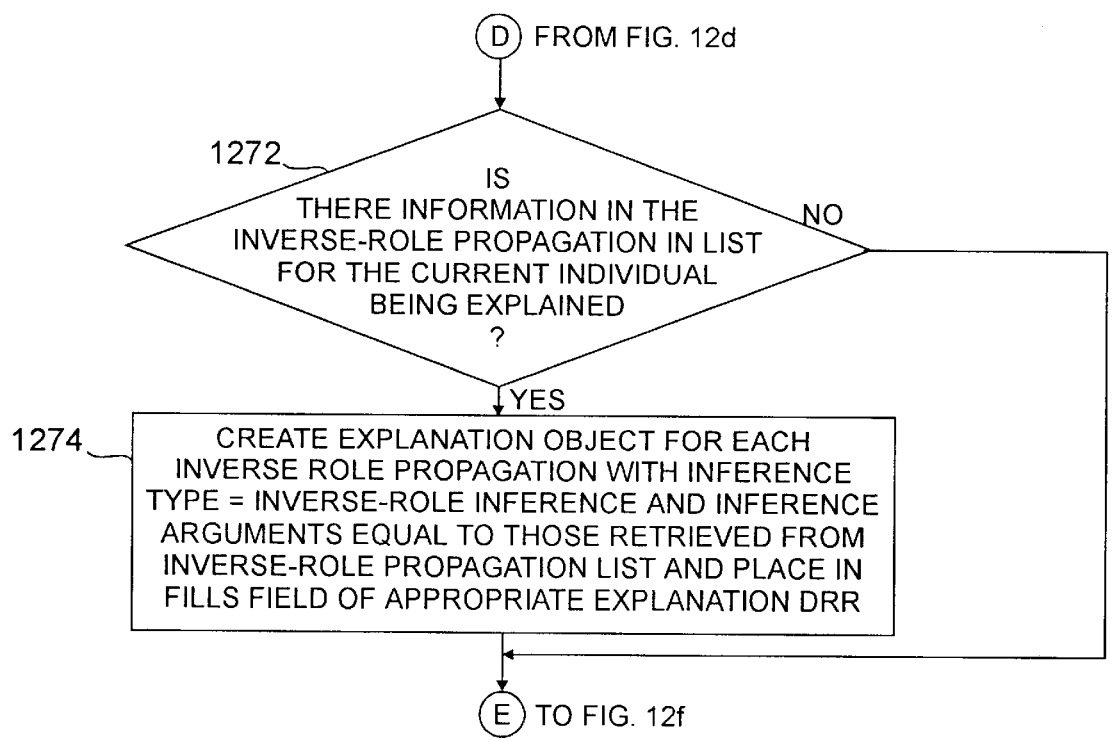

As illustrated in FIG. 12a, the setup explanation structure function 58 embodying principles of the present invention will be entered at step 1200. It is noted that the setup explanation structure function 58 will be entered from the first level explanation function 50, as discussed above, or from the complete explanation function 55, as discussed below in conjunction with FIG. 17. In addition, the setup explanation structure function 58 could be executed, on its own, without performing the first level explanation function 50 or the complete explanation function 55, in order to setup desired explanation structures.

As previously indicated, the setup explanation structure function 58 will clear out all of the derived information that is known for the current object being explained and then recalculate each piece of the derived information while maintaining an indication of how the piece of rederived information was obtained. The generated explanation objects will be placed in the appropriate field of the explanation data structures, EDD and EDRRs, that correspond to the piece of explained information. It is noted that the setup explanation structure function 58 is merely illustrative of one implementation, and the order in which particular inferences are processed generally does not matter.

The setup explanation structure function 58 includes a preliminary rule analysis section which is performed during steps 1202–1212. The preliminary rule analysis section is executed prior to deleting the derived information during step 1214 on the current object being explained because some of the derived information may be necessary to evaluate the rule filters, if any, which may be associated with the rules.

As is well known, rules in a knowledge representation system 15 are only fired on individuals. Thus, a test is performed during step 1202 to determine if the current object being explained is an individual. If it is determined during step 1202 that the current object being explained is not an individual, but rather is a concept, the preliminary rule analysis section is not applicable and program control will proceed to the normalization section, which begins at step 1214.

If, however, it is determined during step 1202 that the current object being explained is an individual, the rules that are potentially applicable to the current individual being explained are identified during step 1204. As previously indicated, the data structure associated with each of the parent concepts that the current individual satisfies, such as the concept data structure 400 shown in FIG. 4, may be accessed by first referring to the "parent concept" field 510 in the data structure associated with the current individual, such as the individual data structure 500 shown in FIG. 5. Thereafter, the list of applicable rules may be retrieved from the field 450 of each parent concept that the individual satisfies.

The individual will be evaluated against each of the potentially applicable rules during steps 1206 through 1210 to determine if the rule fired on this individual. A test is performed during step 1206 to determine if the current individual satisfies the filter, if any, of each potentially applicable rule. If it is determined during step 1206 that the individual does not satisfy the filter, if any, of the potentially applicable rule, then program control will proceed to step 1212.

If, however, it is determined during step 1206 that the individual does satisfy the filter, if any, of the potentially applicable rule, then if the rule includes a function as part of the rule definition, in other words, for description and filler rules, the function is performed on the individual during step 1208, and the function result is obtained. Thereafter, the rule identifier and function result, if any, are added onto a local variable, rule-list, during step 1210.

A test is performed during step 1212 to determine if there are additional potentially applicable rules to be tested. If it is determined during step 1212 that there are additional potentially applicable rules to be tested, program control will return to step 1206 and proceed in the manner described above.

If, however, it is determined during step 1212 that there are no additional potentially applicable rules to be tested, program control will proceed to the normalization section beginning at step 1214.

The derived information that has been stored in the data structures for the current object being explained, such as in the derived descriptor (DCD/DID) 800 shown in FIG. 8 and the derived role restriction data structure 900 for each of the roles of the object, are preferably deleted during step 1214.

Thereafter, the derived information for the object being explained is recalculated during step 1218 in a conventional manner. The setup explanation structure function 58 will preferably process each of the normalization inferences listed in Section 1 during steps 1220–1226, in order to determine if the information stored for the current object being explained satisfy the conditions of any inferences listed in Section 1. If it is determined that the conditions of one or more inferences are satisfied, the appropriate inferred information is placed in the appropriate data structure, and an explanation object indicating the inference type and inference arguments, if any, is generated to explain the source of the piece of inferred information.

Thus, the current inference is retrieved during step 1220 from Section 1, together with the conditions necessary to implicate the inference. Thereafter, a test is performed during step 1222 to determine if the current inference is satisfied. If it is determined during step 1222 that the current inference is not satisfied, program control will proceed to step 1226, discussed below.

If, however, it is determined during step 1222 that the current inference is satisfied, then the appropriate inferred information is placed in the proper field of the appropriate data structure during step 1224, in accordance with the information provided in Section 1. Thereafter, an explanation object is created during step 1225 with the current inference type and appropriate inference arguments, if any, as indicated in the entry of Section 1 for the current inference type. The created explanation object is placed in the corresponding explanation structure, EDD or EDRR, during step 1225.

A test is performed during step 1226 to determine if there are additional inferences in Section 1 to be evaluated. If it is determined during step 1226 that there are additional inferences to be evaluated, program control will return to step 1220 and proceed in the manner described above.

If, however, it is determined during step 1226 that there are no additional inferences in Section 1 to be evaluated, program control will proceed to step 1240 in order to process the derived information that has been told by the user or inherited from told information.

The explanation for the told information that has been asserted by the user about the current object being explained, as well as the explanation of information that has been inherited from concepts which the user has asserted that the current object satisfies, is processed during step 1240 by an explanation object generation function 60, discussed further below in conjunction with FIGS. 13*a* through 13*i*. In order that the explanation object generation function 60 can compare the told information with the derived information to identify the pieces of the derived information which came from told information, the explanation object generation function 60 will be passed the told descriptor (TCD/TID) 600 and the derived descriptor (DCD/DID) 800 of the current object being explained, such as the data structures shown in FIGS. 6 and 8, respectively.

Thereafter, the setup explanation structure function 58 will process the "same-as" normalization inferences listed in Section 2 during steps 1241–1253. In the CLASSIC™ Knowledge Representation System, a same-as restriction may only be applied to an attribute, which is a particular type of role having at most one filler, such as the Sex role, which may have the filler male or female. Applied to the present invention, a same-as restriction can be defined for an individual in the knowledge base 20 so that the filler of the individual's best friend role is the same as the filler of the individual's lawyer role, meaning that the individual's lawyer is also her best friend, and vice versa.

Once a same-as restriction is applied to a particular role, it may be inferred, based on the inference, same-as-implies-at-least-1, that there is at least one filler for each role in the two role paths indicated in the same as restriction. It is noted that a particular role-path may include more than one role. For example, the role-path "best friend's father" includes the roles, best friend, and also the final role in the role-path, father of the best friend.

Thus, the same-as restriction is retrieved during step 1241 from the same-as field 860 of the derived descriptor data structure (DCD/DID) 800 of the object being explained. Thereafter, the setup explanation structure function 58 will retrieve during step 1243 each DRR associated with each role in the two role-paths. An "at least 1" restriction is preferably placed in the at least field 910 of the current DRR during step 1244. In addition, an explanation object is created during step 1245 to identify the source of the "at least 1" restriction by indicating that the inference type is the inference, same-as-implies-at-least-1, together with the inference arguments listed in Section 2. The created explanation object is placed in the at least field 1060 of the corresponding EDRR (FIG. 10*b*).

Thereafter, a test is performed during step 1246 to determine if there are additional DRRs to be processed. If it is determined during step 1246 that there are additional DRRs to be processed, program control will return to step 1244 and continue in the manner described above. If, however, it is determined during step 1246 that there are no additional DRRs to be processed, program control will proceed to step 1248, discussed below.

In addition, due to other same-as inferences discussed below, the fills field 930 and the all field 940 of the final DRR (FIG. 9) in each of the two same-as role paths must be populated with the same information. Thus, the restrictions of the fills field 930 in each of the final DRRs along the two role-paths are merged during step 1248, to place the same information in both fields. Thereafter, an explanation object is created during step 1250 to identify the source of the merged fills restriction by indicating that the inference type is the inference, same-as-implies-filler, together with the inference arguments listed in Section 2. The created explanation object is placed in the fills field 1070 of the corresponding EDRR (FIG. 10b).

In addition, the restrictions of the all field 940 in each of the final DRRs along the two role-paths are merged during step 1251, to place the same information in both fields. Thereafter, an explanation object is created during step 1253 to identify the source of the merged all restrictions by indicating that the inference type is the inference, same-as-implies-all, together with the inference arguments listed in Section 2. The created explanation object is placed in the all field 1075 of the corresponding EDRR (FIG. 10b).

Information based on propagations, inverse-role propagations and rule firings are inferred only to individuals. Thus, a test is performed during step 1256, prior to executing the propagation, inverse-role propagation and rule firing sections, to determine if the current object being explained is an individual. If it is determined during step 1256 that the current object being explained is not an individual, but rather is a concept, the propagation, inverse-role propagation and rule firing sections are not applicable and program control will proceed to step 1298 (FIG. 12f), discussed below.

If, however, it is determined during step 1256 that the current object being explained is an individual, a test is performed during step 1258 to determine if there is information in the "propagated into" field 530 of the individual data structure 500 (FIG. 5) associated with the current individual being explained. If it is determined during step 1258 that there is no information in the "propagated into" field 530 associated with the current individual being explained, program control will proceed to step 1272 (FIG. 12e) and proceed in the manner described below.

If, however, it is determined during step 1258 that there is information in the "propagated into" field 530 associated with the current individual being explained, then a test is performed during step 1260 to determine if the user has set the pruning variables, discussed above, to indicate that redundant propagations should not be explained. If it is determined during step 1260 that the user has set the pruning variables to indicate that redundant propagations should not be explained, then the redundant propagations should be removed from the propagation list that was retrieved from the propagations in field 530 of the individual's data structure 500. In other words, if there is a role hierarchy, and a first propagation is propagated along an identical or more specific role-path than a second propagation, and the first propagation propagates an identical or more specific restriction than the second propagation, then remove the second propagation from the list. For example, if a knowledge base 20 includes a role hierarchy consisting of the roles Sibling and Brother, and they both propagate a piece of information to an individual, then the propagation associated with the more general role, Sibling, should not be explained.

The explanation for the information that has been propagated onto the current individual being explained is processed during step 1264 by the explanation object generation function 60, discussed further below in conjunction with FIGS. 13a through 13i. As previously indicated, when the propagated information is calculated during normalization in a known manner, the knowledge representation system 15 will generate a propagation list for each piece of propagated information, which includes an indication of the individual the information was propagated from, the role-path along which the information was propagated, and the information that was actually propagated. The propagation list is then stored in the propagation in field 530 of the individual data structure 500 of the associated individual. The explanation object generation function 60 will be passed the All field 940 of the derived role restriction (DRR) data structure 900 indicated on the propagation list, as well as the derived descriptor (DCD/DID) 800 of the current individual being explained, such as the data structure shown in FIG. 8. In addition, the inference type will be set to propagation and the inference arguments will be set to the information retrieved from the propagation list, in other words, an indication of the individual the information was propagated from, the role-path along which the information was propagated and the propagated information.

Thereafter, a test is performed during step 1266 to determine if there are additional propagations on the propagation list to be evaluated. If it is determined during step 1266 that there are additional propagations on the propagation list to be evaluated, program control will return to step 1264, and continue in the manner described above.

If, however, it is determined during step 1266 that there are no additional propagations on the propagation list to be evaluated, program control will proceed to the inverse-role propagation explanation section which begins at step 1272 (FIG. 12e), and continue in the manner described below.

Figure 12F:
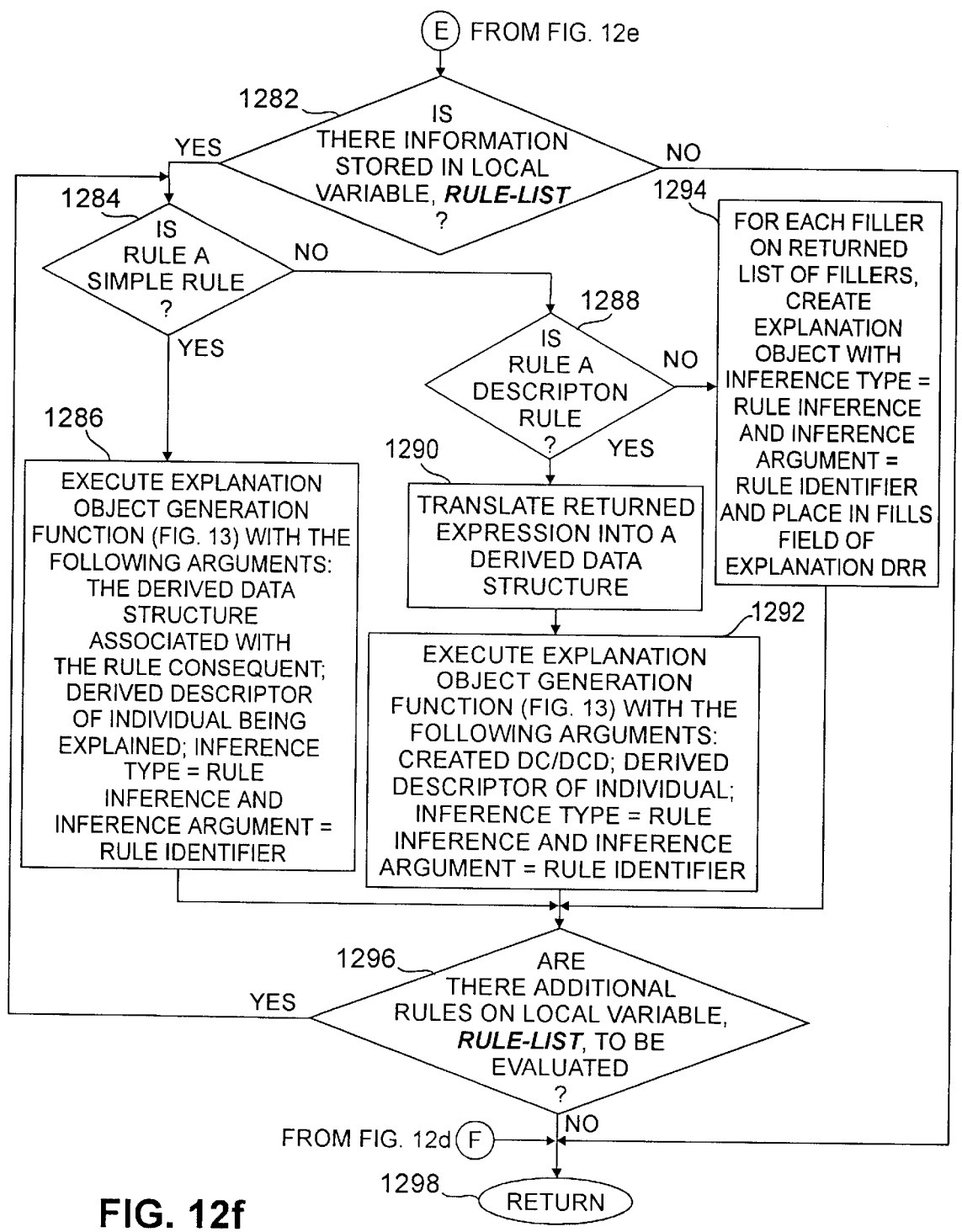

A test is performed during step 1272 to determine if there is information in the inverse-role propagations in field 550 of the data structure 500 associated with the current individual being explained, such as the data structure 500 shown in FIG. 5. If it is determined during step 1272 that there is no information in the inverse-role propagations in field 580 of the current individual, program control will proceed to the rule explanation section which begins at step 1282 (FIG. 12f).

If, however, it is determined during step 1272 that there is information in the inverse-role propagations in field 580 of the current individual, an explanation object is created for the propagated inverse-role information. As previously indicated, when an inverse-role propagation is processed during normalization, an inverse-role propagation list is preferably created which indicates the individual from which the information was propagated from, and an indication of the role that the information was propagated along.

An explanation object is created during step 1274 for each inverse-role propagation on the individual's list in field 580, indicating the inference type is the inverse-role inference and that the inference arguments are equal to those retrieved from the inverse-role propagation list. The explanation object is placed in the Fills field 1070 of the explanation DRR data structure 1050 associated with the indicated role of the individual that was populated based on the inverse-role propagation.

Thereafter, program control will proceed to the rule explanation section which begins at step 1282 where a test is performed to determine if information was stored in the local variable, rule-list, during previous execution of step 1210. If it is determined during step 1282 that no information is stored in the local variable, rule-list, program control will proceed to the step 1298, discussed below.

If, however, it is determined during step 1282 that information is stored in the local variable, rule-list, a test is performed during step 1284 to determine if the rule is a simple rule, as discussed above. If it is determined during step 1284 that the rule is a simple rule, the setup explanation structure function 58 will execute the explanation object generation function 60 during step 1286 to identify the pieces of information that appear in the data structures of the current individual being explained as a result of the rule firing.

The explanation object generation function 60 is executed during step 1286 with the following arguments: the derived data structure associated with the rule consequent and the derived individual descriptor (DID) 800 associated with the current individual being explained. In addition, the inference type is preferably set to "rule inference" and the inference argument is an indication of the rule identifier. Thereafter, program control will proceed to step 1296, discussed below.

If, however, it is determined during step 1284 that the rule is not a simple rule, a test is performed during step 1288 to determine if the rule is a description rule. If it is determined during step 1288 that the current rule on the variable, rule-list, is a description rule, the function result which is an expression stored on the variable, rule-list, is translated into a derived data structure, which may be in the form of a derived concept descriptor (DCD) 800 (FIG. 8) or a concept data structure 400 (FIG. 4) during step 1290 by placing the portions of the function result in the appropriate fields of the created derived concept descriptor (DCD) 800.

Thereafter, the setup explanation structure function 58 will identify the pieces of information that appear in the data structures of the current individual as a result of the description rule firing. Thus, the explanation object generation function 60 is executed during step 1292 with the following arguments: the derived data structure created during step 1290 and the derived individual descriptor (DID) 800 associated with the current individual being explained. In addition, the inference type is preferably set to "rule inference" and the inference argument is an indication of the rule identifier. Thereafter, program control will proceed to step 1296, discussed below.

If, however, it is determined during step 1288 that the current rule on the variable, rule-list, is not a description rule, then the rule must be a filler rule. As previously indicated, a filler rule will generate a list of fillers for a particular role. Thus, the setup explanation structure function 58 preferably identifies the fillers of a particular role that appear in the data structure of the current individual as a result of the filler rule firing. Thus, an explanation object is created during step 1294 for each filler on the returned list of fillers. Each explanation object should indicate that the inference type is a "rule firing" and that the inference argument is an indication of the rule identifier. The created explanation objects should be placed in the fills field 1070 of the explanation DRR data structure 1050 associated with the particular role of the individual being explained. Thereafter, program control will proceed to step 1296.

A test is performed during step 1296 to determine if there are additional rules listed on the local variable, rule-list, to be evaluated. If it is determined during step 1296 that there are additional rules listed on the local variable, rule-list, to be evaluated, program control will return to step 1284, and continue in the manner described above.

If, however, it is determined during step 1296 that there are no additional rules to be evaluated, program control will proceed to step 1298, where the setup explanation structure function 58 will be exited.

The explanation object generation function 60, illustrated in FIG. 13, will be executed from the setup explanation structure function 58 to compare the derived information stored in a derived descriptor data structure (DCD/DID) 800 for the object being explained with a descriptor being merged from, which will vary depending on where the explanation object generation function 60 is called from. The explanation object generation function 60 will compare corresponding fields in the derived descriptor data structure (DCD/DID) 800, and associated derived role restriction (DRR) data structures 900 for the object being explained with the descriptors being merged from, and identify pieces of information appearing in the structures associated with the object being explained that have been inferred or derived from the descriptor being merged from.

As previously indicated, the explanation object generation function 60 will be passed the descriptor of the object being merged from and the derived descriptor (DCD/DID) 800 of the current object being explained. In addition, the explanation object generation function 60 will be passed a particular inference type and inference arguments. Finally, if the user has requested that the explanation should be limited to an explanation of particular roles or aspects, this information should also be passed into the explanation object generation function 60.

Figure 13A:
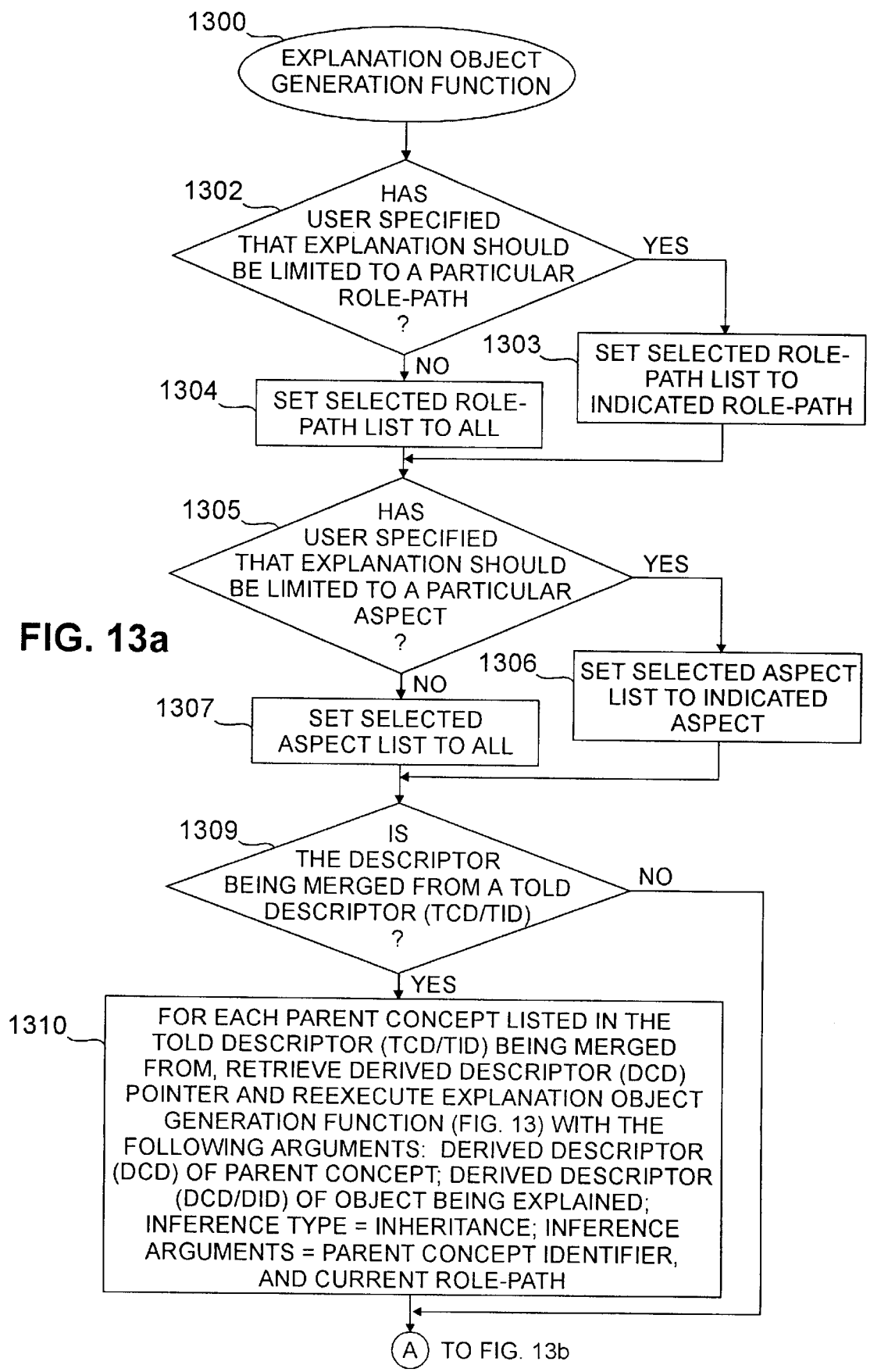
FIGS. 13a through 13i, collectively, are a flow chart describing an exemplary explanation object generation function as utilized by the setup explanation structure function of FIG. 12 to compare a first data structure to the derived information data structure of the object being explained in order to identify the pieces of information appearing in the structure of the object being explained that have been derived from the object associated with the first data structure.
Figure 13B:
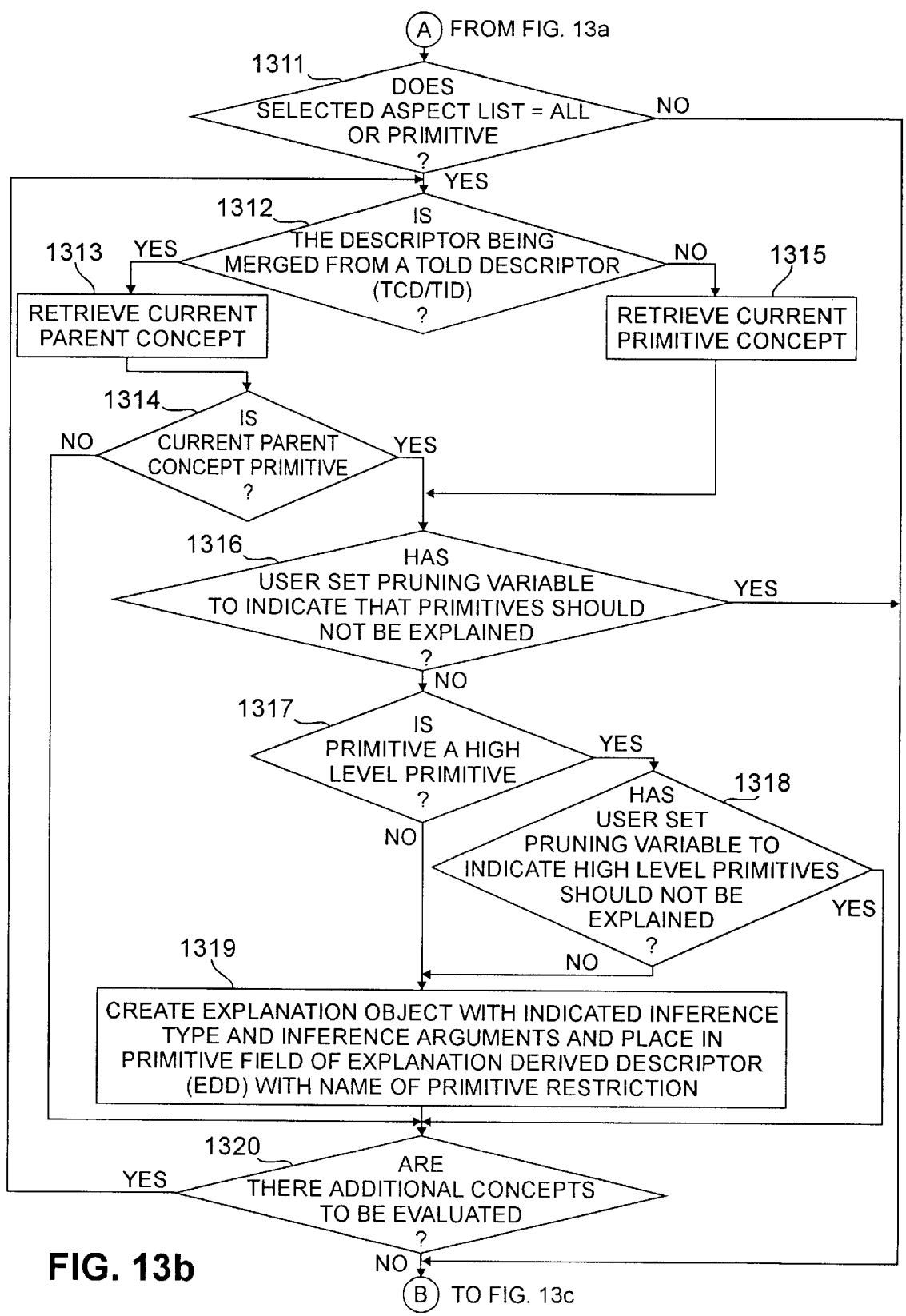

As indicated in FIG. 13a, the explanation object generation function 60 is entered at step 1300. Generally, the explanation object generation function 60 will go through each field or aspect of the derived data structures of the object being explained and compare each corresponding field in the merged from data structure indicated in the first passed argument to see if information in the object being explained came from the object being merged from based on the indicated inference type. It is noted that the explanation object generation function 60 is discussed below with respect to the illustrative data structures described above in conjunction with FIGS. 3 through 10b.

According to one feature of the invention, when a user requests an explanation for a particular object, the user may request that the explanation be limited to a particular role-path or aspect. Accordingly, upon entering the explanation object generation function 60, a test is initially performed during step 1302 to determine if the user has specified that the explanation should be limited to a particular role-path. If it is determined during step 1302 that the user has specified that the explanation should be limited to a particular role-path, then a local variable, role-path-list, is set during step 1303 to the indicated role-path.

If, however, it is determined during step 1302 that the user has not specified that the explanation should be limited to a particular role-path, then the local variable, role-path-list, is set during step 1304 to indicate that all role-paths should be explained.

In addition, a test is performed during step 1305 to determine if the user has specified that the explanation should be limited to a particular aspect. If it is determined during step 1305 that the user has specified that the explanation should be limited to a particular aspect, then a local variable, aspect-list, is set during step 1306 to the indicated aspect.

If, however, it is determined during step 1305 that the user has not specified that the explanation should be limited to a particular aspect, then the local variable, aspect-list, is set during step 1307 to indicate that all aspects should be explained.

A test is performed during step 1309 to determine if the object being merged from is a told descriptor. If it is determined during step 1309 that the object being merged from is not a told descriptor, then program control will proceed to step 1311 (FIG. 13b), discussed below.

If, however, it is determined during step 1309 that the object being merged from is a told descriptor, then the explanation object generation function 60 will thereafter identify and explain the pieces of information in the object being explained that were inherited from told parent concepts. The explanation object generation function 60 will reexecute the explanation object generation function 60, during step 1310. The explanation object generation function 60 will be executed during step 1310 for each parent concept listed in the parent concept field 610 of the told descriptor data structure 600.

Upon each execution during step 1310, the explanation object generation function 60 is passed the derived concept descriptor 800 of the current parent concept and the derived descriptor (DCD/DID) 800 of the object being explained. In addition, the explanation object generation function 60 is passed an indication that the inference type is inheritance with the inference arguments including the parent concept identifier and the current role-path.

Thereafter, the explanation object generation function 60 will traverse each field of the derived descriptor (DCD/DID) data structure of the object being explained and the corresponding fields of the object being merged from to identify pieces of information that were derived from the object being merged from.

Figure 13C:
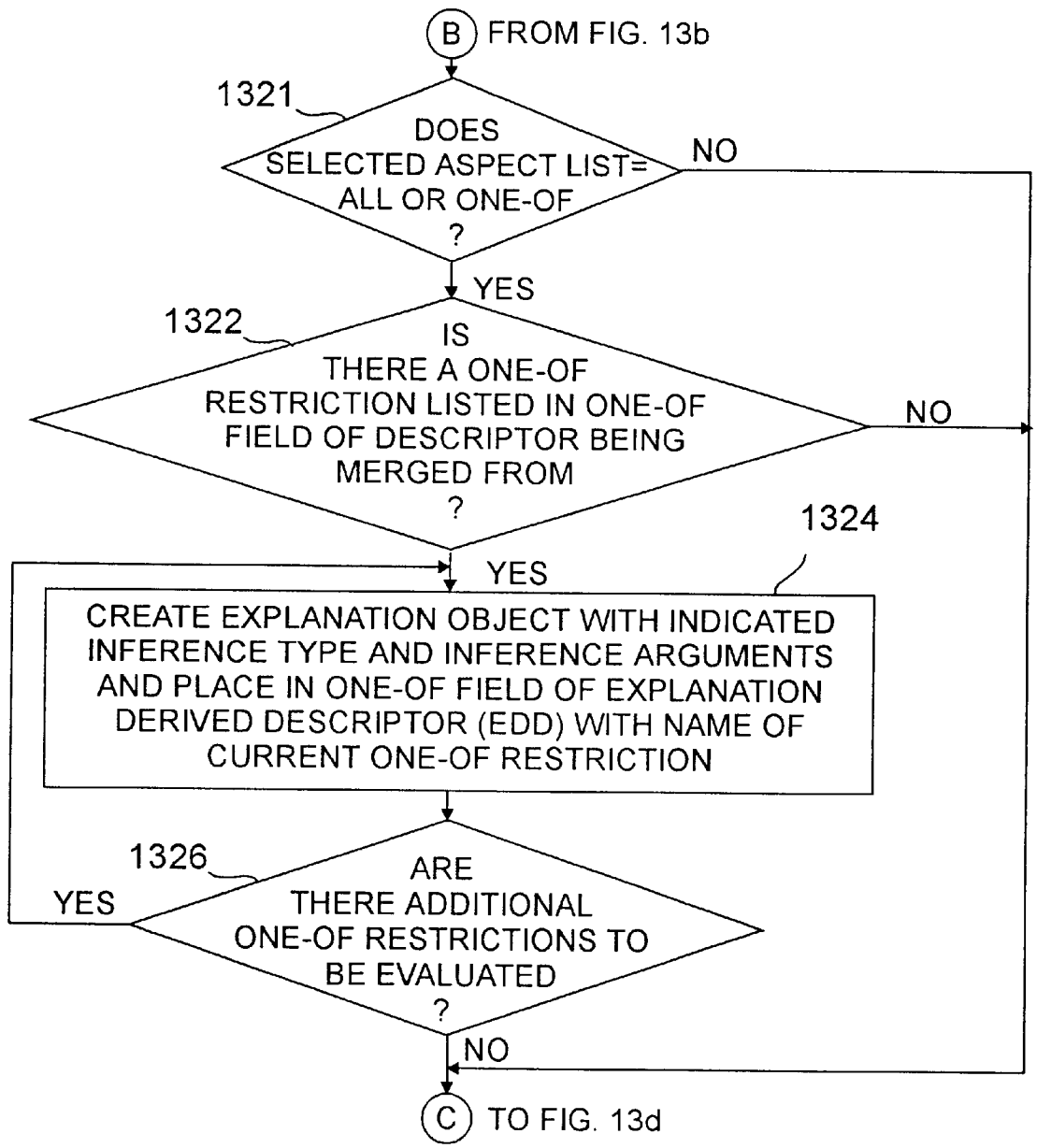

A test is initially performed during step 1311 to ensure that the user is interested in an explanation of the primitive aspect. If it is determined during step 1311 that the aspect variable does not equal all or primitive, the user is not interested in an explanation of the primitive aspect. Thus, program control will proceed to step 1321 (FIG. 13*c*).

If, however, it is determined during step 1311 that the aspect variable does equal all or primitive, the user is interested in an explanation of the primitive aspect. Thus, a test is performed during step 1312 to determine if the object being merged from is a told descriptor. If it is determined during step 1312 that the object being merged from is a told descriptor, then the current parent concept in the parent concept field 610 of the told descriptor data structure (TCD/TID) 600 of the object being merged from is retrieved during step 1313. Thereafter, a test is performed during step 1314 to determine if the current parent concept is a primitive concept.

If it is determined during step 1314 that the current parent concept is not a primitive concept, then program control will proceed to step 1320 without creating an explanation object for the current parent concept. If, however, it is determined during step 1314 that the current parent concept is a primitive concept, then program control will proceed to step 1316.

If it was determined during step 1312 that the object being merged from is not a told descriptor, then the current primitive concept in the primitive concept field 810 of the derived descriptor data structure (DCD/DID) 800 of the object being merged from is retrieved during step 1315. Thereafter, program control will proceed to step 1316.

A test is performed during step 1316 to determine if the user has set the pruning variable, discussed above, to indicate that primitives should not be explained. If it is determined during step 1316 that the user has set the pruning variables to indicate that primitives should not be explained, then program control will proceed to step 1321 (FIG. 13*c*). If, however, it is determined during step 1316 that the user has not set the pruning variables to indicate that primitives should not be explained, then a test is performed during step 1317 to determine if the current primitive is a high level primitive, such as THING.

If it is determined during step 1317 that the primitive is a high level primitive, then a test is performed during step 1318 to determine if the user has set the pruning variables to indicate that high level primitives should not be explained. If it is determined during step 1318 that the user has indicated that high level primitives should not be explained, then program control will proceed to step 1320, discussed below.

If, however, it is determined during step 1318 that the user has indicated that high level primitives should be explained, then an explanation object is created during step 1319 for the primitive with the indicated inference type and inference arguments, that were passed to the explanation object generation function 60. The explanation object created during step 1319 is placed in the primitive field 1010 of the explanation derived descriptor (EDD) data structure 1000, indicating the name of the associated primitive.

A test is performed during step 1320 to determine if there are additional concepts to be evaluated in the data structure being merged from. If it is determined during step 1320 that there are additional concepts to be evaluated, program control will return to step 1312, and continue in the manner described above.

If, however, it is determined during step 1320 that there are no additional concepts to be evaluated, program control will proceed to step 1321 (FIG. 13*c*).

Figure 13D:
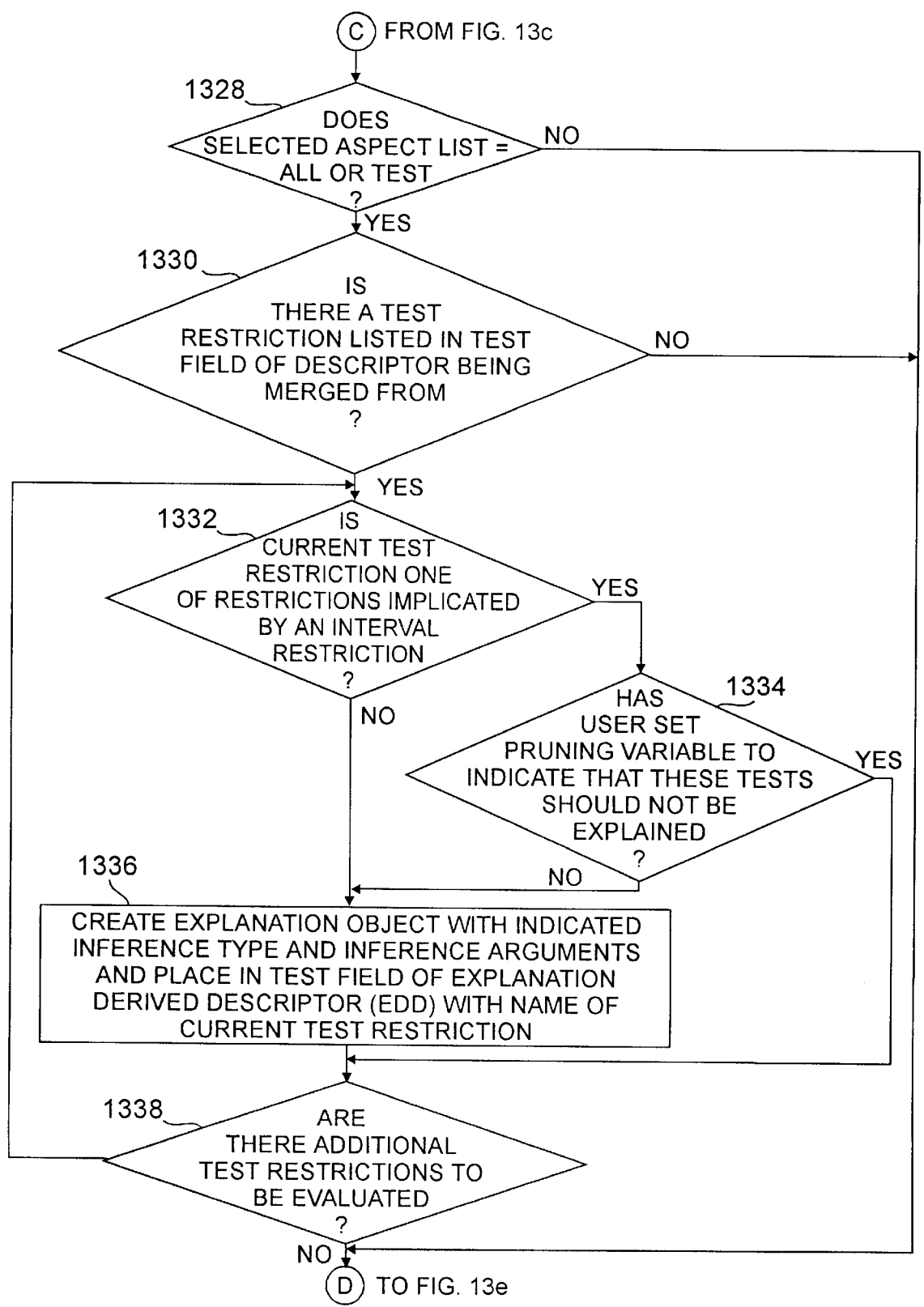

A test is performed during step 1320 to ensure that the user is interested in an explanation of the one-of aspect. If it is determined during step 1320 that the aspect variable does not equal all or one-of, the user is not interested in an explanation of the one-of aspect. Thus, program control will proceed to step 1328 (FIG. 13*d*).

If, however, it is determined during step 1320 that the aspect variable does equal all or one-of, the user is interested in an explanation of the one-of aspect. Thus, a test is performed during step 1322 to determine if there is a one-of restriction listed in the one-of field of the descriptor being merged. If it is determined during step 1322 that there is no one-of restriction listed in the one-of field of the descriptor being merged from, program control will proceed to step 1328 (FIG. 13*d*).

If, however, it is determined during step 1322 that there is a one-of restriction listed in the one-of field of the descriptor being merged from, the explanation object generation function 60 will annotate the information by creating an explanation object during step 1324 for the one-of restriction with the indicated inference type and inference arguments that were passed into the explanation object generation function. The explanation object created during step 1324 is placed in the one-of field 1015 of the explanation derived descriptor (EDD) data structure 1000, indicating the name of the associated one-of restriction.

A test is performed during step 1326 to determine if there are additional one-of restrictions to be evaluated. If it is determined during step 1326 that there are additional one-of restrictions to be evaluated, program control will return to step 1324, and continue in the manner described above.

If, however, it is determined during step 1326 that there are no additional one-of restrictions to be evaluated, program control will proceed to step 1328 (FIG. 13*d*).

Figure 13E:
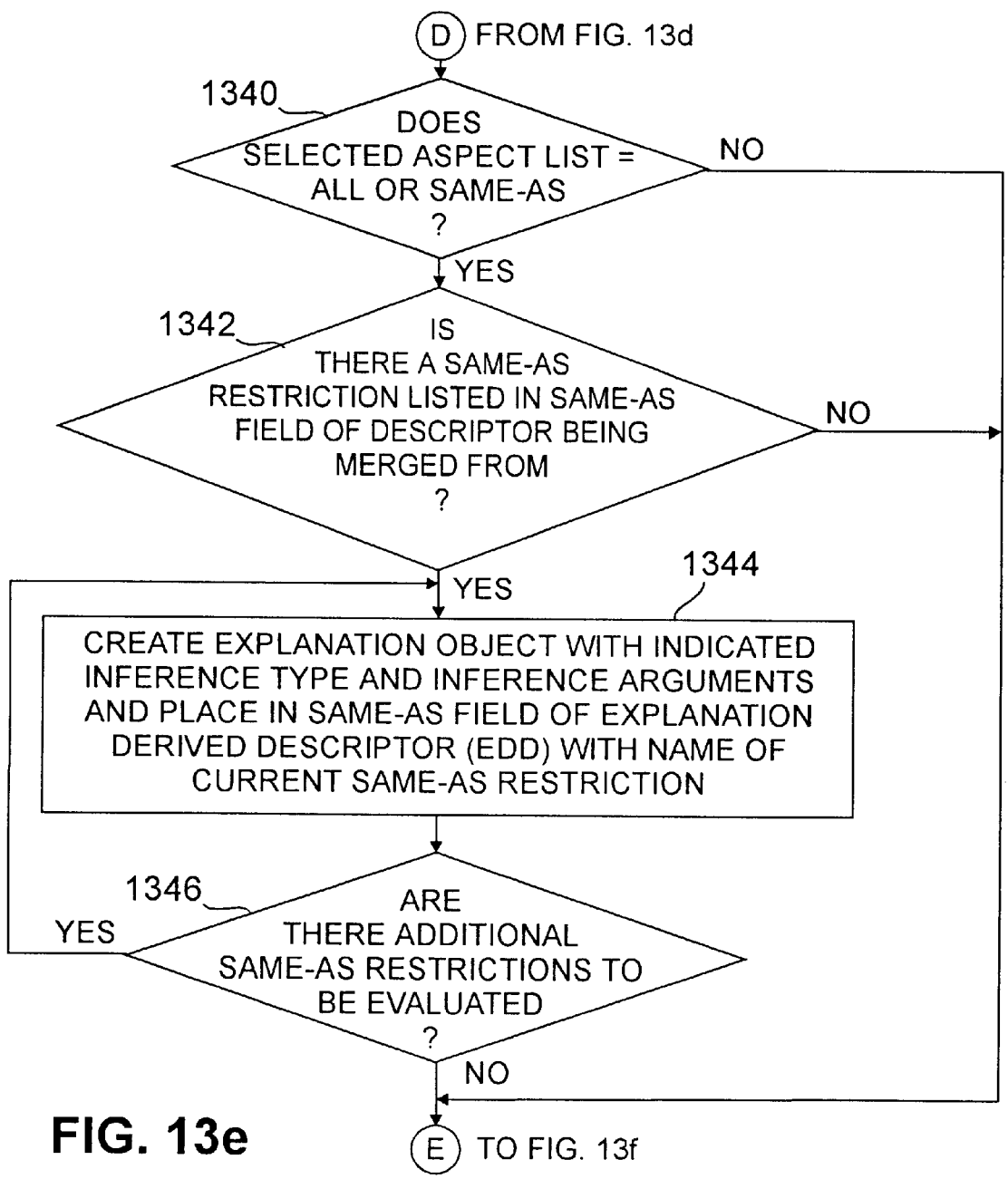

A test is performed during step 1328 to ensure that the user is interested in an explanation of the test aspect. If it is determined during step 1328 that the aspect variable does not equal all or test, the user is not interested in an explanation of the test aspect. Thus, program control will proceed to step 1340 (FIG. 13*e*).

If, however, it is determined during step 1328 that the aspect variable does equal all or test, the user is interested in an explanation of the test aspect. Thus, a test is performed during step 1330 to determine if there is a test restriction listed in the test field of the descriptor being merged. If it is determined during step 1330 that there is no test restriction listed in the test field of the descriptor being merged, program control will proceed to step 1340 (FIG. 13e), discussed below.

If, however, it is determined during step 1330 that there is a test restriction listed in the test field of the descriptor being merged from, a test is performed during step 1332 to determine if the current test restriction being evaluated is one of the restrictions implicated by an interval restriction. It is noted that if an object has an interval restriction, such as a defined range, it is implied that the interval must be a number. Accordingly, a number of restrictions may be added by the knowledge representation system 15 in order to enforce the fact that the restriction must be a number. If it is determined during step 1332 that the current test restriction is not one of the restrictions implicated by an interval restriction, then program control will proceed to step 1336, in order to explain the source of this test restriction.

If, however, it is determined during step 1332 that the current test restriction is one of the restrictions implicated by an interval restriction, then a test is performed during step 1334 to determine if the user has set the pruning variables to indicate that these test restrictions should not be explained. If it is determined during step 1334 that the user has indicated that these test restrictions should not be explained, then program control will proceed to step 1338, discussed below.

If, however, it is determined during step 1334 that the user has indicated that these test restrictions should be explained, then the explanation object generation function 60 will annotate the information by creating an explanation object during step 1336 for the test restriction with the indicated inference type and inference arguments that were passed into the explanation object generation function 60. The explanation object created during step 1336 is placed in the test field 1020 of the explanation derived descriptor (EDD) data structure 1000, indicating the name of the associated test restriction.

A test is performed during step 1338 to determine if there are additional test restrictions to be evaluated. If it is determined during step 1338 that there are additional test restrictions to be evaluated, program control will return to step 1332, and continue in the manner described above.

If, however, it is determined during step 1338 that there are no additional test restrictions to be evaluated, program control will proceed to step 1340 (FIG. 13e), discussed below.

Figure 13F:
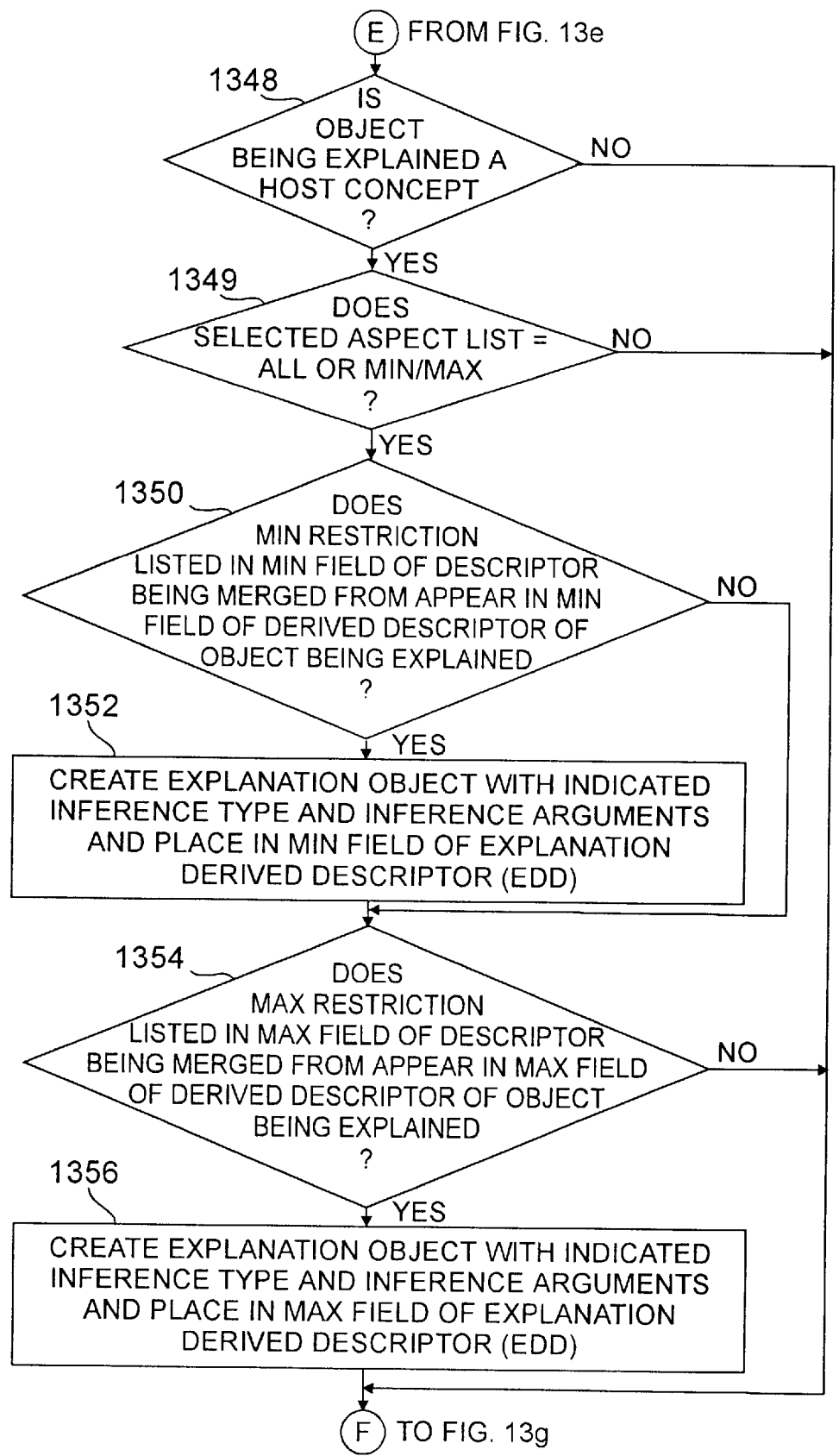

A test is performed during step 1340 to ensure that the user is interested in an explanation of the same-as aspect. If it is determined during step 1340 that the aspect variable does not equal all or same-as, the user is not interested in an explanation of the same-as aspect. Thus, program control will proceed to step 1348 (FIG. 13f).

If, however, it is determined during step 1340 that the aspect variable does equal all or same-as, the user is interested in an explanation of the same-as aspect. Thus, a test is performed during step 1342 to determine if there is a same-as restriction listed in the same-as field of the descriptor being merged from. If it is determined during step 1342 that there is no same-as restriction listed in the same-as field of the descriptor being merged from, program control will proceed to step 1348 (FIG. 13f).

If, however, it is determined during step 1342 that there is a same-as restriction listed in the same-as field of the descriptor being merged from, the explanation object generation function 60 will annotate the information by creating an explanation object during step 1344 for the same-as restriction with the indicated inference type and inference arguments that were passed into the explanation object generation function 60. The explanation object created during step 1344 is placed in the same-as field 1035 of the explanation derived descriptor (EDD) data structure 1000, indicating the name of the associated sameas restriction.

A test is performed during step 1346 to determine if there are additional same-as restrictions to be evaluated. If it is determined during step 1346 that there are additional same-as restrictions to be evaluated, program control will return to step 1344, and continue in the manner described above.

If, however, it is determined during step 1346 that there are no additional same-as restrictions to be evaluated, program control will proceed to step 1348 (FIG. 13f), discussed below.

Figure 13G:
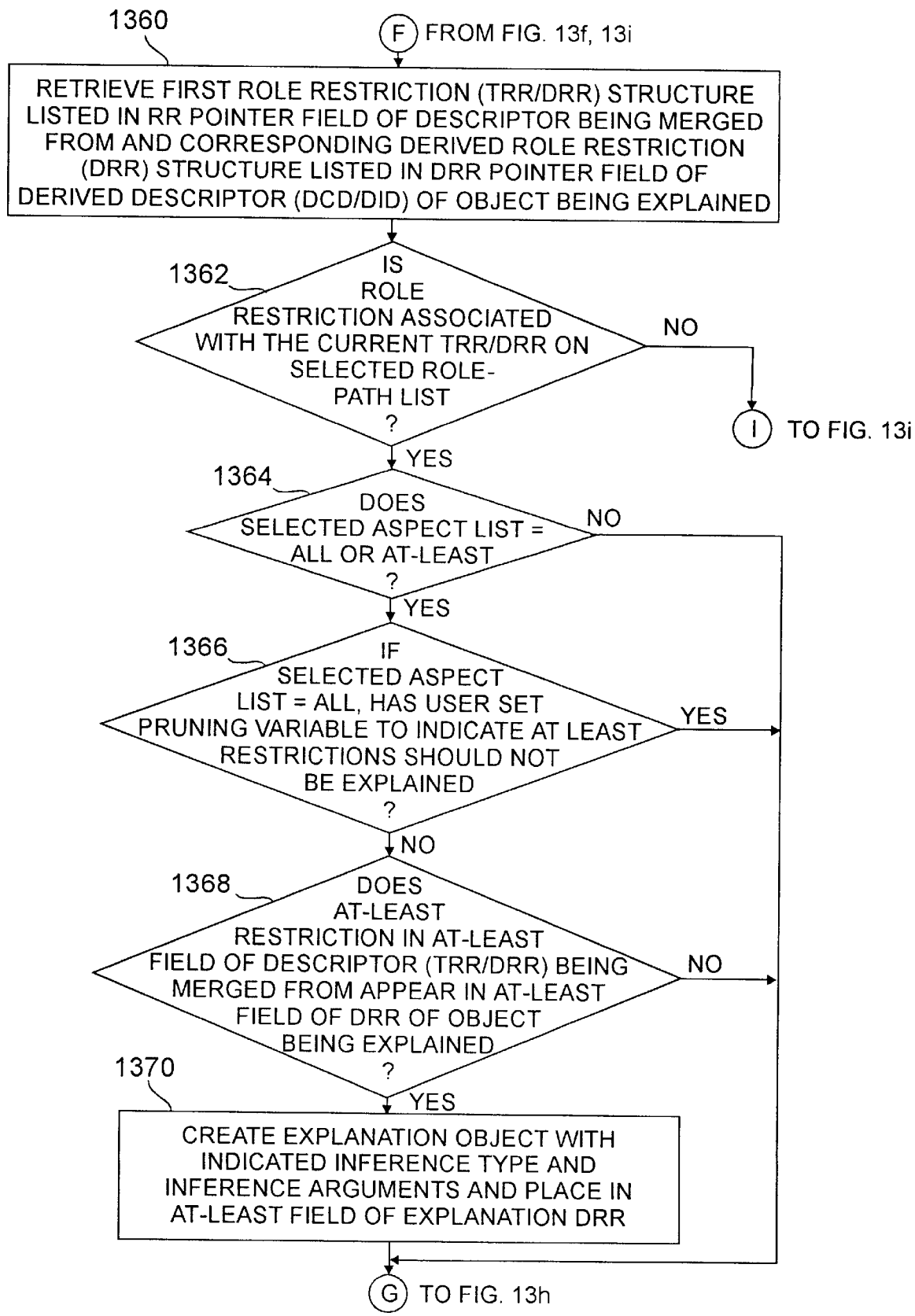

In the CLASSIC™ Knowledge Representation System, the Min and Max aspects are only applicable to host concepts. Thus, a test is preferably performed during step 1348 to determine if the current object being explained is a host concept. If it is determined during step 1348 that the current object being explained is not a host concept, the Min and Max aspects are not relevant to the current object, and program control will proceed to step 1360 (FIG. 13g).

If, however, it is determined during step 1348 that the current object being explained is a host concept, the Min and Max aspects are relevant to the current object and the source of any Min and Max restrictions should preferably be explained. A test is initially performed during step 1349, however, to ensure that the user is interested in the explanation of the Min/Max aspects. If it is determined during step 1349 that the aspect variable does not equal all or Min/Max, the user is not interested in an explanation of the Min/Max aspects and program control should proceed to step 1360 (FIG. 13g).

If, however, it is determined during step 1349 that the aspect variable does equal all or Min/Max, the user is interested in an explanation of the Min/Max aspects. Thus, a test is performed during step 1350 to determine if the Min restriction listed in the Min field of the descriptor being merged from also appears in the Min field 840 of the derived descriptor data structure (DCD/DID) 800 of the object being explained. If it is determined during step 1350 that the Min restriction listed in the Min field of the descriptor being merged from also appears in the Min field 840 of the derived descriptor 800 of the object being explained, then the explanation object generation function 60 will annotate the information. An explanation object is created during step 1352 for the Min restriction with the indicated inference type and inference arguments that were passed into the explanation object generation function 60. The explanation object created during step 1352 is placed in the Min field 1025 of the explanation derived descriptor (EDD) data structure 1000.

A test is performed during step 1354 to determine if the Max restriction listed in the Max field of the descriptor being merged from also appears in the Max field 850 of the derived descriptor data structure (DCD/DID) 800 of the object being explained. If it is determined during step 1354 that the Max restriction listed in the Max field of the descriptor being merged from also appears in the Max field 850 of the derived descriptor 800 of the object being explained, then the explanation object generation function 60 will annotate the information. An explanation object is created during step 1356 for the Max restriction with the indicated inference type and inference arguments that were passed into the explanation object generation function 60. The explanation object created during step 1356 is placed in the Max field 1030 of the explanation derived descriptor (EDD) data structure 1000. Thereafter, program control will proceed to step 1360 (FIG. 13g).

During steps 1360 through 1396, the explanation object generation function 60 will process the role restriction information that has been stored for the associated object being explained in each of the derived role restriction (DRR) data structures 900. The explanation object generation function 60 will access the role restriction information during step 1360 by retrieving the respective pointers from the RR pointer field of the descriptor data being merged from and the corresponding DRR pointer field 870 of the derived descriptor data structure (DCD/DID) 800 of the object being explained.

A test is performed during step 1362 to determine if the role restriction associated with the current TRR/DRR being merged from is on the selected role-path list, in other words, whether the user would like an explanation along the current role-path. If it is determined during step 1362 that the role restriction associated with the current TRR/DRR is not on the selected role-path list, then program control will proceed to step 1396 (FIG. 13i), discussed below.

If, however, it is determined during step 1362 that the role restriction associated with the current TRR/DRR being merged from is on the selected role-path list, then the user would like at least some of the information stored for the current role-path to be explained. Thus, the different fields of the role path data structures will be traversed to determine if there is information stored therein to be explained.

A test is performed during step 1364 to ensure that the user is interested in an explanation of the at-least aspect of the current role-path. If it is determined during step 1364 that the aspect variable does not equal all or at-least, the user is not interested in an explanation of the at least aspect. Thus, program control will proceed to step 1374 (FIG. 13h), discussed below.

If, however, it is determined during step 1364 that the aspect variable does equal all or at-least, the user is interested in an explanation of the at least aspect. A test is performed during step 1366 to determine, if the aspect variable evaluated in the previous step is equal to all, whether the user has set the pruning variables to indicate that the at least restrictions should not be explained. It is noted that if the user has explicitly requested that a particular aspect be explained, this request will override the pruning variable here. If it is determined during step 1366 that the user has indicated that the at least restrictions should not be explained, then program control will proceed to step 1374 (FIG. 13h), discussed below.

Figure 13H:
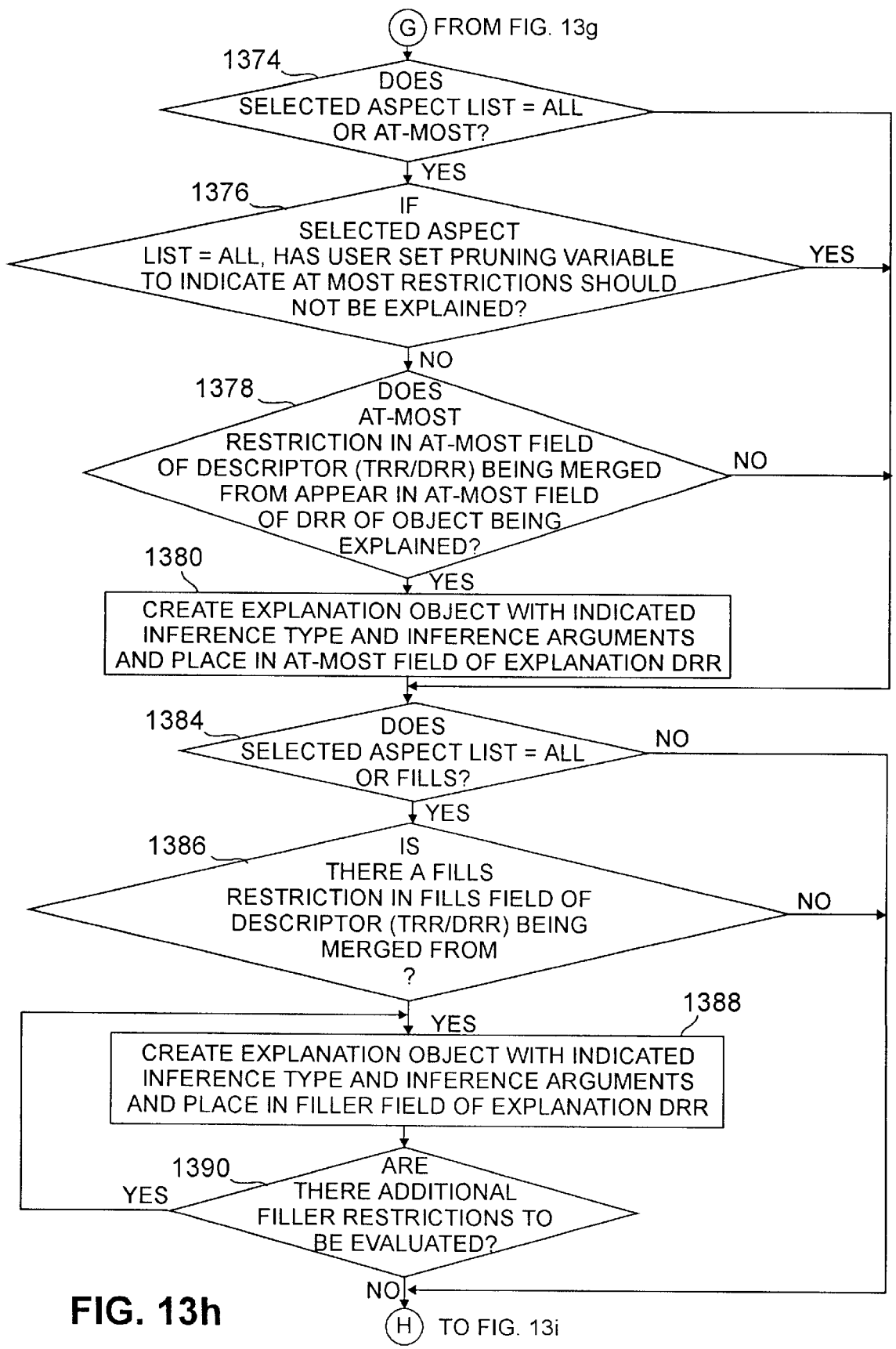

If, however, it is determined during step 1366 that the user has indicated that the at least restrictions should be explained, then a test is performed during step 1368 to determine if the at least restriction in the at least field of the descriptor (TRR/DRR) being merged from appears in the at least field 910 of the corresponding derived role restriction (DRR) data structure 900 of the object being explained. If it is determined during step 1368 that the at least restriction in the role restriction (TRR/DRR) data structure being merged from does not appear in the derived role restriction (DRR) data structure 900 of the object being explained, then the source of any at least restriction is not the object being merged from, and program control will proceed to step 1374 (FIG. 13h).

If, however, it is determined during step 1368 that the at least restriction in the role restriction data structure (TRR/DRR) being merged from does appear in the derived role restriction (DRR) data structure 900 of the object being explained, then the source of the at least restriction is the current descriptor being merged from, and the explanation object generation function 60 will annotate the information by creating an explanation object during step 1370. The explanation object for the at least restriction preferably includes the indicated inference type and inference arguments that were passed into the explanation object generation function 60. The explanation object created during step 1370 is placed in the at least field 1060 of the explanation DRR data structure 1050. Thereafter, program control will proceed to step 1374 (FIG. 13h).

A test is performed during step 1374 to ensure that the user is interested in an explanation of the at-most aspect of the current role-path. If it is determined during step 1374 that the aspect variable does not equal all or at-most, the user is not interested in an explanation of the at most aspect. Thus, program control will proceed to step 1384, discussed below.

If, however, it is determined during step 1374 that the aspect variable does equal all or at-most, the user is interested in an explanation of the at most aspect. A test is performed during step 1376 to determine, if the aspect variable evaluated in the previous step is equal to all, whether the user has set the pruning variables to indicate that the at most restrictions should not be explained. It is noted that if the user has explicitly requested that a particular aspect be explained, this request will override the pruning variable here. If it is determined during step 1376 that the user has indicated that the at most restrictions should not be explained, then program control will proceed to step 1384, discussed below.

If, however, it is determined during step 1376 that the user has indicated that the at most restrictions should be explained, then a test is performed during step 1378 to determine if the at most restriction in the at most field of the role restriction (TRR/DRR) data structure being merged from appears in the at most field 920 of the derived role restriction (DRR) data structure 900 of the object being explained. If it is determined during step 1378 that the at most restriction in the role restriction (TRR/DRR) data structure being merged from does not appear in the derived role restriction (DRR) data structure 900 of the object being explained, then the descriptor being merged from is not the source of any at most restriction, and will not be explained at this time, and program control will proceed to step 1384.

If, however, it is determined during step 1378 that the at most restriction in the role restriction (TRR/DRR) data structure being merged from does appear in the derived role restriction (DRR) data structure 900 of the object being explained, then the source of the at most restriction is the descriptor being merged from, and the explanation object generation function 60 will annotate the information by creating an explanation object during step 1380. The explanation object for the at most restriction preferably includes the indicated inference type and inference arguments that were passed into the explanation object generation function 60. The explanation object created during step 1380 is placed in the at most field 1065 of the explanation DRR data structure 1050.

A test is performed during step 1384 to ensure that the user is interested in an explanation of the fills aspect of the current role-path. If it is determined during step 1384 that the aspect variable does not equal all or fills, the user is not interested in an explanation of the filler aspect. Thus, program control will proceed to step 1391 (FIG. 13*i*), discussed below.

If, however, it is determined during step 1384 that the aspect variable does equal all or fills, the user is interested in an explanation of the filler aspect. Thus, a test is performed during step 1386 to determine if there is a fills restriction in the fills field of the role restriction (TRR/DRR) data structure being merged from. If it is determined during step 1386 that there is no fills restriction in the fills field of the role restriction (TRR/DRR) data structure being merged from, then program control will proceed to step 1391 (FIG. 13*i*).

If, however, it is determined during step 1386 that there is a fills restriction in the role restriction (TRR/DRR) data structure being merged from, then the explanation object generation function 60 will annotate the information by creating an explanation object during step 1388. The explanation object for the filler restriction preferably includes the indicated inference type and inference arguments that were passed into the explanation object generation function 60. The explanation object created during step 1388 is placed in the fills field 1070 of the explanation DRR data structure 1050.

A test is performed during step 1390 to determine if there are additional filler restrictions to be evaluated. If it is determined during step 1390 that there are additional filler restrictions to be evaluated, program control will return to step 1388, and continue in the manner described above.

Figure 13I:
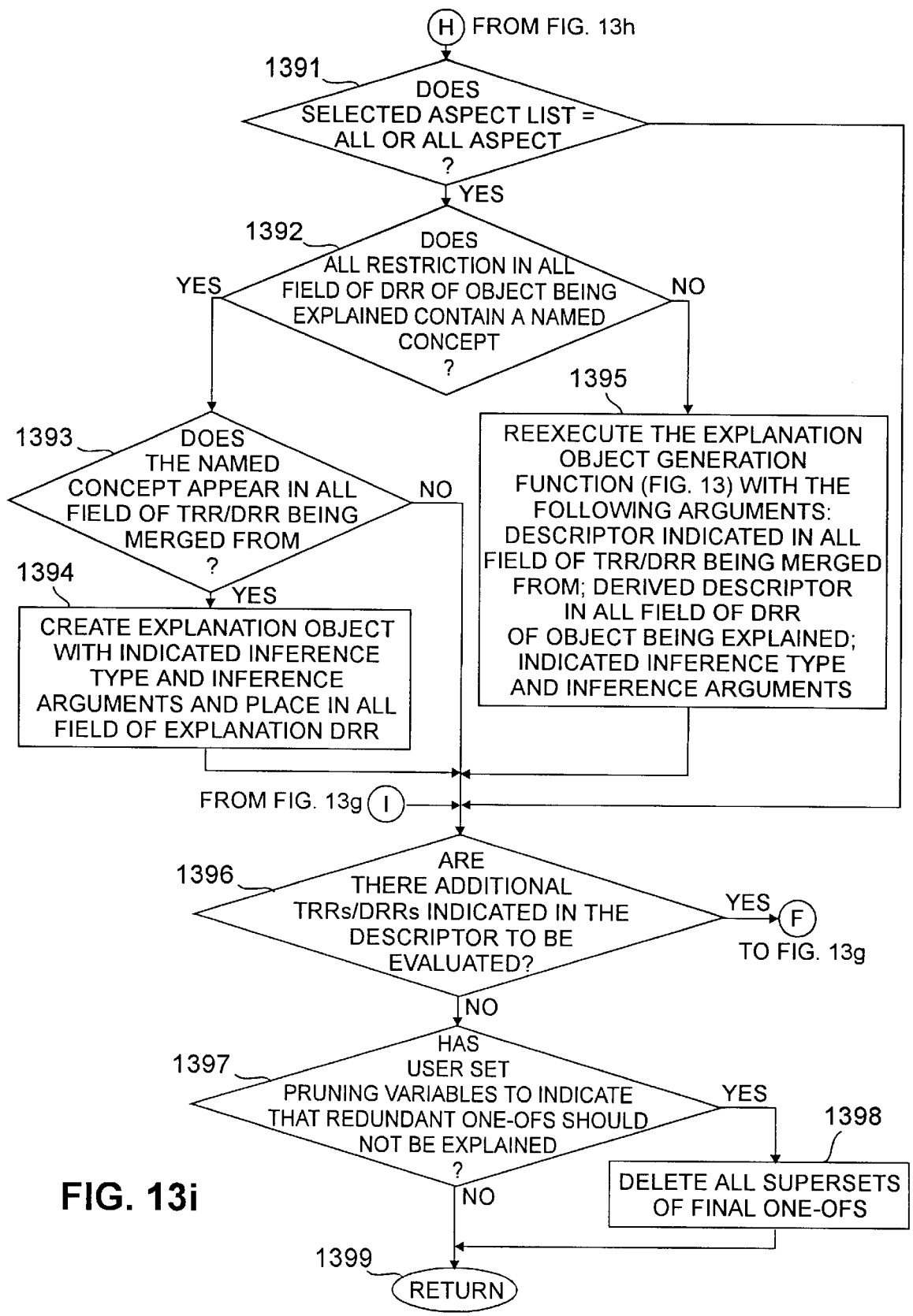

If, however, it is determined during step 1390 that there are no additional filler restrictions to be evaluated, program control will proceed to step 1391 (FIG. 13*i*).

During steps 1391 through 1395, the explanation object generation function 60 will process the all aspect of the current role restriction, to determine the source of the all restriction. A test is performed during step 1391 to ensure that the user is interested in an explanation of the all aspect of the current role-path. If it is determined during step 1391 that the aspect variable does not equal all available aspects or the particular "all" aspect, the user is not interested in an explanation of the all aspect. Thus, program control will proceed to step 1396, discussed below.

If, however, it is determined during step 1391 that the aspect variable does equal all available aspects or the particular "all" aspect, the user is interested in an explanation of the all aspect. Thus, a test is performed during step 1392 to determine if the all restriction in the all field 940 of the derived role restriction (DRR) data structure 900 of the object being explained explicitly contains a named concept, or rather, contains a pointer to a derived descriptor data structure (DCD/DID) 800 associated with a concept. If it is determined during step 1392 that the all field 940 explicitly contains a named concept, a test is performed during step 1393 to verify that the named concept in the all field 940 also appears in the all field 740 of the role restriction (TRR/DRR) data structure being merged from. If it is determined during step 1393 that the named concept in the all field 940 of the derived role restriction (DRR) data structure 900 of the object being explained does not appear in the all field of the role restriction (TRR/DRR) data structure being merged from, program control will proceed to step 1396.

If, however, it is determined during step 1393 that the named concept in the all field 940 of the derived role restriction (DRR) data structure 900 of the object being explained does appear in the all field of the role restriction (TRR/DRR) data structure being merged from, then the source of the all restriction is the descriptor being merged from, and the explanation object generation function 60 will annotate the information by creating an explanation object during step 1394. The explanation object for the all restriction preferably includes the indicated inference type and inference arguments that were passed into the explanation object generation function 60. The explanation object created during step 1395 is placed in the all field 1075 of the explanation DRR data structure 1050.

If, however, it is determined during step 1392 that the all field 940 does not contain a named concept, but rather, contains a pointer to a derived descriptor data structure (DCD/DID) 800 associated with a concept, then this data structure pointed to by the pointer must be analyzed to determine if some of the derived information associated with the current object being explained has come from the TCD/DCD being merged from. Thus, the explanation object generation function 60 is reexecuted again during step 1395 with the following arguments: the descriptor indicated in the all field of the role restriction (TRR/DRR) data structure being merged from; the derived d escript or data structure (DCD/DID) 800 in the all field of the DRR of the current object being explained; and the indicated inference type and inference arguments that were passed into the explanation object generation function 60. After the recursive execution of the explanation object generation function 60 during step 1395, program control will proceed to step 1396.

A test is performed during step 1396 to determine if there are additional TRR/DRR pointers listed in the role restriction pointer field of the descriptor data structure currently being merged from. If it is determined during step 1396 that there are additional TRRs/DRRs to be evaluated, program control will return to step 1360 (FIG. 13*g*), and continue in the manner described above.

If, however, i t is determined during step 1396 that there are no additional TRRs/DRRs to be evaluated, program control will proceed to step 1397, where a test is performed to determine if the user has set the pruning variables to indicate that redundant one-of restrictions should not be explained. For example, if there is a first one-of restriction requiring that a friend must be one-of (Sally, Mary, Joe) and a second one-of restriction requiring that the friend must be one-of (Sally, Joe), the first one-of restriction is said to be redundant because it is a superset of the second one-of restriction.

Thus, if it is determined during step 1397 that the user has set the pruning variables to indicate that redundant one-of restrictions should not be explained, then the redundant one-of restrictions should be deleted during step 1398.

Thereafter, program control will proceed to step 1399 where the explanation object generation function 60 will return to the calling function.

Explanation of Subsumption Inferences

As previously indicated, the explanation subsystem 45 also includes an object subsumption explanation function 65 and a rule firing explanation function 70, discussed below in conjunction with FIGS. 14 and 15, respectively, to provide a user with an explanation of subsumption inferences, in other words, an indication of why a particular object in the knowledge base 20 is subsumed by a particular concept or rule antecedent.

Figure 14:
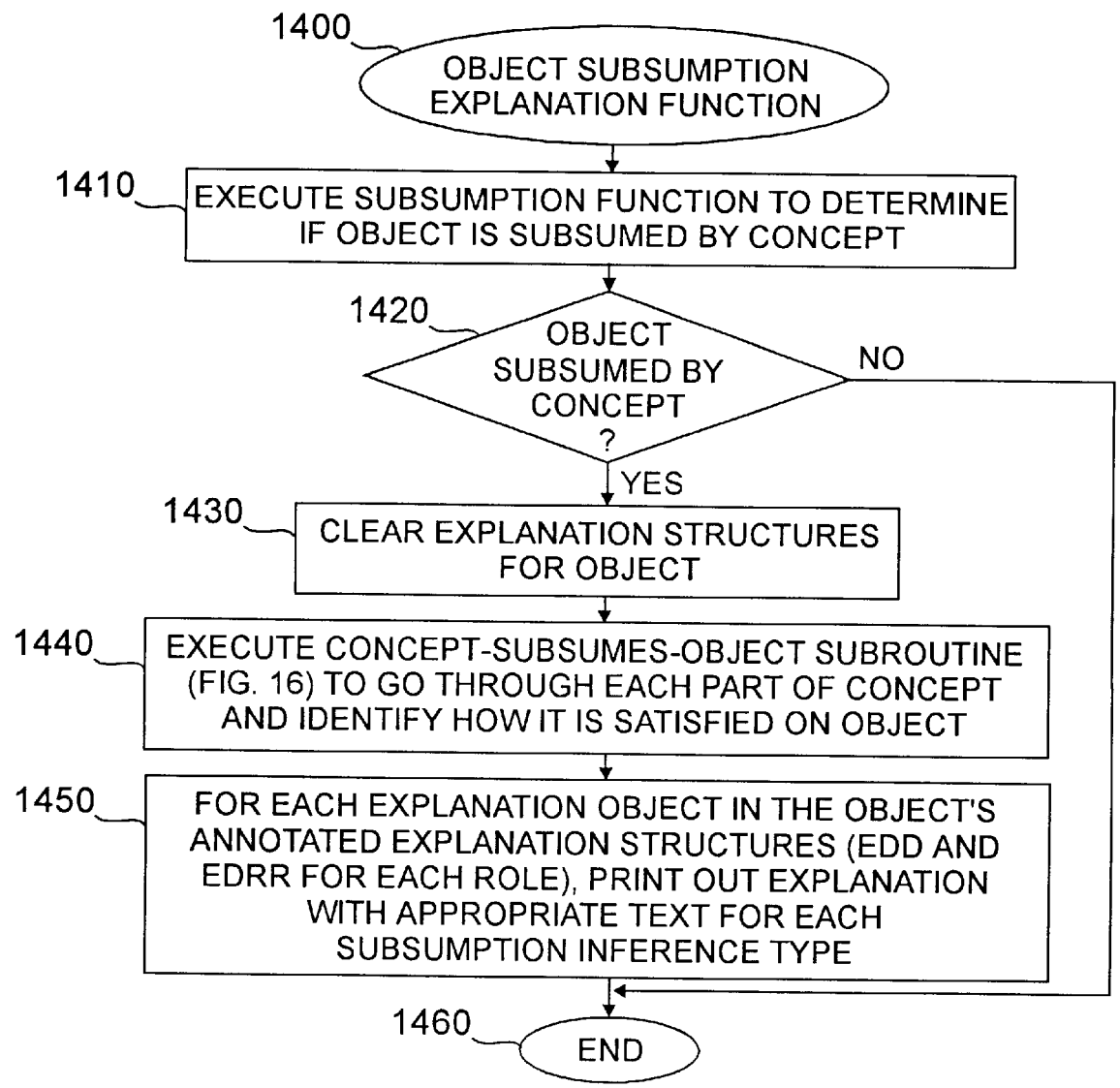
FIG. 14 is a flow chart describing an exemplary object subsumption explanation function as utilized by the knowledge representation system to explain why a particular concept is satisfied by a particular object.

The object subsumption explanation function 65, illustrated in FIG. 14, will explain why a particular concept is satisfied by a particular object in the knowledge base 20. The object subsumption explanation function 65 will first verify that the object being explained is in fact subsumed by the concept, and then if so, will indicate how each component of the concept definition is satisfied by the object being explained. As indicated in FIG. 14, the object subsumption explanation function 65 is entered at step 1400.

The object subsumption explanation function 65 will execute a subsumption function in a known manner during step 1410, to verify that the concept is satisfied by the object being explained. For a discussion of a suitable subsumption function, see our contemporaneously filed patent application, entitled "Knowledge Base System with Dependency Information for Procedural Tests," incorporated by reference above. Thereafter, a test is performed during step 1420 to verify that the object is subsumed by the concept. If it is determined during step 1420 that the object is not subsumed by the concept, program control will proceed to step 1460 where the process will be exited.

If, however, it is determined during step 1420 that the object is subsumed by the concept, the explanation structures (EDD and EDRRS) associated with the current object being explained will be cleared during step 1430. Thereafter, the object subsumption explanation function 65 will execute the concept-subsumes-object subroutine 75, discussed below in conjunction with FIG. 16, during step 1440 to go through each part, or component, of the concept definition and to explain how the component is satisfied by the object being explained.

After execution of the concept-subsumes-object subroutine 75, the explanation objects that are created during step 1440 by the concept-subsumes-object subroutine 75 are printed out. For each explanation object that has been placed in the explanation structures (EDD and EDRRs) of the object being explained, the object subsumption explanation function 65 will print out during step 1450 an explanation message with the appropriate text for each subsumption inference type. As indicated in FIG. 1, an explanation text library 90 is preferably maintained which contains an appropriate text message for each inference type.

Thereafter, program control will proceed to step 1460, where the execution of the object subsumption explanation function 65 will be terminated.

Figure 15:
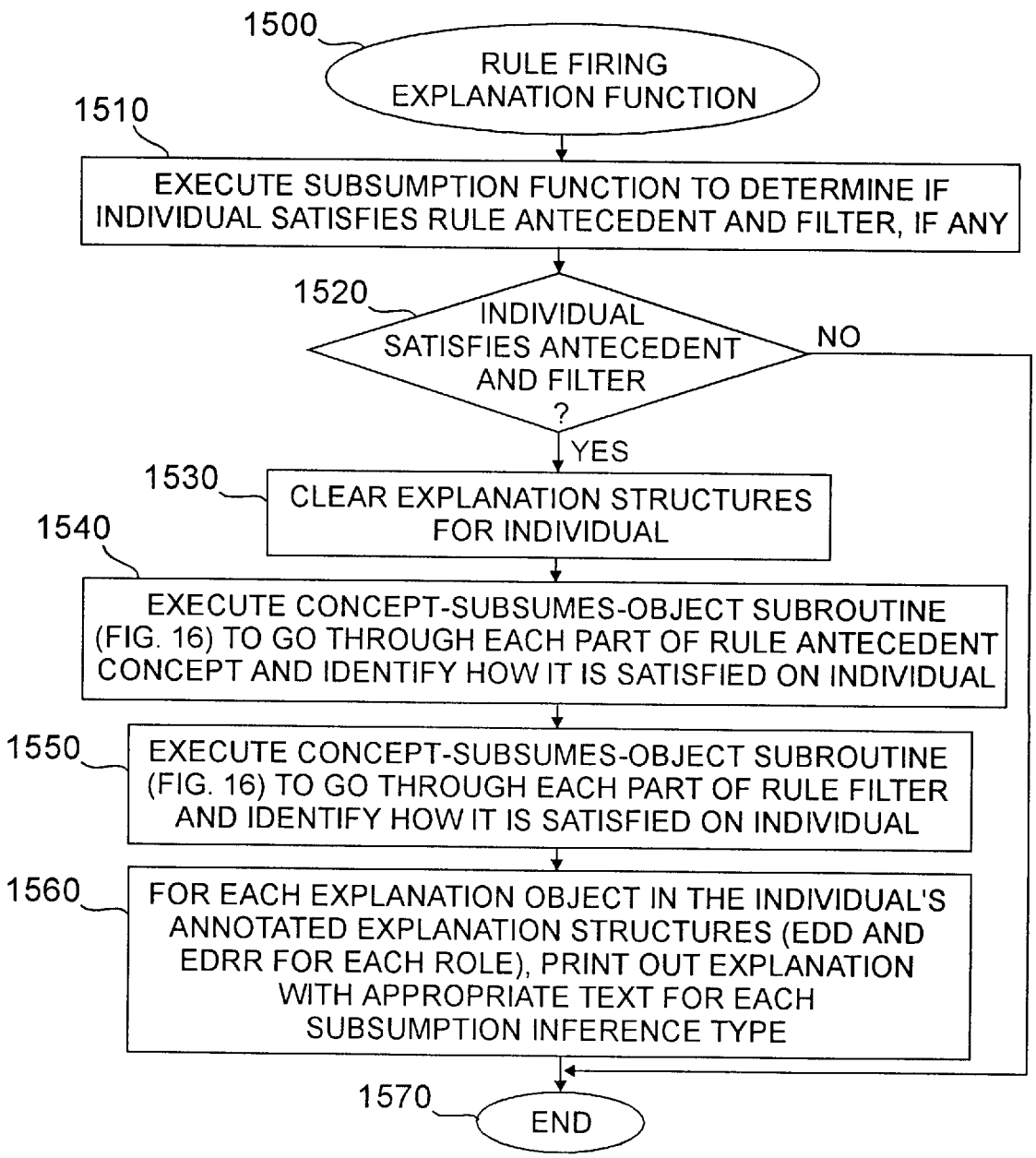
FIG. 15 is a flow chart describing an exemplary rule firing explanation function as utilized by the knowledge representation system to provide an explanation of why a particular rule was fired on a particular individual in the knowledge base.

The rule firing explanation function 70, illustrated in FIG. 15, will explain why a particular rule was fired on a particular individual. The rule firing explanation function 70 will first verify that the individual being explained is in fact subsumed by the rule antecedent and filter, if any, and then if so, will indicate how each component of the rule antecedent definition and rule filter definition, if any, are satisfied by the individual being explained. As indicated in FIG. 15, the rule firing explanation function 70 is entered at step 1500.

The rule firing explanation function 70 will execute a subsumption function in a known manner during step 1510, to verify that the rule antecedent and filter, if any, are satisfied by the individual being explained. For a discussion of a suitable subsumption function, see our contemporaneously filed patent application, entitled "Knowledge Base System with Dependency Information for Procedural Tests," incorporated by reference above. Thereafter, a test is performed during step 1520 to verify that the individual satisfied the rule antecedent and filter, if any. If it is determined during step 1520 that the individual does not satisfy the rule antecedent and filter, if any, program control will proceed to step 1570 where the process will be exited.

If, however, it is determined during step 1520 that the individual does satisfy the rule antecedent and filter, if any, the explanation structures (EDD and EDRRs) associated with the current individual being explained will be cleared during step 1530. Thereafter, the rule firing explanation function 70 will execute the concept-subsumes-object subroutine 75, discussed below in conjunction with FIG. 16, during step 1540 to go through each part, or component, of the rule antecedent definition and to explain how each component is satisfied by the individual being explained.

Thereafter, the rule firing explanation function 70 will again execute the concept-subsumes-object subroutine 75, discussed below in conjunction with FIG. 16, during step 1550 to go through each part, or component, of the filter definition and to explain how each component is satisfied by the individual being explained.

After execution of the concept-subsumes-object subroutine 75 during steps 1540 and 1550, the explanation objects that are created by the concept-subsumes-object subroutine 75 during steps 1540 and 1550 are printed out. For each explanation object that has been placed in the explanation structures (EDD and EDRRs) of the individual being explained, the rule firing explanation function 70 will print out during step 1560 an explanation message with the appropriate text for each subsumption inference type. As indicated in FIG. 1, an explanation text library 90 is preferably maintained which contains an appropriate text message for each inference type.

Thereafter, program control will proceed to step 1570, where the execution of the rule firing explanation function 70 will be terminated.

Figure 16A:
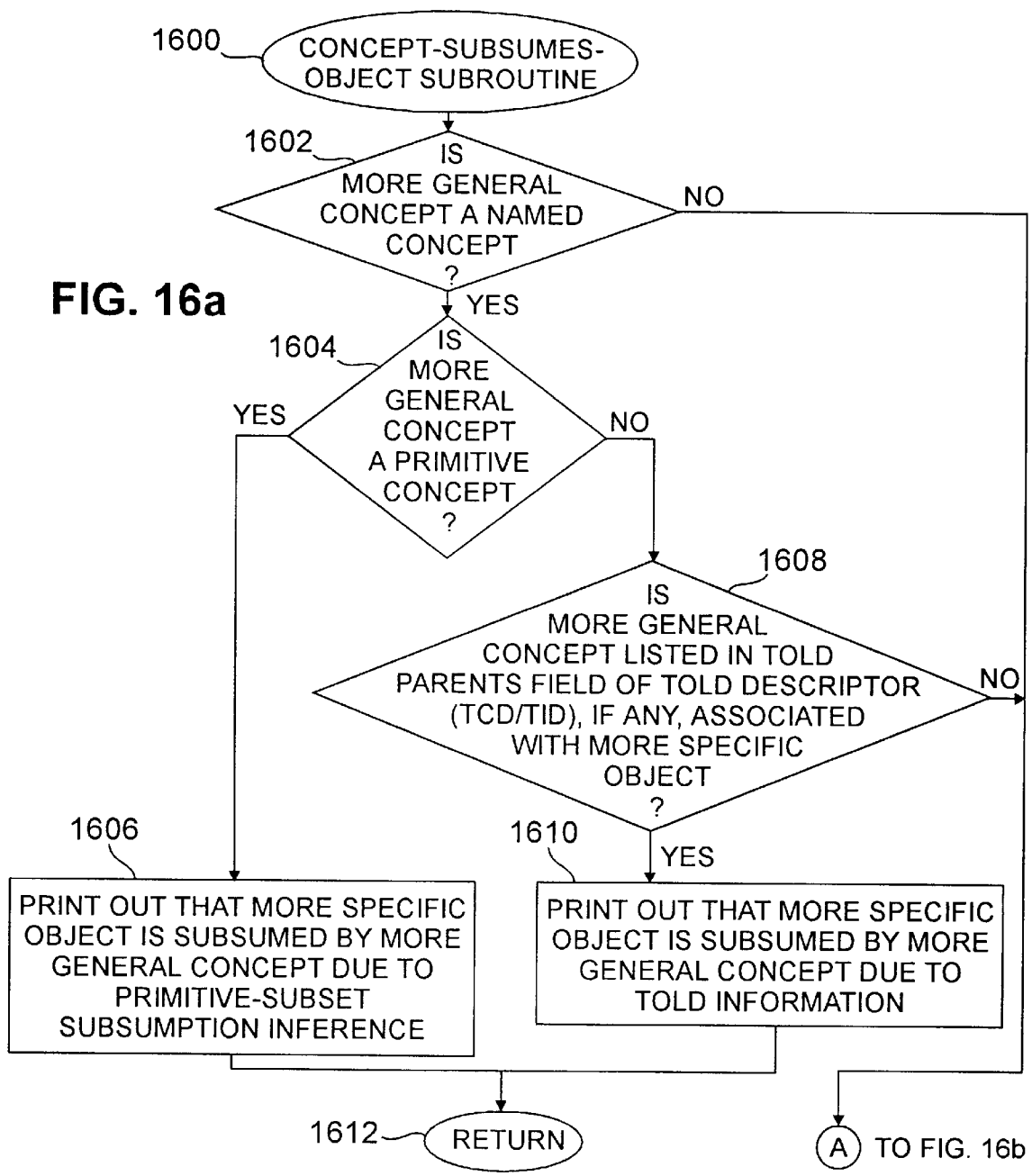
FIGS. 16a through 16i, collectively, are a flow chart describing an exemplary concept-subsumes-object subroutine as utilized by the object subsumption explanation function of FIG. 14 and the rule firing explanation function of FIG. 15 to go through each component of a concept definition and identify how the component is satisfied by an object being explained.

As previously indicated the object subsumption explanation function 65 and the rule firing explanation function 70 will execute the concept-subsumes-object subroutine 75 to go through each part, or component, of a concept definition and identify how the component is satisfied by an object being explained. As indicated in FIG. 16*a*, the concept-subsumes-object subroutine 75 is entered at step 1600. The concept-subsumes-object subroutine 75 will receive a more general concept and a more specific object, and will identify how the more general concept subsumes the more specific object.

A test is performed during step 1602 to determine if the more general concept is a named concept. If it is determined during step 1602 that the more general concept is not a named concept, then a program control will proceed to step 1616 (FIG. 16*b*), discussed below.

If, however, it is determined during step 1602 that the more general concept is a named concept, then a test is performed during step 1604 to determine if the more general concept is a primitive concept. If it is determined during step 1604 that the more general concept is a primitive concept, then the reason why the more specific object is subsumed by the more general concept must be that the more general concept is in the list of primitives of the more specific object. Accordingly, a message is printed out during step 1606 to indicate that the more specific object is subsumed by the more general concept due to the primitive-subset subsumption inference. Thereafter, program control will return during step 1612 to the calling function.

Figure 16B:
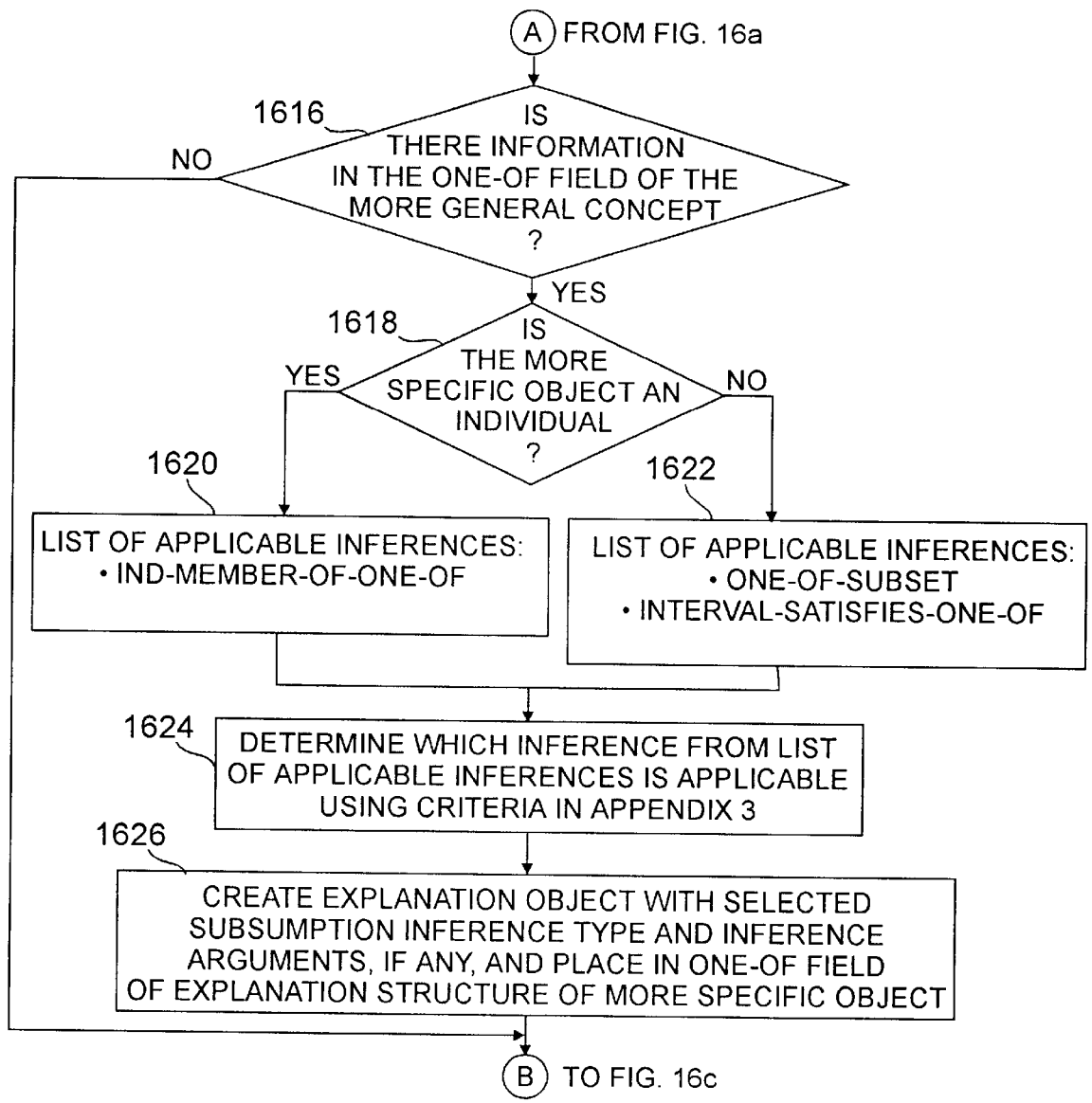

If, however, it is determined during step 1604 that the more general concept is not a primitive concept, then a test is performed during step 1608 to determine if the more general concept is listed in the told parents field of the told descriptor data structure (TCD/TID) 600 associated with the more specific object. If it is determined during step 1608 that the more general concept is not listed in the told parents field of the told descriptor data structure (TCD/TID) 600 associated with the more specific object, program control will proceed to step 1616 (FIG. 16*b*).

If, however, it is determined during step 1608 that the more general concept is listed in the told parents field of the told descriptor data structure (TCD/TID) 600 associated with the more specific object, then a message is printed out during step 1610 to indicate that the more specific object is subsumed by the more general concept due to told information. Thereafter, program control will return during step 1612 to the calling function.

Figure 16C:
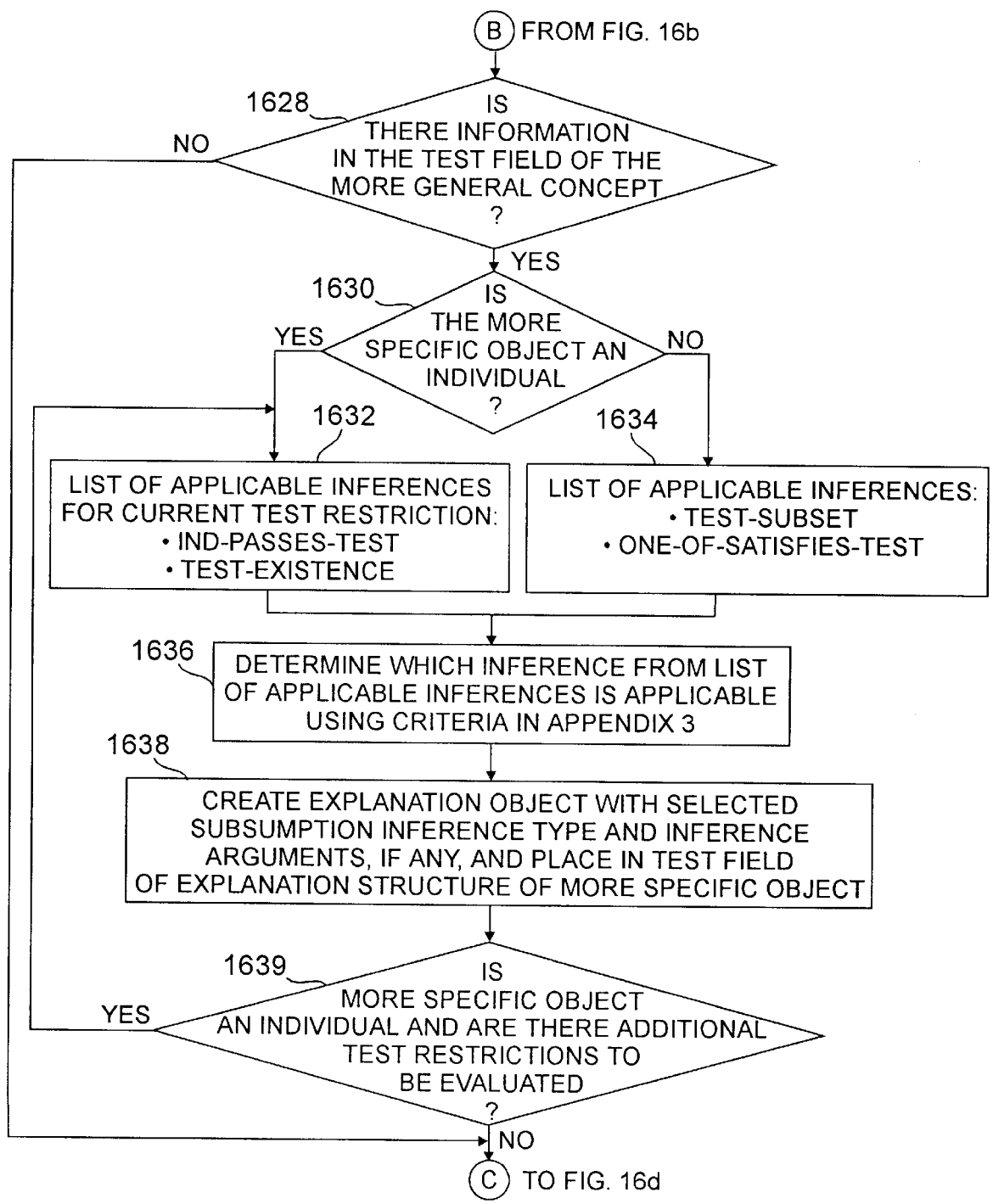

If the more general concept is not a named concept, or is a named concept, but is not a primitive concept or a told parent, then each field of the data structures associated with the more general concept must be traversed to indicate how the associated restriction is satisfied by the more specific object. Thus, a test is performed during step 1616 to determine if there is information in the one-of field of the more general concept. If it is determined during step 1616 that there is no information in the one-of field, program control will proceed to step 1628 (FIG. 16*c*).

If, however, it is determined during step 1616 that there is information in the one-of field, then a test is performed during step 1618 to determine if the more specific object is an individual or a concept, because different subsumption inferences will apply to each case. If it is determined during step 1618 that the more specific object is an individual, the list of applicable inferences will be set during step 1620 to indicate that the one-of restriction must be satisfied due to the subsumption inference, ind-member-of-one-of.

If, however, it is determined during step 1618 that the more specific object is a concept, the list of applicable inferences will be set during step 1622 to indicate that the one-of restriction must be satisfied due to the subsumption inference, one-of-subset, or interval-satisfies-one-of.

Thereafter, the appropriate subsumption inference for the one-of restriction is selected during step 1624 from the list of applicable inferences that was defined by either step 1620 or 1622, utilizing the criteria in Section 3 for each subsumption inference on the list of applicable inferences. An explanation object is created during step 1626 with the selected subsumption inference type and inference arguments, if any, and placed in the one-of field of the explanation structure (EDD) of the more specific object. Thereafter, program control will proceed to step 1628 (FIG. 16*c*).

Figure 16D:
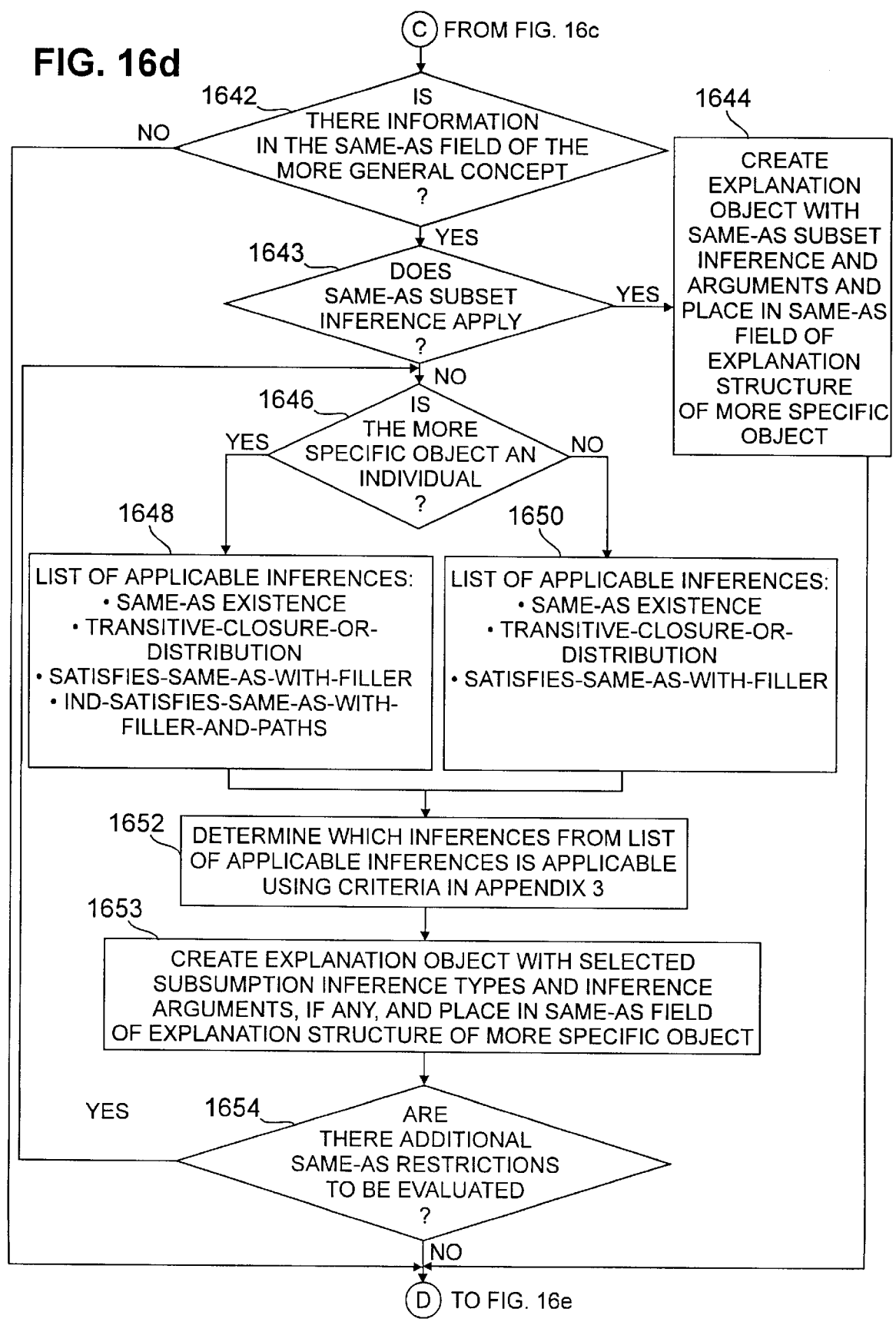

A test is performed during step 1628 to determine if there is information in the test field of the more general concept. If it is determined during step 1628 that there is no information in the test field, program control will proceed to step 1642 (FIG. 16*d*).

If, however, it is determined during step 1628 that there is information in the test field, then a test is performed during step 1630 to determine if the more specific object is an individual or a concept, because different subsumption inferences will apply to each case. If it is determined during step 1630 that the more specific object is an individual, the list of applicable inferences for the current test restriction will be set during step 1632 to indicate that the test restriction must be satisfied due to the subsumption inference, ind-passes-test or test-existence.

If, however, it is determined during step 1630 that the more specific object is a concept, the list of applicable inferences will be set during step 1634 to indicate that the test restriction must be satisfied due to the subsumption inference, test-subset, or one-of-satisfies-test.

Thereafter, the appropriate subsumption inference for the test restriction is selected during step 1636 from the list of applicable inferences that was defined by either step 1632 or 1634, utilizing the criteria in Section 3 for each subsumption inference on the list of applicable inferences. An explanation object is created during step 1638 with the selected subsumption inference type and inference arguments, if any, and placed in the test field of the explanation structure (EDD) of the more specific object.

A test is performed during step 1639 to determine if the more specific object is an individual, and if so, whether there are additional test restrictions to be evaluated. If it is determined during step 1639 that the more specific object is an individual and there are additional test restriction to be evaluated, program control will return to step 1632, and continue in the manner described above. If, however, it is determined during step 1639 that the more specific object is not an individual or there are no additional test restriction to be evaluated, program control will proceed to step 1642 (FIG. 16*d*).

Figure 16E:
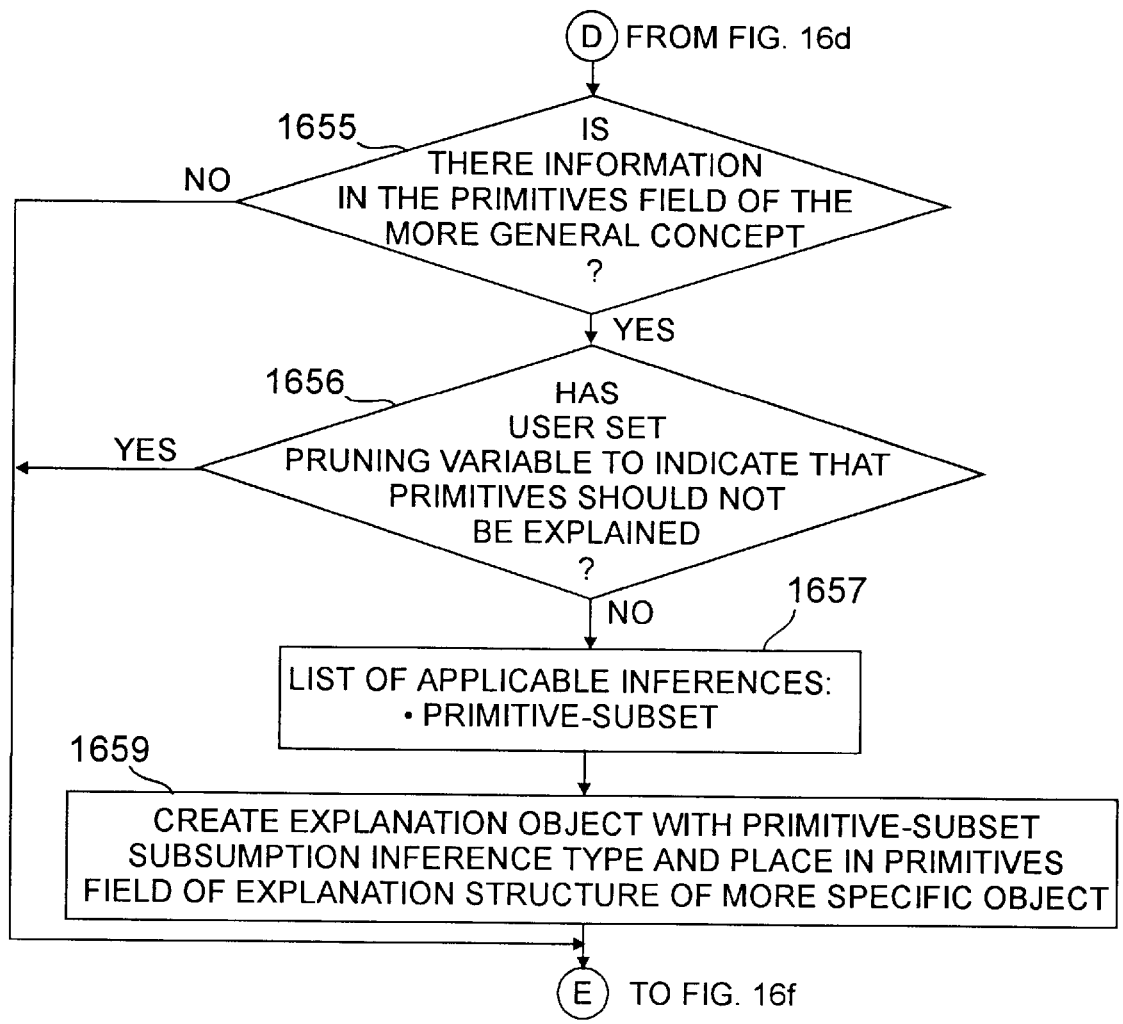

A test is performed during step 1642 to determine if there is information in the same-as field of the more general concept. If it is determined during step 1642 that there is no information in the same-as field, program control will proceed to step 1655 (FIG. 16*e*).

If, however, it is determined during step 1642 that there is information in the same-as field, then a test is performed during step 1643 to determine if the same-as-subset subsumption inference applies, using the criteria in Section 3. If it is determined during step 1643 that the same-as-subset subsumption inference does apply, then an explanation object is created during step 1644 with the same-as-subset subsumption inference type and inference arguments, if any, and placed in the same-as field of the explanation structure (EDD) of the more specific object. Thereafter, program control will proceed to step 1655 (FIG. 16*e*).

If, however, it is determined during step 1643 that the same-as-subset subsumption inference does not apply, then a test is performed during step 1646 to determine if the more specific object is an individual or a concept, because different subsumption inferences will apply to each case. If it is determined during step 1646 that the more specific object is an individual, the list of applicable inferences will be set during step 1648 to indicate that the same-as restriction must be satisfied due to the subsumption inference, same-as existence, transitive-closure-or-distribution, satisfies-same-as-with-filler or ind-satisfies-same-as-with-filler-and-paths.

If, however, it is determined during step 1646 that the more specific object is a concept, the list of applicable inferences will be set during step 1650 to indicate that the test restriction must be satisfied due to the subsumption inference, same-as existence, transitive-closure-or-distribution, or satisfies-same-as-with-filler.

Thereafter, the appropriate subsumption inference for the same-as restriction is selected during step 1652 from the list of applicable inferences that was defined by either step 1648 or 1650, utilizing the criteria in Section 3 for each subsumption inference on the list of applicable inferences. An explanation object is created during step 1653 with the selected subsumption inference type and inference arguments, if any, and placed in the same-as field of the explanation structure (EDD) of the more specific object.

A test is performed during step 1654 to determine if there are additional same-as restrictions to be evaluated. If it is determined during step 1654 that there are additional same-as restrictions to be evaluated, then program control will return to step 1646, and proceed in the manner described above.

If, however, it is determined during step 1654 that there are no additional same-as restrictions to be evaluated, then program control will proceed to step 1655 (FIG. 16*e*).

Figure 16F:
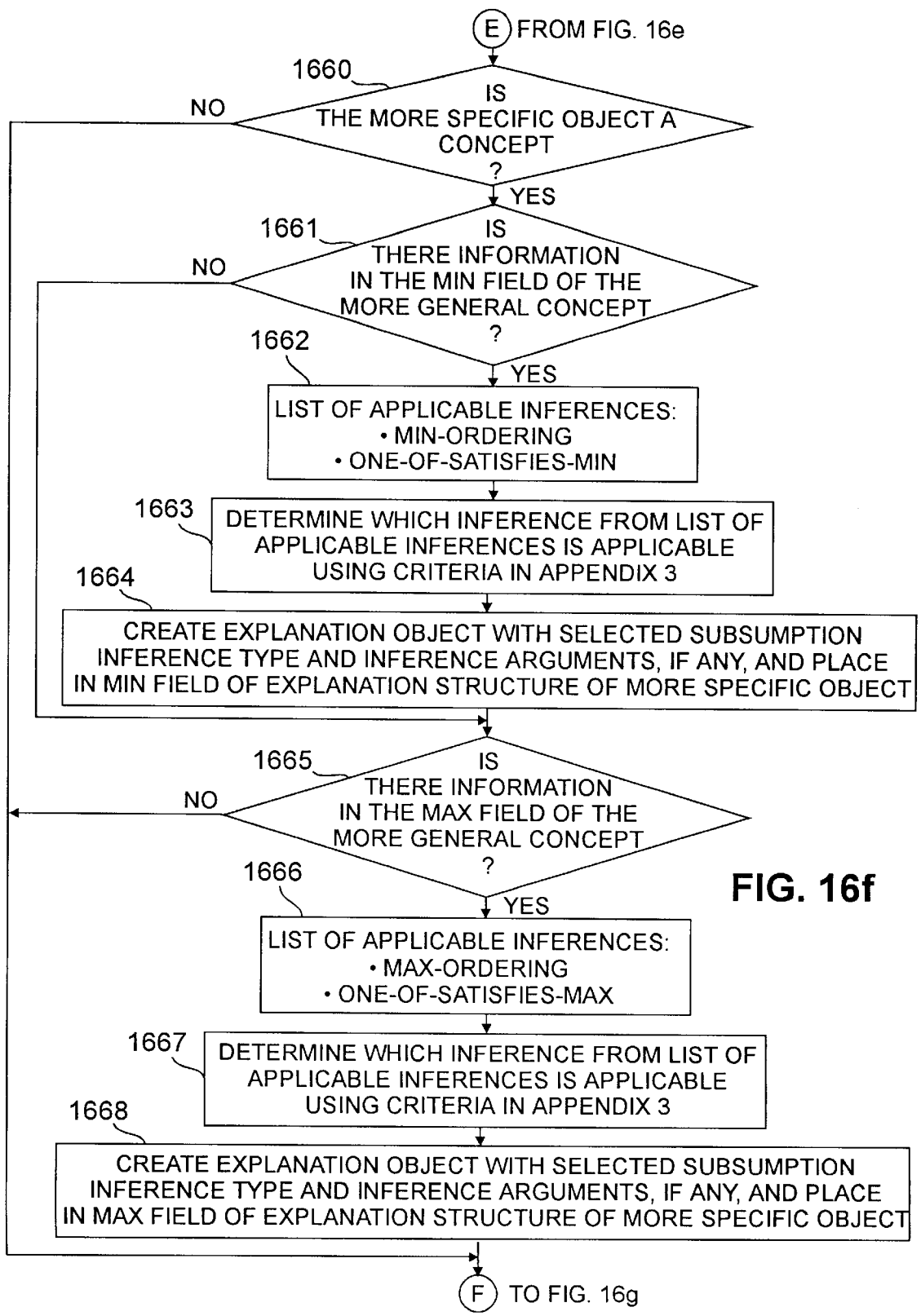

A test is performed during step 1655 to determine if there is information in the primitive field of the more general concept. If it is determined during step 1655 that there is no information in the primitives field, program control will proceed to step 1660 (FIG. 16*f*).

If, however, it is determined during step 1655 that there is information in the primitives field, then a test is performed during step 1656 to determine if the user has set the pruning variable, discussed above, to indicate that primitives should not be explained. If it is determined during step 1656 that the user has set the pruning variables to indicate that primitives should not be explained, then program control will proceed to step 1660 (FIG. 16*f*), discussed below.

If, however, it is determined during step 1656 that the user has not set the pruning variables to indicate that primitives should be explained, then the list of applicable inferences will be set during step 1657 to indicate that the primitives restriction must be satisfied due to the subsumption inference, primitive-subset.

Thereafter, an explanation object is created during step 1659 with the primitive-subset subsumption inference type and placed in the primitives field of the explanation structure (EDD) of the more specific object. Thereafter, program control will proceed to step 1660 (FIG. 16*f*).

Figure 16G:
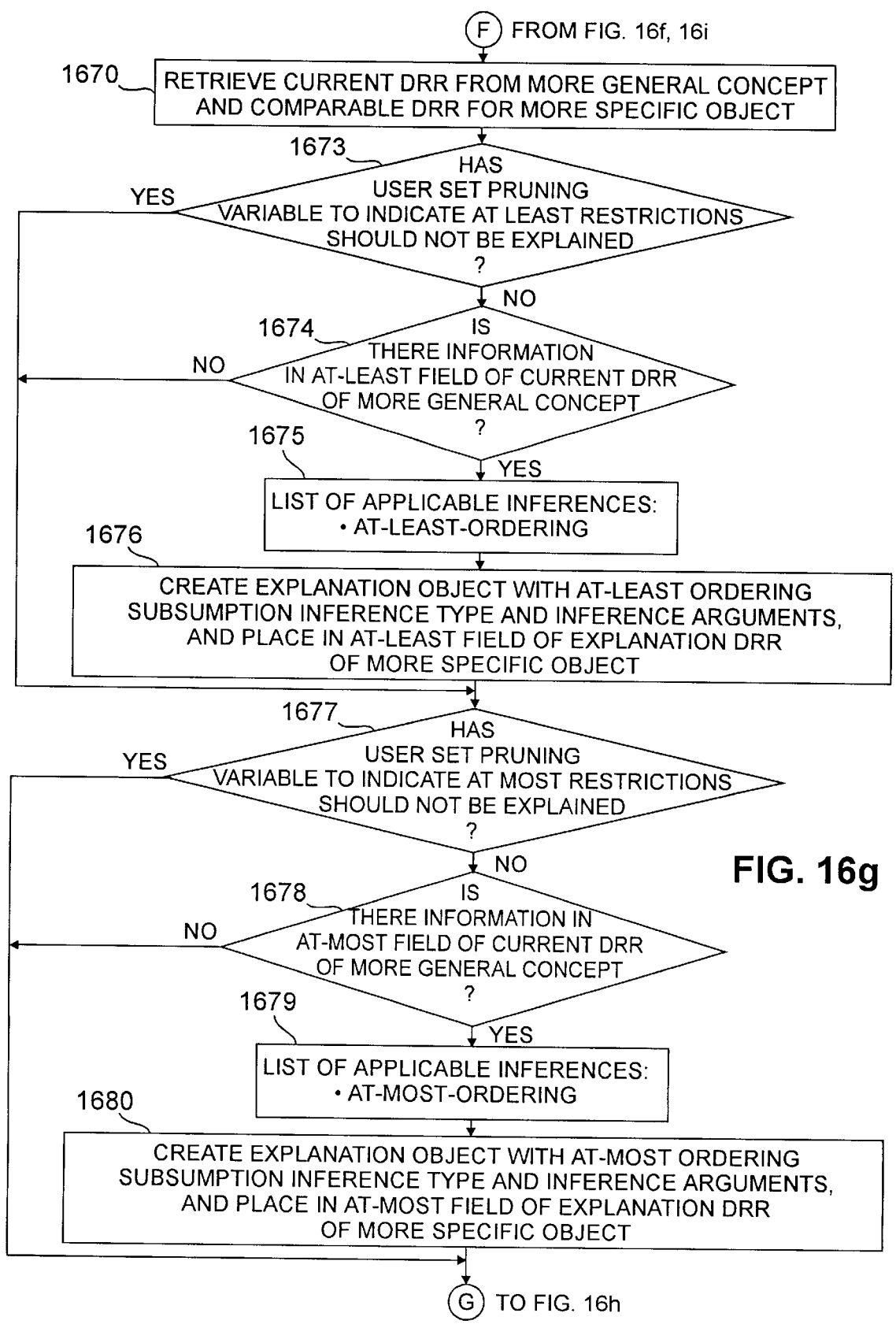

A test is performed during step 1660 to determine if the more specific object is a concept. If it is determined during step 1660 that the more specific object is not a concept, program control will proceed to step 1670 (FIG. 16*g*).

If, however, it is determined during step 1660 that the more specific object is a concept, then a test is performed during step 1661 to determine if there is information in the min field of the more general concept. If it is determined during step 1661 that there is no information in the min field, program control will proceed to step 1665.

If, however, it is determined during step 1661 that there is information in the min field, then the list of applicable inferences will be set during step 1662 to indicate that the min restriction must be satisfied due to the subsumption inference, min-ordering or one-of-satisfies-min.

Thereafter, the appropriate subsumption inference for the min restriction is selected during step 1663 from the list of applicable inferences that was defined during step 1662, utilizing the criteria in Section 3 for each subsumption inference on the list of applicable inferences. An explanation object is created during step 1664 with the selected subsumption inference type and inference arguments, if any, and placed in the min field of the explanation structure (EDD) of the more specific object. Thereafter, program control will proceed to step 1665.

A test is performed during step 1665 to determine if there is information in the max field of the more general concept. If it is determined during step 1665 that there is no information in the max field, program control will proceed to step 1670 (FIG. 16*g*).

If, however, it is determined during step 1665 that there is information in the max field, then the list of applicable inferences will be set during step 1666 to indicate that the max restriction must be satisfied due to the subsumption inference, max-ordering or one-of-satisfies-max.

Thereafter, the appropriate subsumption inference for the max restriction is selected during step 1667 from the list of applicable inferences that was defined during step 1666, utilizing the criteria in Section 3 for each subsumption inference on the list of applicable inferences. An explanation object is created during step 1668 with the selected subsumption inference type and inference arguments, if any, and placed in the max field of the explanation structure (EDD) of the more specific object. Thereafter, program control will proceed to step 1670 (FIG. 16*g*).

The current DRR associated with the more general concept and the comparable DRR associated with the more specific object are retrieved during step 1670. Thereafter, a test is performed during step 1673 to determine if the user has set the pruning variable, discussed above, to indicate that at least restrictions should not be explained. If it is determined during step 1673 that the user has set the pruning variables to indicate that at least restrictions should not be explained, then program control will proceed to step 1677, discussed below.

If, however, it is determined during step 1673 that the user has not set the pruning variables to indicate that at least restrictions should be explained, then a test is performed during step 1674 to determine if there is any information in the at least field of the current DRR of the more general concept. If it is determined during step 1674 that there is no information in the at least field of the current DRR of the more general concept, then program control will proceed to step 1677, discussed below.

If, however, it is determined during step 1674 that there is information in the at least field of the current DRR of the more general concept, then the list of applicable inferences will be set during step 1675 to indicate that the at least restriction must be satisfied due to the subsumption inference, at-least-ordering.

Thereafter, an explanation object is created during step 1676 with the at-least-ordering subsumption inference type and arguments, which is then placed in the at least field of the current explanation structure (EDRR) of the more specific object. Thereafter, program control will proceed to step 1677.

A test is performed during step 1677 to determine if the user has set the pruning variable, discussed above, to indicate that at most restrictions should not be explained. If it is determined during step 1677 that the user has set the pruning variables to indicate that at most restrictions should not be explained, then program control will proceed to step 1682 (FIG. 16*h*), discussed below.

If, however, it is determined during step 1677 that the user has not set the pruning variables to indicate that at most restrictions should be explained, then a test is performed during step 1678 to determine if there is any information in the at most field of the current DRR of the more general concept. If it is determined during step 1678 that there is no information in the at most field of the current DRR of the more general concept, then program control will proceed to step 1682 (FIG. 16*h*), discussed below.

If, however, it is determined during step 1678 that there is information in the at most field of the current DRR of the more general concept, then the list of applicable inferences will be set during step 1679 to indicate that the at most restriction must be satisfied due to the subsumption inference, at-most-ordering.

Figure 16H:
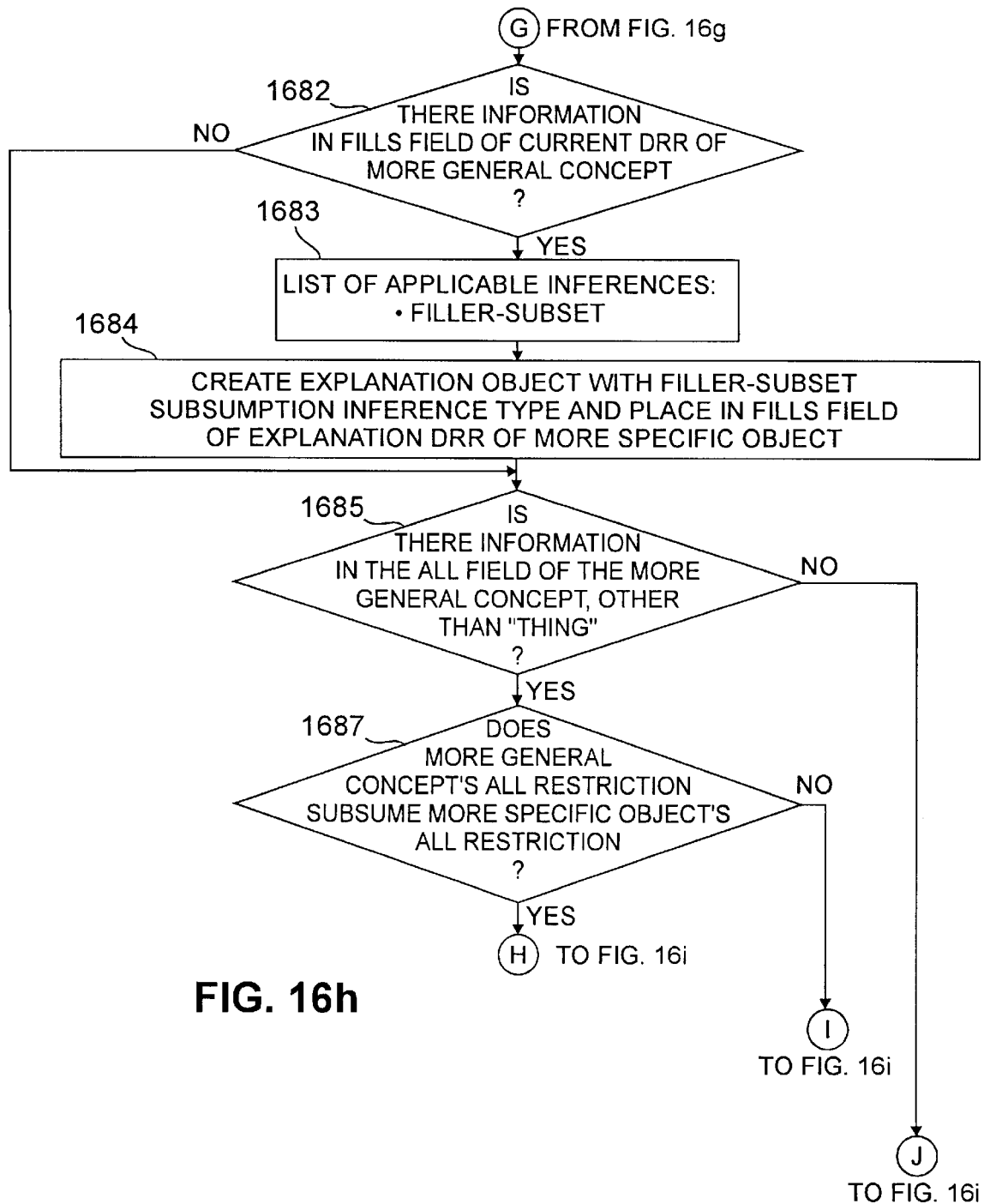

Thereafter, an explanation object is created during step 1680 with the at-most-ordering subsumption inference type and arguments, which is then placed in the at most field of the current explanation structure (EDRR) of the more specific object. Thereafter, program control will proceed to step 1682 (FIG. 16*h*).

A test is performed during step 1682 to determine if there is any information in the fills field of the current DRR of the more general concept. If it is determined during step 1682 that there is no information in the fills field of the current DRR of the more general concept, then program control will proceed to step 1685, discussed below.

If, however, it is determined during step 1682 that there is information in the fills field of the current DRR of the more general concept, then the list of applicable inferences will be set during step 1683 to indicate that the fills restriction must be satisfied due to the subsumption inference, filler-subset.

Thereafter, an explanation object is created during step 1684 with the filler-subset subsumption inference type and arguments, which is then placed in the fills field of the current explanation structure (EDRR) of the more specific object. Thereafter, program control will proceed to step 1685.

A test is performed during step 1685 to determine if there is any information in the all field of the current DRR of the more general concept, other than "thing". It is noted that all objects in the knowledge base 20 should satisfy the top level concept "thing". If it is determined during step 1685 that there is no information in the all field of the current DRR of the more general concept, then program control will proceed to step 1696 (FIG. 16*i*), discussed below.

Figure 16I:
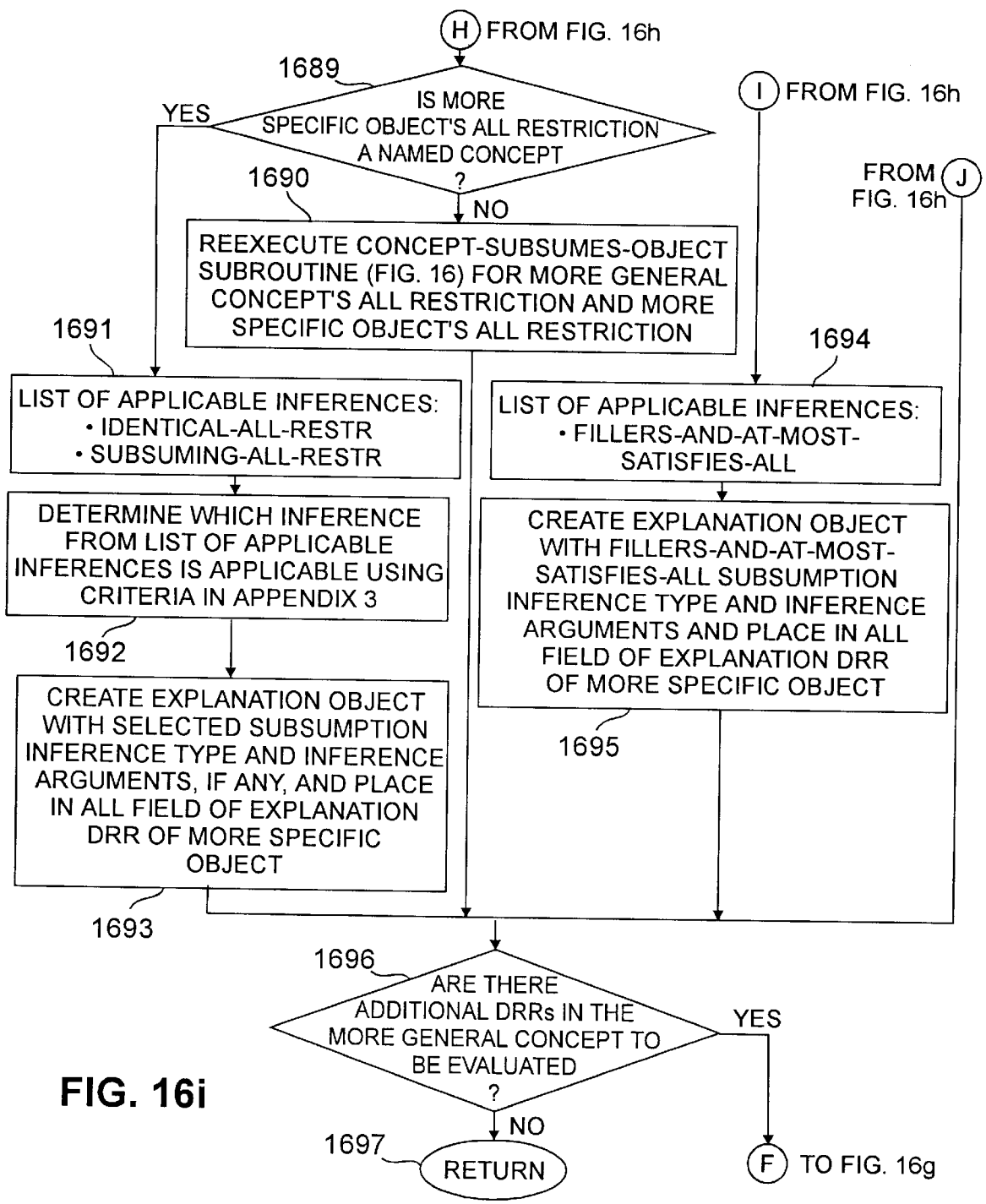

If, however, it is determined during step 1685 that there is information in the all field of the current DRR of the more general concept, then a test is performed during step 1687 to determine if the more general concept's all restriction subsumes the more specific object's all restriction. If it is determined during step 1687 that the more general concept's all restriction does not subsume the more specific object's all restriction, then program control will proceed to step 1694 (FIG. 16*i*).

If, however, it is determined during step 1687 that the more general concept's all restriction does subsume the more specific object's all restriction, then a test is performed during step 1689 (FIG. 16*i*) to determine if the more specific object's all restriction is a named concept. If it is determined during step 1689 that the more object is a named concept, then the list of applicable inferences will be set during step 1691 to indicate that the all restriction must be satisfied due to the subsumption inference, identical-all-restriction or subsuming-all-restriction.

Thereafter, the appropriate subsumption inference for the all restriction is selected during step 1692 from the list of applicable inferences that was defined during step 1691, utilizing the criteria in Section 3 for each subsumption inference on the list of applicable inferences. An explanation object is created during step 1692 with the selected subsumption inference type and inference arguments, if any, and placed in the all field of the current explanation structure (EDRR) of the more specific object. Thereafter, program control will proceed to step 1696.

If, however, it is determined during step 1689 that the more specific object's all restriction is not a named concept, then the concept-subsumes-object subroutine 75 is reexecuted during step 1690 to setup explanation structures explaining why the more general concept's all restriction subsumes the more specific object's all restriction. Thereafter, program control will proceed to step 1696.

If it was determined during step 1687 that the more general concept's all restriction did not subsume the more specific object's all restriction, then program control proceeded to step 1694. The list of applicable inferences will be set during step 1694 to indicate that the current all restriction must be satisfied due to the subsumption inference, fillers-and-at-most-satisfies-all. Thereafter, an explanation object is created during step 1695 with the fillers-and-at-most-satisfies-all subsumption inference type and arguments, which is then placed in the all field of the current explanation structure (EDRR) of the more specific object. Thereafter, program control will proceed to step 1696.

A test is performed during step 1696 to determine if there are additional DRRs in the more general concept to be evaluated. If it is determined during step 1696 that there are additional DRRs in the more general concept to be evaluated, then program control will return to step 1670 and continue in the manner described above.

If, however, it is determined during step 1696 that there are no additional DRRs in the more general concept to be evaluated, then program control will return to the calling function during step 1697.

It is noted that that the explanation subsystem 45 could be configured to also provide an explanation of why a particular concept or rule antecedent is not satisfied by a particular object in the knowledge base 20. In one embodiment, if it is determined that a particular concept or rule antecedent is not satisfied by a particular object, then for each component or part of the concept or rule that is not satisfied, the explanation subsystem 45 will preferably indicate the appropriate "why not" subsumption inference from the inferences listed in Section 4 to explain why that component is not satisfied by the particular object.

Complete Explanation Function

Figure 17:
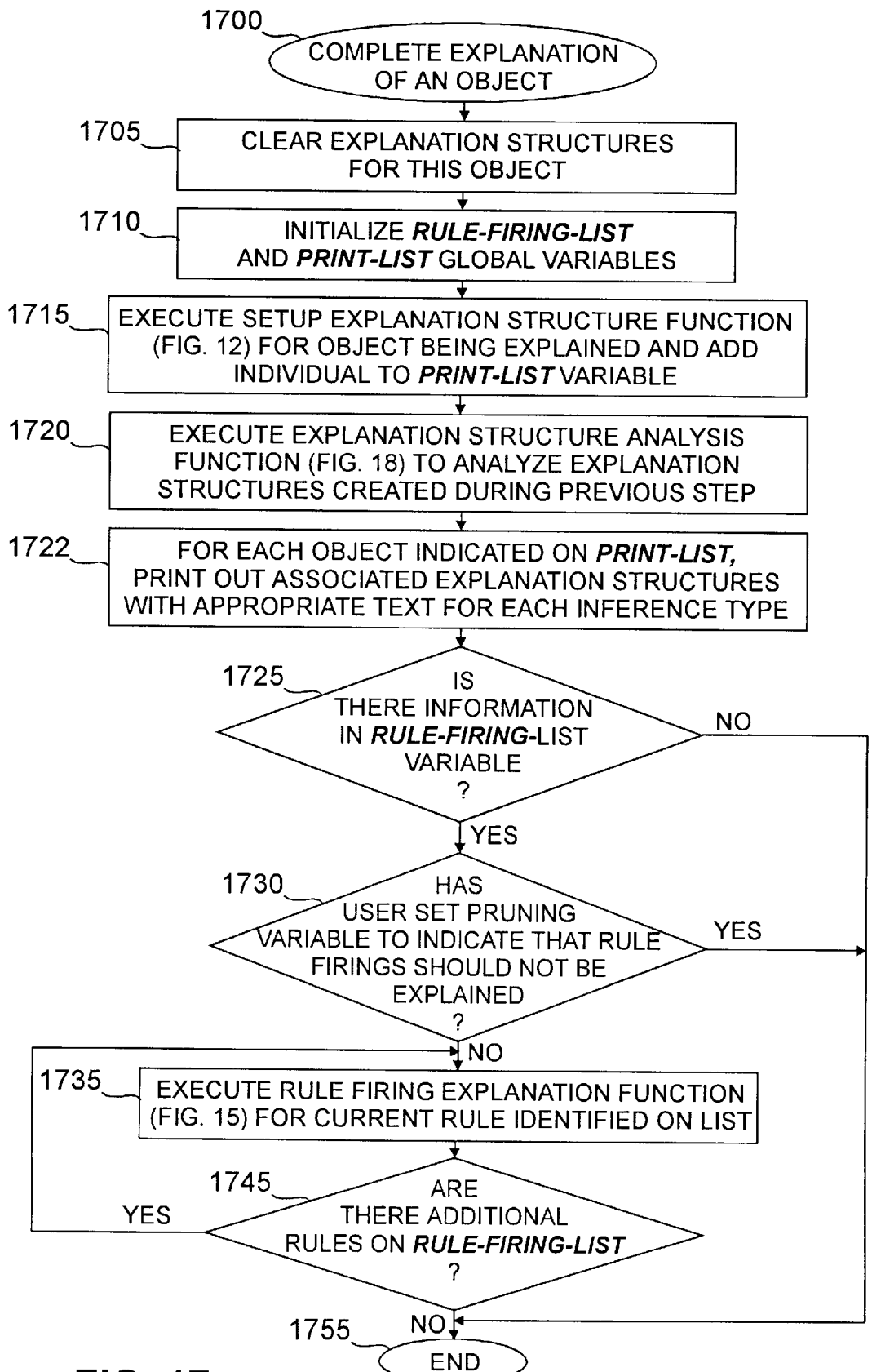
FIG. 17 is a flow chart describing an exemplary complete explanation function as utilized by the knowledge representation system to provide a complete explanation of the source of information stored for a particular object.

As previously indicated, the complete explanation function 55, illustrated in FIG. 17, provides a user with a complete explanation of the information for a particular object by recursively tracing back the source of each piece of information until it reaches the point that the source of the information is told information which has been asserted by the user or the result of a rule firing. As shown in FIG. 17, the complete explanation function 55 is entered at step 1700.

As previously indicated, each object in the knowledge base 20 will have associated explanation data structures for storing explanation information for the associated object. Specifically, each object in the knowledge base 20 will have an associated explanation derived descriptor (EDD) data structure 1000, shown in FIG. 10*a*, for explaining the information that is stored in the derived descriptor data structure (DCD/DID) 800 associated with the object being explained. In addition, for each role defined in the knowledge base 20 which has been restricted on this object, the object will have a explanation DRR (EDRR) data structure 1050, shown in FIG. 10*b*, for explaining the information that is stored in the associated derived role restriction (DRR) data structure 900 for the object.

Each of the EDD and EDRR data structures associated with the current object being completely explained are preferably cleared during step 1705. Thereafter, two global variables, rule-firing-list and print-list, are initialized, which are utilized to maintain a list of applicable rules, and a list of the concepts and individuals whose explanation structures should be printed, respectively.

Thereafter, the setup explanation structure function 58 is executed during step 1715, in the manner described above in conjunction with FIG. 12, for the current object being completely explained. The setup explanation structure function 58 will generate the appropriate first level explanation objects to explain each piece of information stored for the object, in accordance with the explanation limitation requests of the user. An indication of the current object being explained is added to the variable, print-list, during step 1715.

Following execution of the setup explanation structure function 58, at least one explanation object has been generated for each piece of information that is stored for the current object being completely explained, in accordance with the explanation limitation requests of the user. As previously indicated, each explanation object includes an indication of the inference type and the arguments associated with the inference, if any.

The complete explanation function 55 will execute an explanation structure analysis function 80, discussed below in conjunction with FIG. 18, during step 1720, in order to identify those pieces of information that were explained on the first level during step 1715 which require further explanation. As discussed further below, following execution of the explanation structure analysis function 80, program execution will return to the complete explanation function 55 at step 1722.

The complete explanation function 55 will print out the explanation information during step 1722. For each object that is listed in the variable, print-list, the complete explanation function 55 will print out the explanation objects from each of the associated explanation structures with a message that is appropriate for the particular type of inference associated with the explanation object. As indicated in FIG. 1, an explanation text library 90 is preferably maintained which contains an appropriate text message for each inference type.

After each of the explanation objects that were generated by the complete explanation function 55 during steps 1715 and 1720 have been printed out, program control will proceed to step 1725.

A test is performed during step 1725 to determine if there is any information stored in the variable, rule-firing-list, which may have been modified during execution of the explanation structure analysis function 80. If it is determined during step 1725 that there is no information stored in the variable, rule-firing-list, program control will proceed to step 1755, discussed below.

If, however, it is determined during step 1725 that there is information stored in the variable, rule-firing-list, then a test is performed during step 1730 to determine if the user has set the pruning variables to indicate that rule firings should not be explained. If it is determined during step 1730 that the user has indicated that rule firings should not be explained, then program control will proceed to step 1755, discussed below.

If, however, it is determined during step 1730 that the user has indicated that rule firings should be explained, then the rule firing explanation function 70, discussed above in conjunction with FIG. 15, will be executed during step 1735 for the current rule identified on the returned rule-firing-list. The rule firing explanation function 70 will explain why the rule fired for the current individual being explained, in other words, how the antecedent and filters, if any, of the current rule are satisfied by the individual being explained.

A test is performed during step 1745 to determine if there are additional rules listed in the variable, rule-firing-list, to be evaluated. If it is determined during step 1745 that there are additional rules to be evaluated, program control will return to step 1735, and continue in the manner described above.

If, however, it is determined during step 1745 that there are no additional rules to be evaluated, program control will proceed to step 1755, where program execution will terminate.

Figure 18:
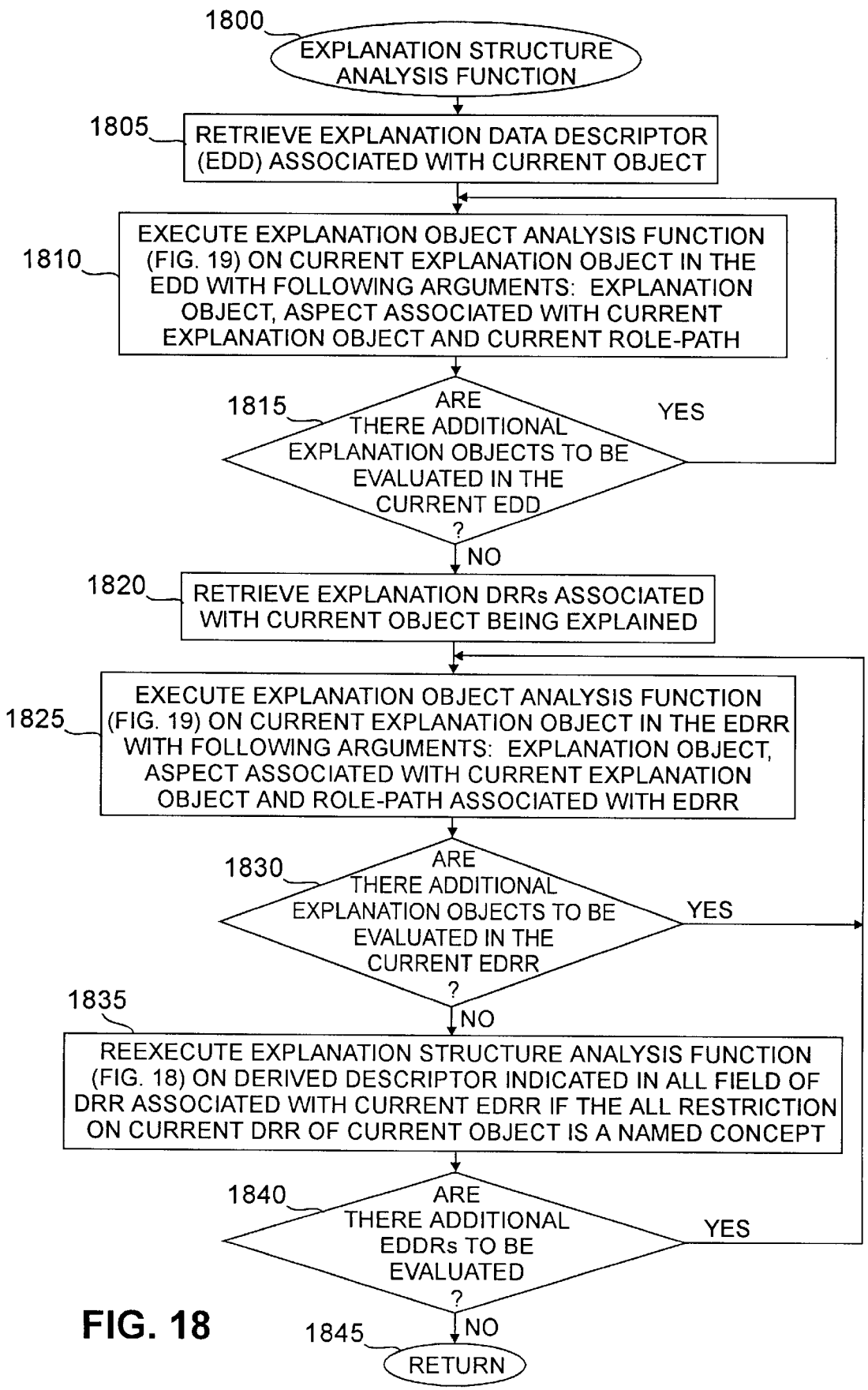
FIG. 18 is a flow chart describing an exemplary explanation structure analysis function as utilized by the complete explanation function of FIG. 17 to analyze the explanation structures of an object being explained to determine if further explanation is necessary.

As previously indicated, the complete explanation function 55 will execute an explanation structure analysis function 80, illustrated in FIG. 18, during step 1720. The explanation structure analysis function 80 will analyze the first level explanation structures created for the current object being explained during step 1715 of the complete explanation function 55 and identify those pieces of information which should be further explained. As discussed further below, the explanation structure analysis function 80 will execute an explanation object analysis function 85, illustrated in FIG. 19, for each explanation object to determine how to obtain the necessary further explanation based on the inference type associated with each explanation object. Essentially, the explanation object analysis function 85 determines what the next logical question would be as each piece of information is explained.

As shown in FIG. 18, the explanation structure analysis function 80 will be entered at step 1800. The explanation structure analysis function 80 will retrieve the explanation derived descriptor (EDD) data structure 1000 associated with the current object being explained during step 1805, in order that each explanation object in the EDD and associated EDRRs may be analyzed to determine if further explanation is necessary.

Figure 19A:
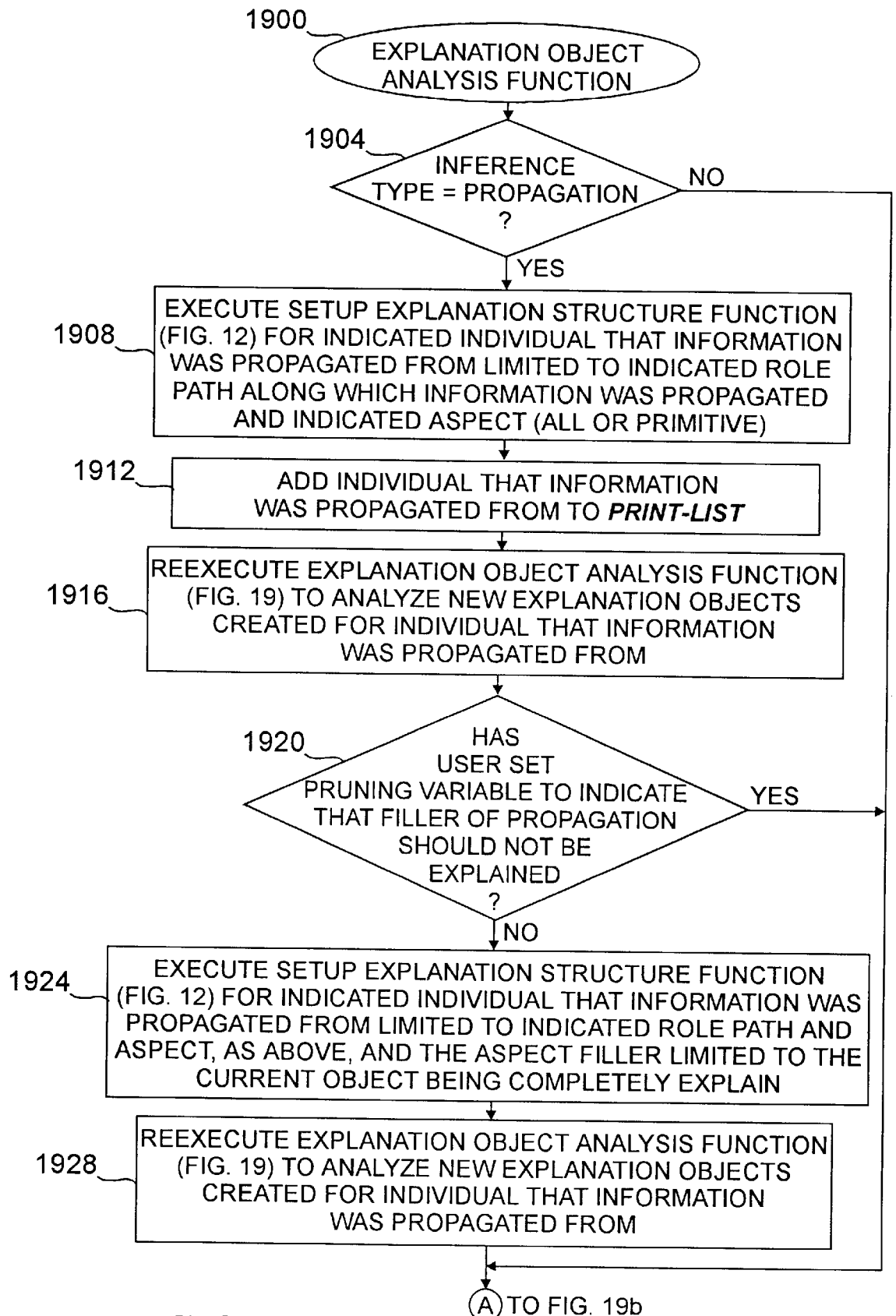
FIGS. 19a through 19c, collectively, are a flow chart describing an exemplary explanation object analysis function as utilized by the explanation structure analysis function of FIG. 18 to analyze the explanation objects within an explanation structure of an object being explained to determine if further explanation is necessary, and if so, how the further information is obtained.
Figure 19B:
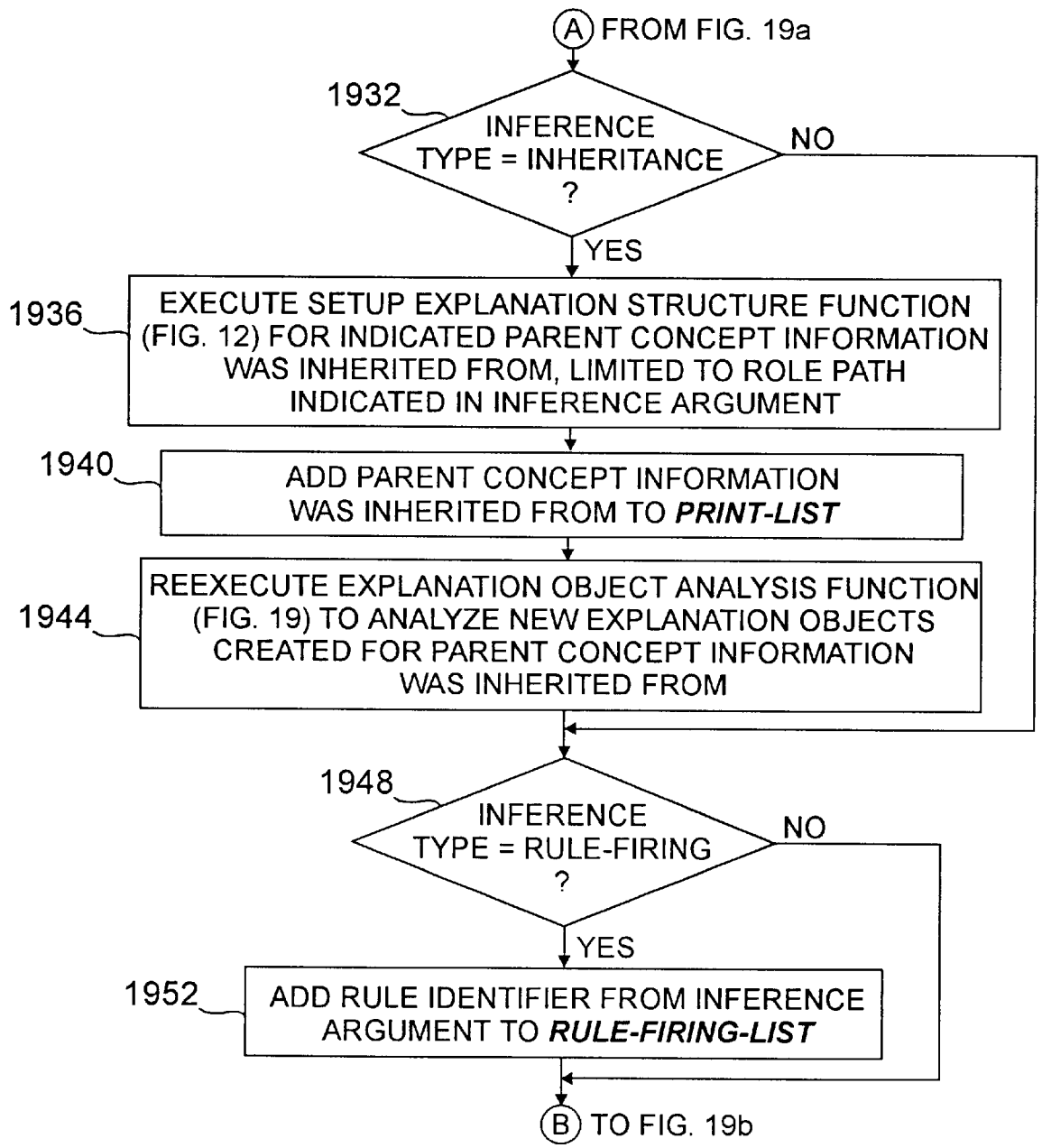
Figure 19C:
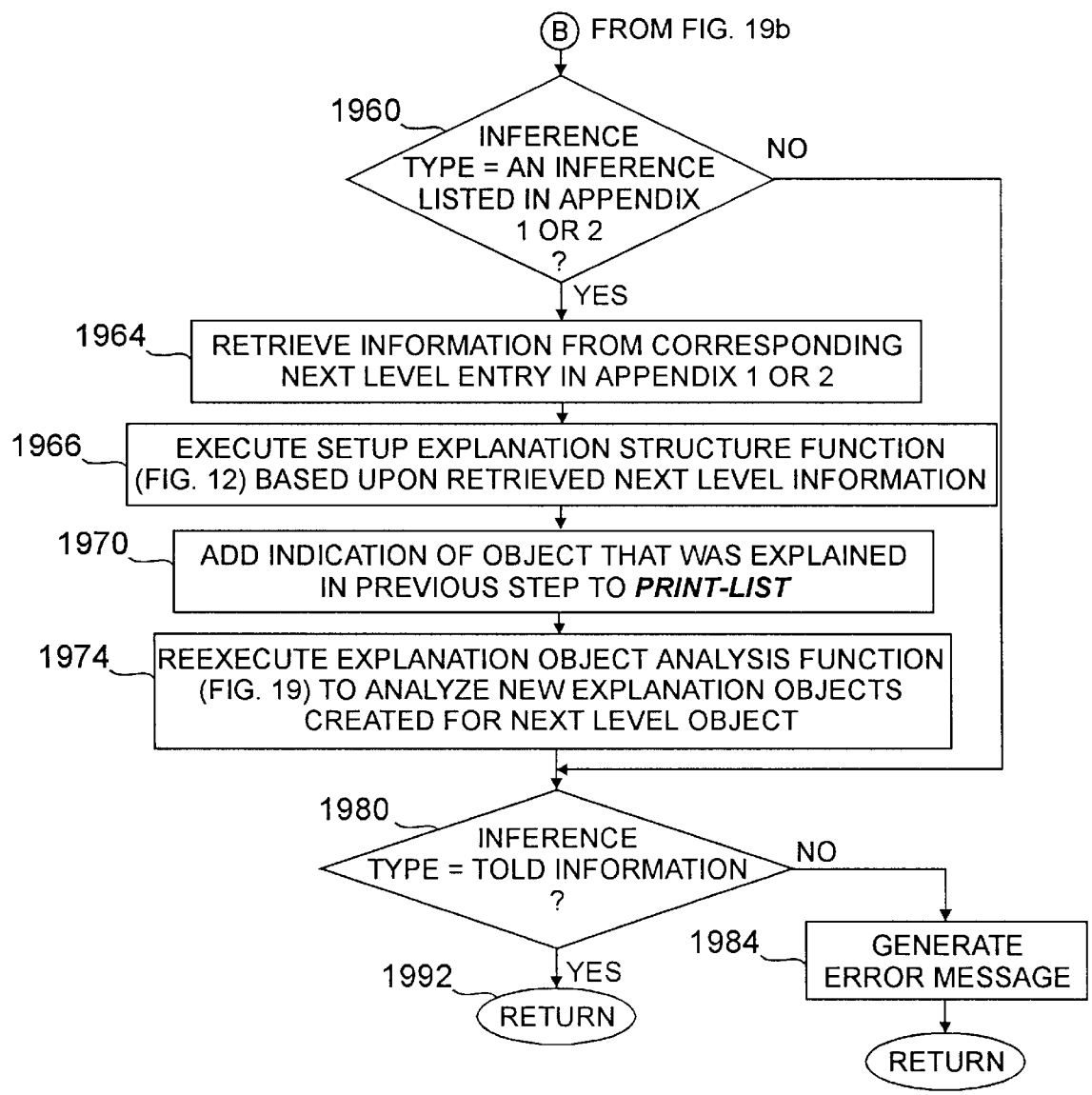

The explanation object analysis function 85, discussed below in conjunction with FIGS. 19a through 19c, is executed during step 1810 for the current explanation object in the EDD with the following arguments: an indication of the current explanation object, an indication of the aspect associated with the current explanation object, and current role-path. As discussed below, the explanation object analysis function 85 will determine if the information explained by the explanation object needs further explanation, and if so, how the further information is obtained.

Following execution of the explanation object analysis function 85, a test is performed during step 1815 to determine if there are additional explanation objects in the current EDD to be evaluated. If it is determined during step 1815 that there are additional explanation objects to be evaluated, program control will return to step 1810, and continue in the manner described above.

If, however, it is determined during step 1815 that there are no additional explanation objects to be evaluated, program control will proceed to step 1820, wherein the explanation structure analysis function 80 will begin analyzing the explanation structures (EDRRs) associated with the roles of the current object being explained. The explanation object analysis function 85 will retrieve each of the explanation DRRs (EDRRs) associated with the current object being explained during step 1820.

Thereafter, the explanation structure analysis function 80 will execute the explanation object analysis function 85 (FIG. 19) on the current explanation object in the current EDRR with the following arguments: an indication of the current explanation object, an indication of the aspect associated with the current explanation object, and an indication of the current role-path associated with the current EDRR. As discussed below, the explanation object analysis function 85 will determine if the information explained by the explanation object needs further explanation, and if so, how the further information is obtained.

Following execution of the explanation object analysis function 85, a test is performed during step 1830 to determine if there are additional explanation objects in the current EDRR to be evaluated. If it is determined during step 1830 that there are additional explanation objects to be evaluated, program control will return to step 1825, and continue in the manner described above.

If, however, it is determined during step 1830 that there are no additional explanation objects to be evaluated in the current EDRR, program control will proceed to step 1835, wherein the explanation structure analysis function 80 will recursively execute the explanation structure analysis function 80 on the derived descriptor indicated in the all field 940 of the derived role restriction (DRR) data structure 900 associated with the current EDRR if the all restriction on the current DRR of the current object is a named concept. In this manner, information associated with the indicated concept will then be completely explained.

Following execution of the explanation structure analysis function 80 during step 1835, a test is performed during step 1840 to determine if there are additional EDRRs to be evaluated. If it is determined during step 1840 that there are additional EDRRs to be evaluated, program control will return to step 1825 to process the next EDRR, and continue in the manner described above.

If, however, it is determined during step 1840 that there are no additional EDRRs to be evaluated, program control will proceed to step 1845, wherein execution of the explanation structure analysis function 80 will be terminated.

The explanation object analysis function 85, discussed in conjunction with FIGS. 19a through 19c, is executed by the explanation structure analysis function 80 to analyze each explanation object associated with an object currently being explained. The explanation object analysis function 85 will determine if the information explained by the explanation object being analyzed needs further explanation, and if so, how the further information is obtained. As previously indicated, the explanation object analysis function 85 essentially determines what the next logical question would be as each piece of information is explained. The explanation object analysis function 85 receives the following arguments: an indication of the explanation object to be analyzed, an indication of the aspect associated with the current explanation object, and an indication of the role-path associated with the current explanation object, if any.

As shown in FIG. 19a, the explanation object analysis function 85 will be entered at step 1900. The inference type is tested against a number of test conditions in steps 1904, 1932, 1948, 1960 and 1980 until a match is found. Once the inference type has been classified, the explanation object analysis function 85 can identify what the next step in the explanation process should be.

A test is performed during step 1904 to determine if the inference type of the current explanation object is a propagation. If it is determined during step 1904 that the current inference type is not a propagation, program control will proceed to step 1932 (FIG. 19b), discussed below.

If, however, it is determined during step 1904 that the current inference type is a propagation, then two next level questions are implicated. First, a user would likely want to know how the individual who the information was propagated from received the propagated information. Second, the user would likely want to know how the individual who the information was propagated from received the current individual being explained as a filler.

Thus, to answer the first question, the explanation object analysis function 85 will execute during step 1908 the setup explanation structure function 58, discussed above in conjunction with FIG. 12, for the individual that the information was propagated from. The explanation requested during step 1908 is preferably limited to the role-path along which the information was propagated, which is an inference argument listed in the explanation object, and the explanation should also be limited to the aspect associated with the current explanation object.

It is noted that upon execution of the setup explanation structure function 58 during step 1908, the explanation objects that were created to explain how the individual that the information was propagated from received the information will be placed in an explanation structure associated with the individual that the information was propagated from. Accordingly, the individual that the information was propagated from must be added to the print-list during step 1912.

In addition, the explanation objects that were created during step 1908 to explain how the individual that the information was propagated from received the information may also need to be further explained. Accordingly, the explanation object analysis function 85 will be recursively executed during step 1916 to analyze the new explanation objects. In this manner, the explanation object analysis function 85 will continue to explain the piece of information explained by the current explanation object until the source of the information is told information or the result of a rule firing.

Thereafter, a test is performed during step 1920 to determine if the user has set the pruning variables to indicate that the filler of a propagation should not be explained, in other words, it is determined whether the second next level question for a propagation be answered. If it is determined during step 1920 that the user has indicated that the filler of a propagation should not be explained, then program control will proceed to step 1932 (FIG. 19b), discussed below.

If, however, it is determined during step 1920 that the user has indicated that the filler of a propagation should be explained, then the explanation object analysis function 85 will execute during step 1924 the setup explanation structure function 58, discussed above in conjunction with FIG. 12, for the individual that the information was propagated from, limited to the indicated role-path and aspect, as in step 1908, and also limited to only explain a particular aspect filler, namely, the current object being completely explained.

In addition, the explanation objects that were created during step 1924 to explain how the individual that the information was propagated from received the particular filler may also need to be further explained. Accordingly, the explanation object analysis function 85 will be recursively executed during step 1928 to analyze the new explanation objects. In this manner, the explanation object analysis function 85 will continue to explain the piece of information explained by the current explanation object until the source of the information is told information or the result of a rule firing. Thereafter, program control will proceed to step 1932 (FIG. 19b).

A test is performed during step 1932 to determine if the inference type of the current explanation object is an inheritance inference. If it is determined during step 1932 that the current inference type is not an inheritance inference, program control will proceed to step 1948, discussed below.

If, however, it is determined during step 1932 that the current inference type is an inheritance inference, then the next level question that a user would normally ask is how did the parent concept from which the information was inherited receive the information.

Thus, the explanation object analysis function 85 will execute the setup explanation structure function 58 during step 1936 for the particular parent concept that the information was inherited from, limited to the particular role-path indicated in the inference argument, which is part of the current explanation object being evaluated.

It is noted that upon execution of the setup explanation structure function 58 during step 1936, the explanation objects that were created to explain how the parent concept received the information will be placed in an explanation structure associated with the parent concept. Accordingly, the parent concept must be added to the print-list variable during step 1940.

In addition, the explanation objects that were created during step 1936 to explain how the parent concept received the information may also need to be further explained. Accordingly, the explanation object analysis function 85 will be recursively executed during step 1944 to analyze the new explanation objects. In this manner, the explanation object analysis function 85 will continue to explain the piece of information explained by the current explanation object until the source of the information is told information or the result of a rule firing.

A test is performed during step 1948 to determine if the inference type of the current explanation object is a rule firing. If it is determined during step 1948 that the inference type of the current explanation object is not a rule firing, program control will proceed to step 1960 (FIG. 19c), discussed below.

If, however, it is determined during step 1948 that the inference type of the current explanation object is a rule firing, then the rule identifier that appears in the inference argument portion of the explanation object is preferably added to the variable, rule-firing-list, during step 1952. The variable, rule-firing-list, is ultimately processed in the complete explanation function 55, during steps 1725–1745, in the manner described above. Thereafter, program control will proceed to step 1960 (FIG. 19c).

The manner in which the inferences listed in Section 1 and 2 are handled during complete explanation are discussed below relative to steps 1960 through 1974. A test is performed during step 1960 to determine if the current inference type is one of the inferences listed in Section 1 or 2. If it is determined during step 1960 that the current inference type is not one of the inferences listed in Section 1 or 2, then program control will proceed to step 1980, discussed below.

If, however, it is determined during step 1960 that the current inference type is one of the inferences listed in Section 1 or 2, then the corresponding next level entry in the Section for the current inference type is accessed during step 1964. The next level entry in the Section indicates how any further information that may be needed to explain the current explanation object is obtained.

Thereafter, the setup explanation structure function 58 is executed during step 1966 in the manner indicated by the next level information that was retrieved from the corresponding next level entry in the Section during step 1964. In addition, an indication of the object that was further explained during step 1970 is added to the print-list variable.

Finally, the explanation objects that were created during step 1966 to explain how the next level object received the information may also need to be further explained. Accordingly, the explanation object analysis function 85 will be recursively executed during step 1974 to analyze the new explanation objects. In this manner, the explanation object analysis function 85 will continue to explain the piece of information explained by the current explanation object until the source of the information is told information or the result of a rule firing.

Thereafter, a test is performed during step 1980 to determine if current inference type is told information. If it is determined during step 1980 that the current inference type is not told information, then an error message is generated during step 1984 because the inference type failed to match one of the pre-defined inference type classifications.

If, however, it is determined during step 1980 that the current inference type is told information, then no further explanation needs to be performed for the piece of information associated with the current explanation object. Accordingly, program control will return to the explanation structure analysis function 80 during step 1992.

Application of Explanation Subsystem to Error Objects

As previously indicated, upon detection of a real error by the error handling subsystem 35, before returning the knowledge base 20 to a consistent state, the error handling subsystem 35 will preferably create an error object which stores all of the information associated with the inconsistent object at a time when the data structures of the object included all of the error information.

In addition, error objects are also preferably created for every object in the knowledge base 20 that is affected by the error, in other words, for all objects in the knowledge base 20 that were modified as a result of the problematic input before the inconsistency was detected. Thus, error objects are preferably created for those individuals listed in the "propagations out" and "NEG-DEPENDS-ON-ME" lists of the individual whom the error information was initially added to.

Thereafter, a user can utilize the explanation processes described above to analyze the created error objects. The explanation processes will explain the source of each piece of derived information in the error objects, in the manner described above, which will assist the user in isolating the source of the error.

It is to be understood that the embodiments and variations shown and described herein are illustrative of the principles of this invention only and that various modifications may be implemented by those skilled in the art without departing from the scope and spirit of the invention.

Section 1—Regular/Normalization Inferences
Inference: at-least-and-one-of-implies-fillers
Arguments: none
Necessary conditions: The at-least restriction on a role equals the length of the one-of restriction.
Inferred information: All the individuals in the one-of restriction become fillers for the role.
Next level explanation: Explain where the one-of restriction came from; explain where the at-least restriction came from.
Example: Given the restriction (and (at-least 2 grape) (all grape (one-of Zinfandel Petite-Syrah))), then the fillers for the grape role must be Zinfandel and Petite-Syrah.
Inference: attribute-implies-at-most-1
Arguments: none
Necessary conditions: a role is defined to be an attribute
Inferred information: the at-most restriction is set to 1
Next level explanation: none
Inference: classic-ind-implies-classic-thing
Arguments: none
Necessary conditions: The top-level object is an individual, and it does not already have CLASSIC-THING in its primitive list.
Inferred information: CLASSIC-THING gets put in its primitive list.

Next level explanation: none
Inference: closed-implies-at-most
Arguments: none
Necessary conditions: A role on an individual is closed.
Inferred information: The at-most restriction on the role for the individual is set to the current number of fillers.
Next level explanation: none
Inference: fillers-implies-at-least
Arguments: none
Necessary conditions: A role on an object has known fillers, and the current at-least restriction on that role for the object is less than the current number of fillers.
Inferred information: The at-least restriction on the role for the individual is set to the current number of fillers.
Next level explanation: Explain where the fillers came from.
Example: If the grape role is filled with Shiraz and Cabernet-Sauvignon, and the current at-least restriction on the grape role is less than 2, then the at-least restriction on the grape role is set to 2.
Inference: filter-one-of-by-interval
Arguments: none
Necessary conditions: A descriptor contains both a one-of and an interval (min and/or max).
Inferred information: The new one-of restriction is the previous one-of restriction with individuals removed if they are not in the specified interval.
Next level explanation: Explain where the min and max came from.
Inference: filter-one-of-by-tests
Arguments: none
Necessary conditions: A descriptor contains both a one-of and test restrictions.
Inferred information: The new one-of restriction is the previous one-of restriction with individuals removed if they do not satisfy all the test restrictions.
Next level explanation: Explain where each test restriction came from.
Example: If something is known to be an INTEGER (and thus has the integerp test) and has a one-of restriction of 1, 1.2, and 5, then this inference will remove the 1.2 value, and the new one-of restriction will contain the individuals 1 and 5.
Inference: inconsistent-all-implies-at-most-zero
Arguments: none
Necessary conditions: An inconsistent all restriction is encountered on a role restriction.
Inferred information: The at-most restriction on the role is set to 0.
Next level explanation: Explain where the all restriction came from.
Example: If the original restriction is (all child (and female male)), where female and male are disjoint, the deduction is made that there can be no children, and the at-most restriction on the child role is set to 0.
Inference: interval-and-integer-implies-at-most
Arguments: (1) the min restriction; (2) the max restriction
Necessary conditions: A role is restricted to type INTEGER (the all restriction contains the integerp test), and the complete interval is specified (both the min and the max).
Inferred information: The at-most restriction is set to the number of integers in the interval.
Next level explanation: Explain where the min and max restrictions came from, and explain where the integerp test came from.
Example: If an object has the restriction (all age (and INTEGER (min 15) (max 18))), then the at-most restriction is set to 4.

Inference: interval-implies-at-most
Arguments: (1) the min restriction; (2) the max restriction
Necessary conditions: A role's all restriction has an interval, where both the min and max are specified and are equal.
Inferred information: the at-most restriction is set to 1.
Next level explanation: Explain where the min and max restrictions came from.
Inference: interval-implies-host-thing
Arguments: none
Necessary conditions: A concept or individual has a min or max restriction.
Inferred information: The primitive HOST-THING is added to its primitive list (because it must be in the HOST realm).
Next level explanation: Explain where the min and max restrictions came from.
Inference: interval-length-equals-at-least-implies-fillers
Arguments: none
Necessary conditions: There is an interval on the all restriction of a role, the length of the interval equals the at-least restriction, and the role is restricted to type INTEGER (the all restriction contains the integerp test).
Inferred information: All the integers in the interval become fillers for the role.
Next level explanation: Explain where the min and max restrictions came from, explain where the integerp test restriction came from, and explain where the at-least restriction came from.
Example: If an object has the restriction (and (at-least 3 favorite number) (all favorite number (and (integer (min 14) (max 16))))) then the fillers for favorite-number get set to 14, 15, and 16.
Inference: interval-test
Arguments: none
Necessary conditions: A descriptor contains an interval restriction (a min and/or max restriction).
Inferred information: The test restrictions numbered and atom are added to the descriptor, since it must be a NUMBER.
Next level explanation: Explain where the min and max restrictions came from.
Inference: inverse-propagation
Arguments: (1) the role on the object whose all restriction led to this inference; (2) the role-path along which the all restriction was found; (3) the information which was propagated—can be either a named or an unnamed concept.
Necessary conditions: The roles r1 and r2 are inverses of each other; a descriptor has the following restriction: (and (at-least 1 r1) (all r1 (all r2 C))) for some description C.
Inferred information: C gets propagated onto the descriptor.
Next level explanation: Explain how the information in C got onto the all restriction of r1's r2.
Example: If we know that child and parent are inverse roles, andwe know that a particular individual, Deb, has at-least 1 parent and all of her parents have only ATHLETEs as children, then Deb must be an ATHLETE. The argument in this example is the parent role, indicating that all of Deb's parent's children are ATHLETEs.
Inference: one-of-implies-at-most
Arguments: none
Necessary conditions: An all restriction on a role contains a one-of restriction.
Inferred information: The at-most restriction on the role is set to the number of individuals in the one-of restriction.
Next level explanation: Explain where the one-of restriction came from.
Example: For the description (all color (one-of White Red Rose)), the at-most restriction on the color role is set to 3.

Inference: one-of-implies-classic-thing
Arguments: none
Necessary conditions: A descriptor has a one-of restriction containing CLASSIC individuals.
Inferred information: It will have the primitive CLASSIC-THING added to its primitive list (because it must be in the CLASSIC realm).
Next level explanation: Explain where the one-of restriction came from.
Inference: one-of-implies-host-thing
Arguments: none
Necessary conditions: A descriptor has a one-of restriction containing HOST individuals.
Inferred information: It will have the primitive HOST-THING added to its primitive list (because it must be in the HOST realm).
Next level explanation: Explain where the one-of restriction came from.
Inference: one-of-intersection
Arguments: none
Necessary conditions: More than 1 one-of restriction restricts a descriptor
Inferred information: The one-of restrictions are intersected to form a new one-of restriction.
Next level explanation: Explain where all the one-of restrictions came from.
Example: If a concept has two one-of restrictions: (one-of Mary Jane Jack) and (one-of Jack Jill Susan), either through told-info, inheritance, or some other inference, then the final one-of restriction will be (one-of Jack Jill).
Inference: role-hierarchy-inherit-all
Arguments: (1) the parent role from which the information was inherited; (2) the role-path along which the all restriction was found, not including the final parent role. (The second argument may be needed if the all restriction which is inherited is not a named concept.)
Necessary conditions: There is an all restriction on a role, and this role has some child roles.
Inferred information: All child roles inherit this all restriction.
Next level explanation: Explain where the all restriction came from on the parent role.
Example: If an object has a wine role with the all restriction WINE, then the subroles white-wine and red-wine would inherit this restriction from the wine role. The first argument in this example is the wine role.
Inference: role-hierarchy-inherit-at-most
Arguments: (1) the parent role from which the information was inherited
Necessary conditions: There is an at-most restriction on a role, and this role has some child roles.
Inferred information: All child roles inherit this at-most restriction.
Next level explanation: Explain where the at-most restriction came from on the parent role.
Example: If an object has a wine role with an at-most restriction of 3 and there are two subroles of wine, white-wine and red-wine, then both white-wine and red-wine would inherit the at-most restriction of 3 from their parent role wine.
Inference: role-hierarchy-inherit-at-least
Arguments: (1) the child role from which the information was inherited
Necessary conditions: There is an at-least restriction on a role, and this role has a parent role.
Inferred information: The at-least restriction is "inherited" up the hierarchy to the parent role and all ancestor roles.
Next level explanation: Explain where the at-least restriction came from on the child role.
Example: In the example from role-hierarchy-inherit-at-most, if the white-wine role has an at-least restriction of 2, then the parent role wine also gets an at-least of 2.
Inference: role-hierarchy-inherit-fills
Arguments: (1) the child role from which the information was inherited
Necessary conditions: There are fillers for a role, and this role has a parent role.
Inferred information: The fillers are "inherited" up the hierarchy to the parent role and all ancestor roles.
Next level explanation: Explain where the fillers came from on the child role.
Example: In the example from role-hierarchy-inherit-at-most, if the white-wine role had a filler of Forman-Chardonnay, then the parent role wine would also get the filler Forman-Chardonnay.
Inference: role-restr-implies-classic-thing
Arguments: none
Necessary conditions: A descriptor has a role restriction (at-least, at-most, all or fills).
Inferred information: It will have the primitive CLASSIC-THING added to its primitive list (because it must be in the CLASSIC realm).
Next level explanation: Explain where the at-least, at-most, fills, and all restrictions came from on the role.
Inference: same-as-implies-classic-thing
Arguments: none
Necessary conditions: A descriptor has at least one same-as restriction.
Inferred information: It will have the primitive CLASSIC-THING added to its primitive list (because it must be in the CLASSIC realm).
Next level explanation: Explain where the same-as restrictions came from on the descriptor.
Inference: subrole-combination-implies-at-least
Arguments: the subroles used to calculate the restriction
Necessary conditions: A role has 2 child roles, the child roles have disjoint all restrictions (i.e., they must be filled with distinct individuals), and the at-least restriction on the parent role is less than the sum of the at-least restrictions on the child roles.
Inferred information: The at-least restriction on the parent role is set to the sum of the at-least restrictions on the child roles.
Next level explanation: Explain where the at-least restrictions came from on both of the child roles.
Example: If brother and sister are roles with parent role relative; and on a particular descriptor, sister's all restriction is FEMALE and brother's all restriction is MALE, where FEMALE and MALE are disjoint; and there is an at-least restriction of 1 on both sister and brother; and the current at-least restriction on relative is 1; then the at-least restriction on relative is set to 2.
Inference: subrole-combination-implies-at-most
Arguments: (1) the parent role that has the at-most restriction; (2) a list of the subroles that have the at-least restrictions
Necessary conditions: A role has several child roles. on a particular object, the parent role has an at-most restriction, and some child roles have at-least restrictions, and disjoint all restrictions. There is another child role with a disjoint all restriction from the other child roles, and its current at-most restriction is greater than the difference between the at-most restriction on the parent role, and the sum of the at-least restrictions on the other child roles.

Inferred information: The at-most restriction on this child role gets set to the difference between the at-most restriction on the parent role, and the sum of the at-least restrictions on the other child roles.
Next level explanation: Explain where the at-most restriction came from on the parent role, and explain where the at-least restrictions came from on the sibling roles.
Example: Given the roles relative, brother, and sister defined above, where the all restrictions on brother and sister are disjoint, then if we have an at-most 5 relative restriction, and we know there are at-least 2 brothers, then this inference is used to deduce that there are at-most 3 sisters.
Inference: test-c-implies-classic-thing
Arguments: none
Necessary conditions: A descriptor has a test-c restriction (a test restriction for individuals in the CLASSIC realm).
Inferred information: It will have the primitive CLASSIC-THING added to its primitive list (because it must be in the CLASSIC realm).
Next level explanation: Explain where the test restriction came from.
Inference: test-h-implies-host-thing
Arguments: none
Necessary conditions: A descriptor has a test-h restriction (a test restriction for individuals in the HOST realm).
Inferred information: It will have the primitive HOST-THING added to its primitive list (because it must be in the HOST realm).
Next level explanation: Explain where the test restriction came from.
Section2—Same-as NormalizationInferences
Inference: same-as-implies-all
Arguments: (1) and (2) the two role paths from the same-as restriction; (3) the role-path along which the same-as restriction was found.
Necessary conditions: A same-as restriction exists on a descriptor, and one role path has an all restriction at the end of the path which is a named concept.
Inferred information: The all restriction at the end of the other path of the same-as restriction will be the identical named concept.
Next level explanation: Explain where the same-as restriction came from, and explain where the all restriction at the end of the first role path came from.
Inference: same-as-implies-at-least-1
Arguments: (1) and (2) the two role paths from the same-as restriction; (3) the role-path along which the same-as restriction was found.
Necessary conditions: A same-as restriction exists on a descriptor.
Inferred information: The at-least restrictions on all the attributes in both paths of the same-as restriction get set to 1.
Next level explanation: Explain where the same-as restriction came from.
Inference: same-as-implies-filler
Arguments: (1) and (2) the two role paths from the same-as restriction; (3) the role-path along which the same-as restriction was found.
Necessary conditions: A same-as restriction exists on a descriptor, and at the end of one role path of the same-as restriction, there is a known filler.
Inferred information: The end of the other role path gets the same filler.
Next level explanation: Explain where the filler came from on the first role path.
Section 3—Subsumption "why" Inferences Inference: at-least-ordering
Arguments: (1) subsumee at-least; (2) subsumer at-least.
Inference description: The at-least restriction on the subsumee is no smaller than the at-least on the subsumer.
Example: (at-least 3 r) is subsumed by (at-least 2 r).
Inference at-most-ordering
Arguments: (1) subsumee at-most; (2) subsumer at-most
Inference description: The at-most restriction on the subsumee is no larger than the at-most on the subsumer.
Inference: filler-subset
Arguments: none
Inference description: The fillers of the subsumer are a subset of the fillers of the subsumee.
Inference: fillers-and-at-most-satisfies-all
Arguments: (1) subsumee fillers; (2) subsumer all restriction
Inference description: If all the fillers of a role r1 on an individual I1 are known (the number of fillers equals the at-most restriction), and each of the fillers satisfies a description D1, then I1 satisfies the description (all r1 D1).
Example: For example, if Mary and Bill are both known to be ATHLETES, and Sue is defined as (and (fills child Mary Bill) (at-most 2 child)), then Sue satisfies the description: (all child ATHLETE).
Inference: identical-all-restr
Arguments: no arguments, if both all restrictions are the same classified concept; otherwise: (1) subsumer all restriction; (2) subsumee all restriction.
Inference description: The all restriction on the subsumer is equivalent to the all restriction on the subsumee.
Inference: ind-member-of-one-of
Arguments: none
Inference description: The individual satisfies a one-of restriction because it is one of the individuals in the one-of. There is no other way that a top-level individual can satisfy a one-of restriction.
Inference: ind-passes-test
Arguments: none
Inference description: The individual satisfies a test restriction because when the test runs on the individual, it returns T.
Inference: ind-satisfies-interval
Arguments: (1) the piece of the interval currently being explained (the min or the max).
Inference description: For a top-level HOST individual: for the min and/or max, whichever are specified, the individual is no smaller than the min, and no larger than the max.
Inference: ind-satisfies-same-as-with-filler-and-paths
Arguments: (1) the intermediate individual, (2) and (3) the two paths on the individual which are equivalent, and (4) optionally, a list containing pairs of a same-as restriction which contributes to those paths being equivalent, along with the role-path along which the same-as was found. The final argument is not there if the two paths are the two paths of a same-as.
Inference description: The individual satisfies the same-as because there is an intermediate individual along both the paths of the same-as, and then the rest of both paths are equivalent somehow through other same-as restrictions.
Example: For example, suppose concept Cl is defined as:
  (SAMEAS (favorite-teacher best-friend)
    (mother husband)).
Now suppose that Jane's favorite-teacher and mother are both Sally, and Sally has the restriction: (same-as (best-friend) (husband)). C1 subsumes Jane by the ind-satisfies-same-as-with-filler-and-paths inference, with the intermediate individual Sally, and the equivalent tail paths: (husband) and (best-friend).

Inference: interval-satisfies-one-of
Arguments: (1) subsumee min; (2) subsumee max; (3) subsumer one-of.
Inference description: The subsumee is restricted to being an INTEGER. The min and max are both specified, and each integer from the min through the max is in the subsumer's one-of restriction.
Inference: max-ordering
Arguments: (1) subsumee max; (2) subsumer max.
Inference description: The max restriction on the subsumee is no larger than the max on the subsumer.
Inference: min-ordering
Arguments: (1) subsumee min; (2) subsumer min.
Inference description: The min restriction on the subsumee is no smaller than the min on the subsumer.
Inference: one-of-satisfies-max
Arguments: (1) subsumee one-of restriction; (2) subsumer max restriction.
Inference description: All the individuals in the one-of restriction are numbers, and each one is no larger than the max.
Inference: one-of-satisfies-min
Arguments: (1) subsumee one-of restriction; (2) subsumer min restriction.
Inference description: All the individuals in the one-of restriction are numbers, and each one is no smaller than the min.
Inference: one-of-satisfies-tests
Arguments: (1) the subsumee's one-of restriction.
Inference description: Every individual in the subsumee's one-of restriction satisfies all the subsumer's tests.
Inference: one-of-subset
Arguments: none
Inference description: The individuals in the one-of restriction on the subsumee are a subset of the individuals in the one-of restriction on the subsumer.
Inference: primitive-subset
Arguments: none
Inference description: The primitives of the subsumer are a subset of the primitives of the subsumee.
Inference: same-as-existence
Arguments: none The subsumee satisfies a same-as restriction because it has the identical same-as restriction.
Inference: same-as-subset
Arguments: none
Inference description: The same-as restrictions of the subsumer are a subset of the same-as restrictions of the subsumee.
Inference: satisfies-same-as-with-filler
Arguments: (1) the filler
Inference description: The same filler is at the end of each of the two paths of the same-as restriction.
Inference: subsuming-all-restr
Arguments: (1) subsumer all restriction; (2) subsumee all restriction
Inference description: The all restriction on the subsumer subsumes the all restriction on the subsumee.
Inference: test-existence
Arguments: none
Inference description: The subsumee satisfies a test restriction because it has the identical test restriction.
Inference: test-subset
Arguments: none
Inference description: The test restrictions of the subsumer are a subset of the test restrictions of the subsumee.
Inference: transitive-closure-or-distribution
Arguments: any number of (same-as restr, role-path) pairs, where the role-path is the role-path from the top-level object, along which the contributing same-as restr was found.

Inference description: A concept or individual satisfies a same-as restriction by a combination of transitive closure and distribution over all restrictions.
Example: Suppose concept C1 is defined as:
  (same-as (lawyer) (best-friend)), and concept C2 is defined as:
  (and (same-as (lawyer) (teacher))
    (same-as (teacher) (best-friend))).
C2 satisfies the same-as restriction on C1 by transitive-closure-or-distribution, with the two same-as restrictions:
  ((teacher) (best-friend)) and ((lawyer) (teacher)).
Section 4—Subsumption "why not" Inferences
Inference: bad-at-least-ordering
Arguments: (1) "subsumes" at-least; (2) "subsumer" at-least.
Inference description: The at-least restriction on the "subsumee" is smaller than the at-least on the "subsumer".
Inference: bad-at-most-ordering
Arguments: (1) "subsumee" at-most; (2) "subsumer" at-most.
Inference description: The at-most restriction on the "subsumee" is larger than the at-most on the "subsumer".
Inference: bad-max-ordering
Arguments: (1) "subsumee" max; (2) "subsumer" max.
Inference description: The max restriction on the "subsumee" is larger than the max on the "subsumer".
Inference: bad-min-ordering
Arguments: (1) "subsume" min; (2) "subsumer" min.
Inference description: The min restriction on the "subsumee" is smaller than the min on the "subsumer".
Inference: doesnt-satisfy-incoherent
Arguments: (1) the incoherent all restriction on the "subsumer"; (2) the all restriction on the "subsumee".
Inference description: An incoherent all restriction cannot be satisfied.
Inference: fillers-dont-satisfy-all
Arguments: (1) "subsumee" fillers which don't satisfy the all restriction; (2) "subsumer" all restriction.
Inference description: Not all the fillers satisfy the all restriction.
Inference: fillers-missing
Arguments: (1) the fillers not satisfied
Inference description: The fillers of the "subsumer" are not a subset of the fillers of the "subsumee".
Inference: ind-doesnt-pass-tests
Arguments: (1) the tests the individual doesn't pass.
Inference description: The individual doesn't satisfy all the test restrictions. An individual can satisfy a test if running the test on the individual returns T, or if the individual has the identical test in its descriptor.
Inference: ind-doesnt-satisfy-same-as
Arguments: (1) the same-as restrictions the individual doesn't satisfy.
Inference description: The individual doesn't satisfy all the same-as restrictions.
Inference: ind-not-member-of-one-of
Arguments: (1) the one-of restriction
Inference description: The individual does not satisfy the one-of restriction because it is not one of the individuals in the one-of.
Inference: non-subsuming-all-restr
Arguments: (1) the "subsumer" all restr; (2) the "subsumee" all restr.
Inference description: The all restriction on the "subsumee" doesn't satisfy the all restriction on the "subsumer".
Inference: one-of-not-satisfied
Arguments: (1) "subsumee" one-of restriction; (2) "subsumer" one-of restriction.

Inference description: The one-of in the "subsumee" contains individuals not in the one-of of the "subsumer".
Inference: prims-not-satisfied
Arguments: (1) the primitives not satisfied
Inference description: The primitives of the "subsumer" are not a subset of the primitives of the "subsumee".
Inference: role-not-closed
Arguments: (1) the "subsumer" all restriction; (2) the role.
Inference description: The fillers cannot satisfy the all restriction, because the role is not closed on the individual.
Inference: same-as-not-satisfied
Arguments: (1) the same-as restrictions not satisfied.
Inference description: Not all the same-as restrictions are satisfied.
Inference: tests-not-satisfied
Arguments: (1) the tests not satisfied
Inference description: The tests of the "subsumer" are not a subset of the tests of the "subsumee".
Inference: thing-doesnt-satisfy
Arguments: (1) the all restriction not satisfied
Inference description: THING cannot satisfy a non-vacuous all restriction.

We claim:

1. In a general-purpose computer implemented knowledge base system of the type wherein the knowledge base system provides an explanation of inferences that allow information about an object to be inferred, the knowledge base system comprising:
   a general purpose-computing system;
   an input device;
   a memory unit for storing a host programming language; and
   means responsive to an input from a user utilizing the input device and employing a description language allowing the user to make assertions about objects in a domain of interest, to identify classes of objects and to establish a relationship among objects for automatically generating an explanation in response to the input and reducing the amount of information in the explanation as specified by the input.

2. The system according to claim 1, wherein said knowledge base system is embodied as a configurator.

3. In a description logic-based knowledge base system which contains objects and has error detection means and explanation means for explaining the objects and inferences that allow information about an object to be inferred, the improvement comprising:
   means in the error detecting means for returning an entity which was a source of the error;
   means for defining the entity as an object to which the explanation means may be applied; and
   means responsive to an input from a user employing a description language allowing the user to make assertions about objects in a domain of interest, to identify classes of objects and to establish a relationship among objects for automatically generating an explanation in response to the input and reducing the amount of information in the explanation as specified by the input.

4. The system according to claim 3, further including means for applying said explanation means to said object.

5. The system according to claim 4, further including means for maintaining error objects associated with other objects in said knowledge base affected by said error.

6. A system for use in a general-purpose computer implemented description logic-based knowledge base system for explaining on demand the source of derived information stored for an object in said knowledge base, said derived information being ascertained about said object based on information entered into said knowledge base by a user and a plurality of inferences performed on said entered information to allow further information to be inferred, said explanation system comprising:
   an input device;
   a memory unit for storing a host programming language;
   means for automatically generating explanation objects responsive to an input from a user utilizing the input device, the explanation objects explaining the immediate source of each piece of said derived information stored for said object, each of said explanation objects including an indication of said inference which generated said piece of derived information;
   processor means for analyzing each of said generated explanation objects to identify explanation objects associated with said pieces of derived information requiring further explanation and to utilize said explanation object generation means to generate said further explanation; and
   means for receiving an indication of portions of said derived information which should be explained, wherein said indication of portions of said derived information which should be explained consists of settings for a plurality of pruning variables which specify whether portions of said explanation should be generated.

7. A system for explaining the source of derived information stored for an object in a description logic-based knowledge base system, said derived information being ascertained about said object based on information entered into said description logic-based knowledge base system by a user and a plurality of inferences performed on said entered information to allow further information to be inferred, said explanation system comprising:
   means for receiving an indication of portions of said derived information which should be explained; and
   explanation object generation means responsive to said receiving means for automatically generating explanation objects which explain the immediate source of said pieces of said derived information which said user has requested to be explained, said means for generating explanation objects further comprising:
   means for discarding each piece of said derived information stored for said object;
   means for rederiving each piece of said derived information; and
   means for generating an explanation object for each piece of said rederived information indicating the source of said piece of rederived information.

8. The system of claim 7, wherein said indication of portions of said derived information which should be explained consists of an entry on a command line by a user of said description logic-based knowledge base system indicating which portions of said explanation should be generated.

9. The system of claim 8, wherein said command line entry indicates one or more aspects of said information stored for said object which should be explained.

10. In a description logic-based knowledge base system of the type wherein the knowledge base provides an explanation of inferences that allow information about an object to be inferred, the improvement comprising:
    means for explaining why an object in said knowledge base satisfies a concept in said knowledge base; and means responsive to an input from a user employing a description language allowing the user to make assertions about objects in a domain of interest, to identify classes of objects and to establish a relationship among objects for automatically generating an explanation in response to the input and reducing the amount of information in the explanation as specified by the input.

11. A subsumption explanation method for use in a general-purpose computer implemented knowledge base system for explaining why an object in said knowledge base system satisfies a concept in said knowledge base, said concept being defined by a concept description having one or more components, said subsumption explanation method comprising:

employing a description language allowing a user to make assertions about objects in a domain of interest to identify classes of objects and to establish relationships among objects, to define a concept to be explained;

automatically identifying for each component of said concept description a list of one of more subsumption inferences which may be applicable to said component, each of said subsumption inferences explaining a manner in which the associated component may be satisfied; and automatically selecting from the list of applicable subsumption inferences associated with each of said coaponents, a subsumption inference which explains how the object being explained satisfies the particular component.

12. The subsumption explanation method according to claim 11, wherein said concept is a rule antecedent of a rule and said subsumption explanation method explains why said rule was fired on an individual.

13. The subsumption explanation method according to claim 12, further including the step of verifying that a filter associated with said rule is satisfied and explaining how said individual satisfies said filter.

14. A method for use in a general-purpose computer implemented knowledge base system for identifying the source of errors in a knowledge base stored in a memory, said knowledge base system including a mechanism for explaining the source of information, said method comprising the steps of:

automatically detecting the occurrence of an inconsistency in the information stored in said knowledge base;

automatically identifying objects in said knowledge base system that are affected by said error information;

automatically creating an error object for each of said identified objects that are affected by said error information, said error object being created at a time when said identified objects include the error information and including information about the error which facilitates an explanation of why the error occurred; and automatically applying said explanation mechanism to said created error objects to identify said source of said error.

15. The method according to claim 14, wherein said step of identifying affected objects identifies all objects that received information that was propagated from the object that the error information was initially added to and all objects who must be reclassified if information is removed from said object that the error information was initially added to.

16. The method according to claim 14, wherein said step of identifying affected objects identifies all objects that were modified as a result of the error input before said inconsistency was detected.

17. The system according to claim 14, wherein said knowledge base system is embodied as a configurator.

18. A general-purpose computer implemented system for explaining the source of derived information stored for an object in a memory in a description logic-based knowledge base system, said derived information being ascertained about said object based on information entered into said description logic-based knowledge base system by a user utilizing an input device and a plurality of inferences performed on said entered information to allow further information to be inferred said explanation system comprising:

means for receiving an indication of portions of said derived information which should be explained, wherein said indication of portions of said derived information which should be explained consists of settings for a plurality of pruning variables which specify whether portions of said explanation should be generated;

processing means for automatically generating explanation objects which explain the immediate source of each piece of derived information stored for said object, each of said explanation objects including an indication of said inference which generated said piece of derived information; and processing means for analyzing said generated explanation objects and for automatically generating further explanation for said generated explanation objects requiring further explanation, said further explanation being generated for each piece of derived information until one or more termination conditions are reached.

19. The explanation system of claim 18, wherein said termination conditions generate said further explanation until the source of the information is information entered into said description logic-based knowledge base by said user or the result of a rule firing.

20. A general-purpose computer implemented system for explaining the source of derived information stored for an object in a memory in a description logic-based knowledge base system, said derived information being ascertained about said object based on information entered into said description logic-based knowledge base system by a user utilizing an input device and a plurality of inferences performed on said entered information, said explanation system comprising:

means for receiving an indication of portions of said derived information which should be explained, wherein said indication of portions of said derived information which should be explained consists of settings for a plurality of pruning variables which specify whether portions of said explanation should be generated;

explanation object generation means responsive to said receiving means for automatically generating explanation objects which explain the immediate source of said pieces of said derived information in accordance with said received indication of portions of said derived information which should be explained; and processor means for analyzing each of said generated explanation objects to identify explanation objects associated with said pieces of derived information requiring further explanation and to utilize said explanation object generation means to generate said further explanation in accordance with said received indication of portions of said derived information which should be explained.

21. The system of claim 20, wherein said indication of portions of said derived information which should be explained consists of an entry on a command line by a user of said description logic-based knowledge base system indicating which portions of said explanation should be generated.

22. The system of claim 21, wherein said command line entry indicates one or more aspects of said information stored for said object which should be explained.

23. A general-purpose computer implemented subsumption explanation method for use in a description logic-based knowledge base system for explaining why an object stored in a memory in said knowledge base satisfies a concept in said knowledge base, said subsumption explanation method comprising:

defining said concept utilizing a concept description having one or more components;

providing one or more subsumption inferences which explain how one or more of said components of the concept description may be satisfied by an object being explained; and selecting for each of said components of said concept description the one or more subsumption inferences which explain how the object being explained satisfies the particular component.

24. The subsumption explanation method according to claim 23, wherein said concept is a rule antecedent of a rule and said subsumption explanation method explains why said rule was fired on an individual.

25. A subsumption explanation method for use in a general-purpose computer implemented knowledge base system for explaining why an object in said knowledge base system satisfies a concept in said knowledge base, said concept being defined by a concept description having one or more components wherein said concept is a rule antecedent of a rule and said subsumption explanation method explains why said rule was fired on an individual, said subsumption explanation method comprising:

employing a description language allowing a user to make assertions about objects in a domain of interest to identify classes of objects and to establish relationships among objects, to define a concept to be explained;

automatically identifying for each component of said concept description a list of one of more subsumption inferences which may be applicable to said component, each of said subsumption inferences explaining a manner in which the associated component may be satisfied; and automatically selecting from the list of applicable subsumption inferences associated with each of said components, a subsumption inference which explains how the object being explained satisfies the particular component;

verifying that a filter associated with said rule is satisfied and explaining how said individual satisfies said filter; and indicating how each component of the rule antecedent definition and rule filter definition are satisfied by the individual being explained.

26. In a knowledge base system, which contains objects and has error detection means and explanation means for explaining the objects, the improvement comprising:

said knowledge base system being embodied as a configurator;

means in the error detecting means for returning an entity which was a source of the error; and means for defining the entity as an object to which the explanation means may be applied.

27. A system for use in a general-purpose computer implemented knowledge base system for explaining on demand the source of derived information stored for an object in said knowledge base, said derived information being ascertained about said object based on information entered into said knowledge base by a user and a plurality of inferences performed on said entered information to allow further information to be inferred, said explanation system comprising:

said knowledge base system being embodied as a configurator;

an input device;

a memory unit for storing a host programming language;

means for automatically generating explanation objects responsive to an input from a user utilizing the input device, the explanation objects explaining the immediate source of each piece of said derived information stored for said object, each of said explanation objects including an indication of said inference which generated said piece of derived information; and processor means for analyzing each of said generated explanation objects to identify explanation objects associated with said pieces of derived information requiring further explanation and to utilize said explanation object generation means to generate said further explanation.

28. A system for use in a general-purpose computer implemented knowledge base system for explaining on demand the source of derived information stored for an object in said knowledge base, said derived information being ascertained about said object based on information entered into said knowledge base by a user and a plurality of inferences performed on said entered information to allow further information to be inferred, said explanation system comprising:

an input device;

a memory unit for storing a host programming language;

means for automatically generating explanation objects responsive to an input from a user utilizing the input device, the explanation objects explaining the immediate source of each piece of said derived information stored for said object, each of said explanation objects including an indication of said inference which generated said piece of derived information, and said means for automatically generating explanation objects further comprising:

means for discarding each piece of said derived information stored for said object;

means for rederiving each piece of said derived information; and means for generating an explanation object for each piece of said rederived information indicating the source of said piece of rederived information;

processor means for analyzing each of said generated explanation objects to identify explanation objects associated with said pieces of derived information requiring further explanation and to utilize said explanation object generation means to generate said further explanation.

29. A system for explaining the source of derived information stored for an object in a knowledge base system, said derived information being ascertained about said object based on information entered into said knowledge base system by a user and a plurality of inferences performed on said entered information to allow further information to be inferred, said explanation system comprising:

said knowledge base system being embodied as a configurator;

means for receiving an indication of portions of said derived information which should be explained; and explanation object generation means responsive to said receiving means for automatically generating explanation objects which explain the immediate source of said pieces of said derived information which said user has requested to be explained.

30. A system for explaining the source of derived information stored for an object in a knowledge base system, said derived information being ascertained about said object based on information entered into said knowledge base system by a user and a plurality of inferences performed on said entered information to allow further information to be inferred, said explanation system comprising:

means for receiving an indication of portions of said derived information which should be explained, wherein said indication of portions of said derived information which should be explained consists of settings for a plurality of pruning variables which specify whether portions of said explanation should be generated; and explanation object generation means responsive to said receiving means for automatically generating explanation objects which explain the immediate source of said pieces of said derived information which said user has requested to be explained.

31. The system of claim 30, wherein one or more of said pruning variables control whether one or more of said inferences are explained.

32. The system of claim 30, wherein one or more of said pruning variables limits the generated explanation of certain aspects or role-paths.

33. A system for explaining the source of derived information stored for an object in a knowledge base system, said derived information being ascertained about said object based on information entered into said knowledge base system by a user and a plurality of inferences performed on said entered information to allow further information to be inferred, said explanation system comprising:

means for receiving an indication of portions of said derived information which should be explained, wherein said indication of portions of said derived information which should be explained consists of an entry on a command line by a user of said knowledge base system indicating which portions of said explanation should be generated, wherein said command line entry indicates one or more role-paths associated with said object which should be explained; and explanation object generation means responsive to said receiving means for automatically generating explanation objects which explain the immediate source of said pieces of said derived information which said user has requested to be explained.

34. In a knowledge base system of the type wherein the knowledge base provides an explanation of inferences, the improvement comprising:

said knowledge base system being embodied as a configurator;

means for explaining why an object in said knowledge base satisfies a concept in said knowledge base.

35. A general-purpose computer implemented system for explaining the source of derived information stored for an object in a memory in a knowledge base system, said derived information being ascertained about said object based on information entered into said knowledge base system by a user utilizing an input device and a plurality of inferences performed on said entered information to allow further information to be inferred said explanation system comprising:

processing means for automatically generating explanation objects which explain the immediate source of each piece of derived information stored for said object, each of said explanation objects including an indication of said inference which generated said piece of derived information;

processing means for analyzing said generated explanation objects and for automatically generating further explanation for said generated explanation objects requiring further explanation, said further explanation being generated for each piece of derived information until one or more termination conditions are reached; and a mechanism for defining one or more pruning variables which establish said termination conditions.

36. A general-purpose computer implemented system for explaining the source of derived information stored for an object in a memory in a knowledge base system, said derived information being ascertained about said object based on information entered into said knowledge base system by a user utilizing an input device and a plurality of inferences performed on said entered information to allow further information to be inferred said explanation system comprising:

processing means for automatically generating explanation objects which explain the immediate source of each piece of derived information stored for said object, each of said explanation objects including an indication of said inference which generated said piece of derived information, wherein said means for automatically generating explanation objects further comprises:

means for discarding each piece of said derived information stored for said object;

means for rederiving each piece of said derived information; and means for generating an explanation object for each piece of said rederived information indicating the source of said piece of rederived information;

processing means for analyzing said generated explanation objects and for automatically generating further explanation for said generated explanation objects requiring further explanation, said further explanation being generated for each piece of derived information until one or more termination conditions are reached.

37. A general-purpose computer implemented system for explaining the source of derived information stored for an object in a memory in a knowledge base system, said derived information being ascertained about said object based on information entered into said knowledge base system by a user utilizing an input device and a plurality of inferences performed on said entered information, said explanation system comprising:

said knowledge base system being embodied as a configurator;

means for receiving an indication of portions of said derived information which should be explained;

explanation object generation means responsive to said receiving means for automatically generating explanation objects which explain the immediate source of said pieces of said derived information in accordance with said received indication of portions of said derived information which should be explained;

processor means for analyzing each of said generated explanation objects to identify explanation objects associated with said pieces of derived information requiring further explanation and to utilize said explanation object generation means to generate said further explanation in accordance with said received indication of portions of said derived information which should be explained.

38. A general-purpose computer implemented system for explaining the source of derived information stored for an object in a memory in a knowledge base system, said derived information being ascertained about said object based on information entered into said knowledge base system by a user utilizing an input device and a plurality of inferences performed on said entered information, said explanation system comprising:

means for receiving an indication of portions of said derived information which should be explained;

explanation object generation means responsive to said receiving means for automatically generating explanation objects which explain the immediate source of said pieces of said derived information in accordance with said received indication of portions of said derived information which should be explained, wherein said means for automatically generating explanation objects further comprises:

means for discarding each piece of said derived information stored for said object;

means for rederiving each piece of said derived information; and means for generating an explanation object for each piece of said rederived information indicating the source of said piece of rederived information;

processor means for analyzing each of said generated explanation objects to identify explanation objects associated with said pieces of derived information requiring further explanation and to utilize said explanation object generation means to generate said further explanation in accordance with said received indication of portions of said derived information which should be explained.

39. A general-purpose computer implemented system for explaining the source of derived information stored for an object in a memory in a knowledge base system, said derived information being ascertained about said object based on information entered into said knowledge base system by a user utilizing an input device and a plurality of inferences performed on said entered information, said explanation system comprising:

means for receiving an indication of portions of said derived information which should be explained;

explanation object generation means responsive to said receiving means for automatically generating explanation objects which explain the immediate source of said pieces of said derived information in accordance with said received indication of portions of said derived information which should be explained;

processor means for analyzing each of said generated explanation objects to identify explanation objects associated with said pieces of derived information requiring further explanation and to utilize said explanation object generation means to generate said further explanation in accordance with said received indication of portions of said derived information which should be explained, wherein said indication of portions of said derived information which should be explained consists of settings for a plurality of pruning variables which specify whether portions of said explanation should be generated.

40. The system of claim 39, wherein one or more of said pruning variables control whether one or more of said inferences are explained.

41. The system of claim 39, wherein one or more of said pruning variables limits the generated explanation of certain aspects or role-paths.

42. The system of claim 39, wherein one or more of said pruning variables control where said processor will terminate said identification of explanation objects associated with said pieces of derived information requiring further explanation.

43. A general-purpose computer implemented subsumption explanation method for use in a knowledge base system for explaining why an object stored in a memory in said knowledge base satisfies a concept in said knowledge base, said subsumption explanation method comprising:

defining said concept utilizing a concept description having one or more components, wherein said concept is a rule antecedent of a rule and said subsumption explanation method explains why said rule was fired on an individual;

providing one or more subsumption inferences which explain how one of more of said components of the concept description may be satisfied by an object being explained;

selecting for each of said components of said concept description the one or more subsumption inferences which explain how the object being explained satisfies the particular component; and verifying that a filter associated with said rule is satisfied and explaining how said individual satisfies said filter.

44. The subsumption explanation method according to claim 43, further including the step of indicating how each component of the rule antecedent definition and rule filter definition are satisfied by the individual being explained.

45. The method according to claim 43, wherein said step of identifying affected objects identifies all objects that received information that was propagated from the object that the error information was initially added to and all objects who must be reclassified if information is removed from said object that the error information was initially added to.

46. The method according to claim 45, wherein said step of identifying affected objects identifies all objects that were modified as a result of the error input before said inconsistency was detected.

47. A method for use in a general purpose computer implemented knowledge base system for identifying the source of an error in a knowledge base stored in a memory, said knowledge base system including a mechanism for explaining the source of information, said method comprising the steps of:

detecting the occurrence of an inconsistency in the information stored in said knowledge base following the entry of error information for an object in said knowledge base;

automatically creating an error object for said object having said entered error information, said error object being created at a time when said identified objects include the error information and including information about the substance of the error which facilitates an explanation of why the error occurred;

identifying additional objects in said knowledge base system that are affected by said error information; and creating an error object copy for each of said identified objects that are affected by said error information, said error object copies being created at a time when said knowledge base includes the error identification.

48. A method for use in a general purpose computer implemented knowledge base system for identifying the source of an error in a knowledge base stored in a memory, said knowledge base system including a mechanism for explaining the source of information, said knowledge base system being embodied as a configurator, said method comprising the steps of:

detecting the occurrence of an inconsistency in the information stored in said knowledge base following the entry of error information for an object in said knowledge base, and automatically creating an error object for said object having said entered error information, said error object being created at a time when said identified objects include the error information and including information about the substance of the error which facilitates an explanation of why the error occurred.

49. A general-purpose computer implemented system for explaining the source of derived information stored for an object in a memory in a description logic-based knowledge base system, said derived information being ascertained about said object based on information entered into said description logic-based knowledge base system by a user utilizing an input device and a plurality of inferences performed on said entered information, said explanation system comprising:

means for receiving an indication of portions of said derived information which should be explained;

explanation object generation means responsive to said receiving means for automatically generating explanation objects which explain the immediate source of said pieces of said derived information in accordance with said received indication of portions of said derived information which should be explained;

processor means for analyzing each of said generated explanation objects to identify explanation objects associated with said pieces of derived information requiring further explanation and to utilize said explanation object generation means to generate said further explanation in accordance with said received indication of portions of said derived information which should be explained;

wherein said indication of portions of said derived information which should be explained consists of an entry on a command line by a user of said description logic-based knowledge base system indicating which portions of said explanation should be generated; and wherein said command line entry indicates one or more role-paths associated with said object which should be explained.

* * * * *